United States Patent
Miyazaki et al.

(10) Patent No.: US 6,665,493 B2
(45) Date of Patent: Dec. 16, 2003

(54) CAMERA FILM FEED DEVICE AND FILM FEED METHOD

(75) Inventors: Satoshi Miyazaki, Tokyo (JP); Kazuki Sakurai, Hino (JP); Ikko Mori, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 50 days.

(21) Appl. No.: 09/969,954

(22) Filed: Oct. 3, 2001

(65) Prior Publication Data

US 2002/0044776 A1 Apr. 18, 2002

(30) Foreign Application Priority Data

Oct. 13, 2000 (JP) ........................................ 2000-314356

(51) Int. Cl.$^7$ ................................................ G03B 1/00
(52) U.S. Cl. ........................ 396/408; 396/406; 396/415; 396/418
(58) Field of Search ................................ 396/301, 387, 396/392, 406, 408, 409, 410, 415, 418, 538

(56) References Cited

U.S. PATENT DOCUMENTS

| | | | | |
|---|---|---|---|---|
| 4,939,531 A | * | 7/1990 | Sawamura et al. | ......... 396/376 |
| 5,075,707 A | * | 12/1991 | Shibayama et al. | ......... 396/408 |
| 5,255,034 A | * | 10/1993 | Shimada et al. | ............ 396/406 |

* cited by examiner

*Primary Examiner*—Alan A. Mathews
(74) *Attorney, Agent, or Firm*—Frishauf, Holtz, Goodman & Chick, P.C.

(57) ABSTRACT

A camera film feed device is provided for enabling freely loadable placement of a film magazine which has a takeup shaft on which a film is wound and which has a film leader protruding from a film feeding opening. The camera film feed device includes a magazine chamber into which the film magazine is loaded, a fork which joins in mating fashion with the takeup shaft of the film magazine loaded into the magazine chamber, a takeup spool which is positioned on a side of a photographing aperture opposite the magazine chamber and which takes up the film, a sprocket which is positioned between the magazine chamber and the takeup spool, and a control circuit which controls the operations of the fork, takeup spool and sprocket. The control circuit starts an operation by the fork to rewind the film into the film magazine when the film magazine is loaded into the magazine chamber, stops the rewind operation when the film is rewound to a prescribed position, and then starts an operation by the sprocket to feed the film toward the takeup spool.

31 Claims, 25 Drawing Sheets

CAMERA FILM FEED DEVICE AND FILM FEED METHOD

This application claims benefit of Japanese Application No. 2000-314356 filed Oct. 13, 2000, the contents of which are incorporated by this reference.

BACKGROUND OF THE INVENTION

1. Field of the Invention

This invention relates to a camera film feed device and film feed method, and in particular, to a camera film feed device which automatically feeds the roll-shape film housed within a film magazine loaded into the camera, and a film feed method in this film feed device.

2. Description of the Related Art

Conventionally, when using a device for taking a photograph or a picture (hereafter called a "camera") to take photographs or similar, a film magazine in the interior of which is housed roll-shape film for photographing, in a wound state, must be loaded in advance into a prescribed position inside the camera.

After performing the operation of loading the film magazine into the camera, the film housed within this film magazine must be drawn outside the film magazine, wound by a takeup spool provided within the camera, and the roll-shape film must be placed in a prescribed position within the camera. Only after this series of operations (called film loading operations) is the camera in a state of preparation for taking photographs.

However, in the prior art there are cases in which, for example, the above-described series of film loading operations fails, and without noticing this, the user begins a series of photographing operations. In such cases, the camera user may for example notice that the film is not reliably wound by the takeup spool within the camera due to a phenomenon such as the absence of an operation to indicate the end of the film even when the prescribed number of image frames of the film has been exceeded.

In such cases, the photographing operations performed before failure of the film loading operations was noticed are all useless, and for the camera user, this represents the loss of rare photography opportunities.

The series of film loading operations for a conventional camera is, for general users, troublesome and difficult. Hence in the past, some experience has been required in order to reliably perform the operations to load a film magazine into a camera.

Conventional compact cameras and similar using roll-shape film employed in general use comprise a so-called auto-loading device, which is a film automatic feed device which, when the film magazine is loaded into the prescribed position within the camera, moves the film housed within the film magazine such that the film is at a prescribed photographing position within the camera.

However, even when using a camera comprising a conventional film automatic feed device, there are various problems due to which it may not always be possible to reliably load film.

General film automatic feed devices in conventional cameras are automated to some degree, but when loading the magazine at a prescribed position within the camera, there exists a procedure which the user must perform. This may be concretely explained as follows.

After opening the rear cover of the camera, the user loads the film magazine at a prescribed position in the camera interior, that is, in the magazine chamber. At this time, the user must place the tip area of the film tip vicinity (called the film leader, or simply the leader) within a prescribed range in the camera interior. If the leader is not positioned within this prescribed range, the film loading operations may fail.

Hence even in a conventional camera comprising a film automatic feed device, the problem that, depending on the user, film loading operations may result in failure, has not been completely resolved.

SUMMARY OF THE INVENTION

A first object of this invention is to provide a camera film feed device enabling the reliable placing of the roll-shape film housed within the film magazine in a prescribed position within the camera, using only more simple operations than in the prior art.

A second object of this invention is to provide a camera film feed device which alleviates the troublesomeness of film loading operations, and affords a satisfactory in use.

A third object of this invention is to provide a film feed method, in a camera film feed device, enabling the reliable placing of the roll-shape film housed within the film magazine in a prescribed position within the camera, using only more simple operations than in the prior art.

A fourth object of this invention is to provide a film feed method, in a camera film feed device, which alleviates the troublesomeness of film loading operations, and affords a satisfactory in use.

Briefly explained, the first invention is a camera film feed device enabling the freely loadable placement of a film magazine, having a takeup shaft on which is wound film and in which the film leader protrudes from a film feeding opening, and characterized in further comprising a magazine chamber in which to load the above film magazine; a fork joined to mate with the above takeup shaft of the above film magazine loaded into this magazine chamber; a takeup spool to take up the above film that is on the other side of the aperture for photographing opposite the above magazine chamber; a sprocket, positioned between the above magazine chamber and the above takeup spool; and a control circuit which controls the operation of the above fork, the above takeup spool, and the above sprocket; and wherein, when the above film magazine is loaded into the above magazine chamber, this control circuit starts operation to rewind the above film into the above film magazine by means of the above fork, and when the above film is rewound to a prescribed position stops the above rewind operation, and then starts operation to feed the above film to the above takeup spool by means of the above sprocket.

The second invention is a camera film feed device enabling the freely loadable placement of a film magazine, having a takeup shaft on which is wound film and in which the film leader protrudes from a film feeding opening, and characterized in further comprising a magazine chamber in which to load the above film magazine; rewinding means which joins to mate with the takeup shaft of the above film magazine and rewinds the film; takeup means, placed in an area on the other side of the aperture for photographing opposite the above magazine chamber, to take up film; feeding means, positioned between the above magazine chamber and the above takeup means, which feeds film from the above magazine chamber side to the above takeup means side; detection means which, when film is rewound by the above rewinding means, detects whether the film tip has reached a prescribed position; and control means which starts rewind driving of the above film through the above rewind means in response to loading of the above film magazine, stops film rewind driving by the above rewind means when the above film tip is detected by the above detection means, and then starts feeding driving by the above feeding means.

The third invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the takeup spool after the end of the rewind operation by the rewinding means; takeup means to take up the film by means of the above takeup spool; and detection means to detect failure of a film feeding operation by the above feeding means, or failure of the film takeup operation by the above takeup means; and wherein, when failure is detected by the above detection means, the film is rewound again to the above prescribed position.

The fourth invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the takeup spool after the end of the rewind operation by the rewinding means; takeup means to take up the film by means of the above takeup spool; winding means to wind the film in succession to an exposure operation; failure detection means to detect failure of a film feeding operation by the above feeding means, or failure of a film takeup operation by the above takeup means; end detection means to detect the fact that the film is wound until the end during winding operations by the above winding means; and control means which, when failure of the above feeding operation or failure of the above takeup operation is detected by the above failure detection means, rewinds the film such that the film leader is left outside the above film magazine, and when the film end is detected by the above end detection means, rewinds the film until the film leader is drawn completely into the above film magazine.

The fifth invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the camera takeup spool after the end of the rewind operation by the rewinding means; takeup means to take up the film by means of the above takeup spool; winding means to wind the film in succession to an exposure operation; failure detection means to detect failure of a film feeding operation by the above feeding means, or failure of a film takeup operation by the above takeup means; an operation member to instruct that the film be forcibly rewound during photographing; output means to output a rewind signal in response to operation of this operation member; and control means which, when failure of the above feeding operation or failure of the above takeup operation is detected by the above failure detection means, rewinds the film until the film leader is at a prescribed position, remaining outside the above film magazine, and when a rewind signal is output by the above output means, rewinds the film until the film leader is drawn completely inside the above film magazine.

The sixth invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the takeup spool after the end of the rewind operation by the rewinding means; takeup means to take up film which has reached the above takeup spool by the above takeup spool; first detection means to detect the film tip; second detection means to detect film perforations; and judgment means which, after a film feeding operation by the above feeding means, when the film tip is not detected by the above first detection means within a first prescribed time, or when, after the above first detection means detects the film tip within the above first prescribed time, the above second detection means does not detect a film perforation with a second prescribed time, or when, after the above second detection means detects a film perforation within the above second prescribed time, the above second detection means does not detect the next perforation within a third prescribed time, judges that the film feed operation has failed.

The seventh invention is a camera film feed device enabling the freely loadable placement of a film magazine, having a takeup shaft on which is wound film and in which the film leader protrudes from a film feeding opening, and characterized in further comprising feeding means to feed the film toward the takeup spool side in response to loading of the above film magazine; takeup means to take up the film by the above takeup spool; detection means to detect failure of the film feeding operation by the above feeding means or of the film takeup operation by the above takeup means; rewind means to rewind the film once again to a prescribed position, when failure of a film feeding operation or of a film takeup operation is detected by the above detection means; first detection means to detect the film tip during a rewind operation by the rewind means; second detection means, positioned closer to the above takeup means compared with the first detection means, to detect film perforations during a rewind operation by the rewind means; and, control means to control the rewind speed of the above rewind means according to the detection results of the above first detection means and the above second detection means.

The eighth invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the takeup spool after the end of a rewind operation by the rewinding means; and takeup means to take up, by the above takeup spool, film which has reached the above takeup spool; and wherein the speed of feeding of film by the above takeup means is faster than the speed of feeding of film by the above feeding means.

The ninth invention is a camera film feed device enabling the freely loadable placement of a film magazine, having a takeup shaft on which is wound film and in which the film leader protrudes from a film feeding opening, and characterized in further comprising rewinding means to rewind the film to a prescribed position in response to loading of the above film magazine; feeding means to feed the film toward the takeup spool after the end of a rewind operation by the rewinding means; takeup means to take up, by the above takeup spool, film which has reached the above takeup spool; and, detection means to detect the movement speed of the film; and wherein the above takeup means switches the driving speed of the above takeup spool according to the film movement speed detected by the above detection means.

The tenth invention is a camera comprising a film feed device enabling the freely loadable placement of a film magazine, in which the film leader protrudes from a film feeding opening, and characterized in further comprising loading means to rewind the film to a prescribed position, and then feed the film toward the takeup spool, in response to loading of the above film magazine; rewinding means to rewind exposed film into the interior of the above film magazine; irradiation means to project infrared light toward the film; light-receiving means to receive light reflected from the film; nonvolatile storage means to store a prescribed value in order to judge the output level of this light-receiving means; and detection means to compare the output signal of the above light-receiving means with the above prescribed value, and detect the tip of the film; and wherein the output of the above light-receiving means is set to the next prescribed value, and stored in the above nonvolatile storage means, either with prescribed timing during loading by the above loading means, or after the end of operation by the above rewinding means.

The eleventh invention is a camera film feed device enabling the freely loadable placement of a film magazine, in which the film leader protrudes from a film feeding opening, and characterized in further comprising light projection/reception means, provided within the film feed path, which projects infrared light toward the film, and which receives light reflected from the film and outputs a light-reception signal; nonvolatile storage means to store a prescribed value for use in judging the output level of the light-reception signal output from this projection/reception means; detection means to compare the above light-reception signal and the above prescribed value, and detect the presence or absence of film; loading means to feed film in response to loading of the above film magazine; detection means to detect the failure of film loading by this loading means; and rewinding means to rewind the film if failure of the above film loading is detected by this failure detection means; and wherein the above light-reception signal output is stored in the above nonvolatile storage means as the above prescribed value in response to the end of a film rewind operation by the above rewinding means upon occurrence of the above failure.

The twelfth invention is a camera film feed method enabling the freely loadable placement of 135 millimeter film, characterized in comprising a step to detect the loading of the above film magazine; a step to rewind the film until the film tip reaches a prescribed position when loading of the above film magazine is detected; a step to feed the film toward a takeup spool after the end of this film rewinding step; and a step to take up the film by the above takeup spool when the film is fed as far as the position at which the above takeup spool is placed.

The thirteenth invention is a film feed method for a camera enabling the freely loadable placement of a film magazine, having a takeup shaft on which is wound film and in which the film leader protrudes from a film feeding opening, and characterized in comprising a step to detect the loading of the above film magazine; a step to rewind the film until the film tip reaches a prescribed position when loading of the above film magazine is detected; a step to feed the film toward a film takeup spool after the end of the above rewinding step; a step to take up the above film by the above takeup spool when the film is fed as far as the above takeup spool; and, a step to rewind the film tip to the above prescribed position if failure of the operation of the above feeding step, or failure of the operation of the above takeup step, is detected.

These inventions, and other objects and advantages of the same, will become more clear from the following detailed explanation.

By means of this invention, a camera film feed device and camera film feed method can be provided which enable the reliable placing of the roll-shape film housed within the film magazine in a prescribed position within the camera, using only simpler operations than in the prior art.

Also, by means of this invention, a film feed device and film feed method can be provided which alleviate the troublesomeness of film loading operations, and which can afford a satisfactory in use.

DESCRIPTION OF THE PREFERRED EMBODIMENTS

Figure 1:
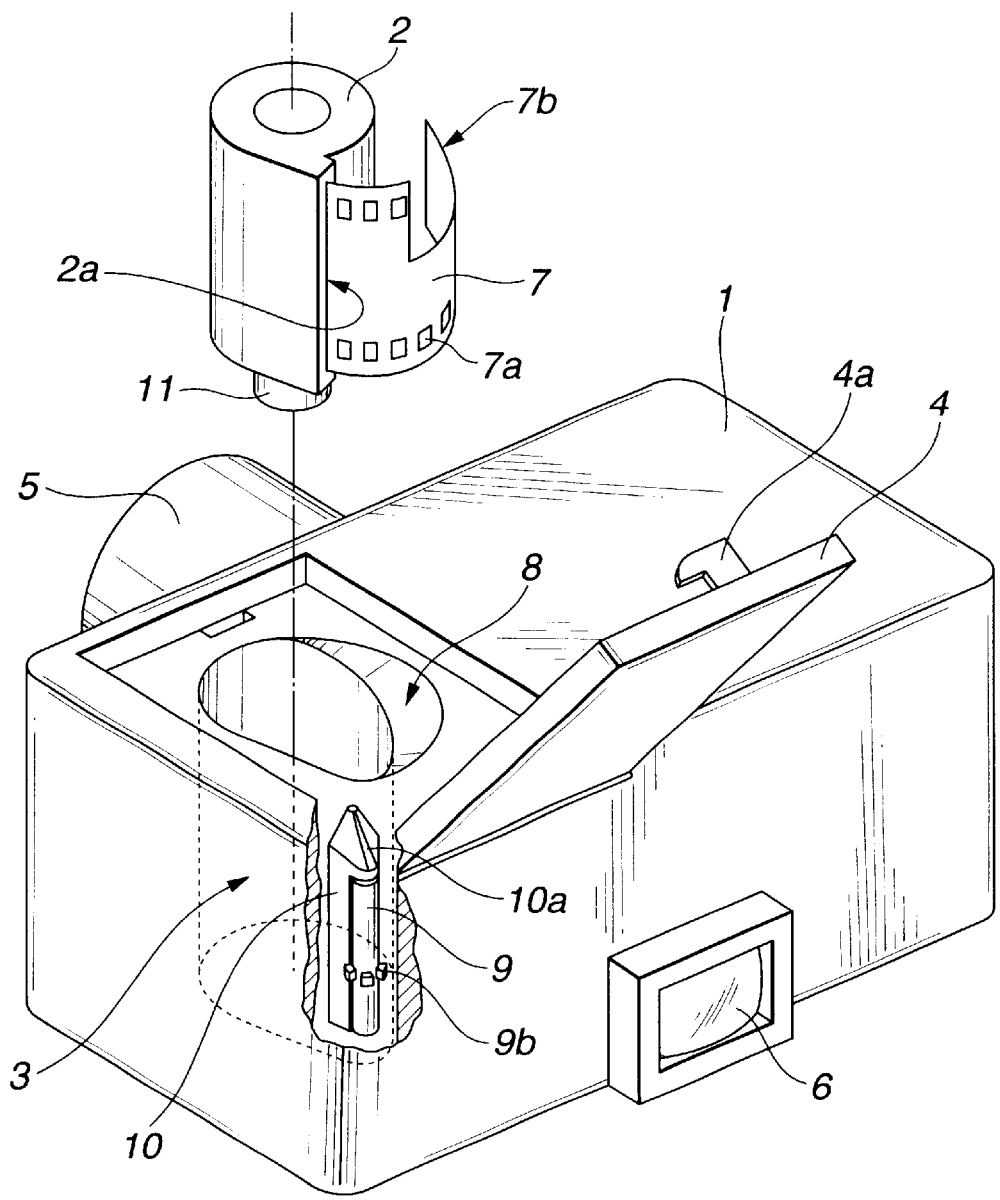
FIG. 1 is a perspective view showing a camera comprising the film feed device of a first aspect of this invention.

FIG. 1 is a perspective view showing a camera comprising the film feed device of a first aspect of this invention. FIG. 1 shows the camera as seen from the rear-bottom side. In order to show members positioned within the magazine chamber 3, the camera is shown with a portion removed.

The camera 1 shown as an example in this aspect is configured to enable the freely loadable placement of a film magazine 2. The film magazine 2 comprises a takeup shaft 11 about which is wound a roll-shape film (hereafter simply called "film") 7 for use in photographing, and a film feeding opening 2a from which a film leader 7b of the film 7 protrudes. This film magazine 2 is, for example, the 135 millimeter film magazine specified by JIS K7519-82. This camera 2 is configured to enable loading into the interior from the bottom side.

That is, this camera 1 has a magazine chamber 3 formed to house a film magazine 2 at a prescribed position on one end of the interior, as shown in FIG. 1. This magazine chamber 3 is shown by broken lines in FIG. 1.

On the bottom side of the camera 1 is provided a magazine chamber lid 4, in a prescribed position corresponding to the opening 8 of the magazine chamber 3. One end of this magazine chamber lid 4 is axially supported in freely rotatable fashion, with respect to the member constituting the bottom face of the camera 1, by a shaft member (not shown). By this means, part of the bottom face of the camera 1 is formed so as to enable opening and closing. In FIG. 1, the state in which the magazine chamber lid 4 is opened is shown.

In the magazine chamber lid 4 is placed a lock mechanism in order to maintain the closed state. This lock mechanism comprises a detent member 4a, provided in the inside fact of the magazine chamber lid 4, and a latch member (not shown) provided on the side of the main unit of the camera 1. This lock mechanism is configured by ordinary means, and a detailed explanation of the lock mechanism in this embodiment is omitted.

In the interior of the magazine chamber 3, in the vicinity of the entrance, is positioned a film guide member 10 of a prescribed shape. The purpose of this film guide member 10 is to guide the film leader 7b, protruding from the interior of the film magazine 2, to a prescribed position within the magazine chamber 3 when a film magazine 2 is loaded into the magazine chamber 3. To this end, on the film guide member 10 is formed an inclined portion 10a having an inclination angle at a prescribed angle toward the inner wall of the magazine chamber 3.

In the film guide member 10 is provided, in freely rotatable fashion, a sprocket 9, which is a feeding means (loading means) having detents 9b to contribute to feeding of the film 7, and which is driven so as to feed film drawn out from the interior of the loaded film magazine 2 toward the spool chamber 24 (omitted from FIG. 1) from the side of the magazine chamber 3.

Hence when the user of the camera 1 inserts a film magazine 2 from the aperture 8 in the normal state, the film leader 7b of the film 7 within the film magazine 2 is guided by the inclined portion 10a of the film guide member 10, to be placed in a prescribed position within the magazine chamber 3, that is, a position in which the detents 9b of the sprocket 9 oppose the perforations 7a of the film 7. This sprocket 9 is configured so as to rotate as necessary by means of the rotational driving force of a motor 23 (cf. FIG. 2) which is the source of power of the film feed mechanism, described below.

On the front side of the camera 1 shown in FIG. 1 is positioned an photographing lens barrel 5, which holds an photographing lens 5a (not shown in FIG. 1; cf. FIG. 2), and on the rear side is positioned a viewfinder eyepiece 6. This photographing lens barrel 5 and viewfinder eyepiece 6 have configurations similar to those of ordinary conventional compact cameras. Hence detailed explanations of these components of this aspect are omitted. The other constituent members of the camera 1, such as for example the various operating members, are elements not directly related to this invention, and so are omitted from FIG. 1, and detailed explanations of same are also omitted.

Next, the internal configuration of the camera 1 of this aspect is explained below.

Figure 2:
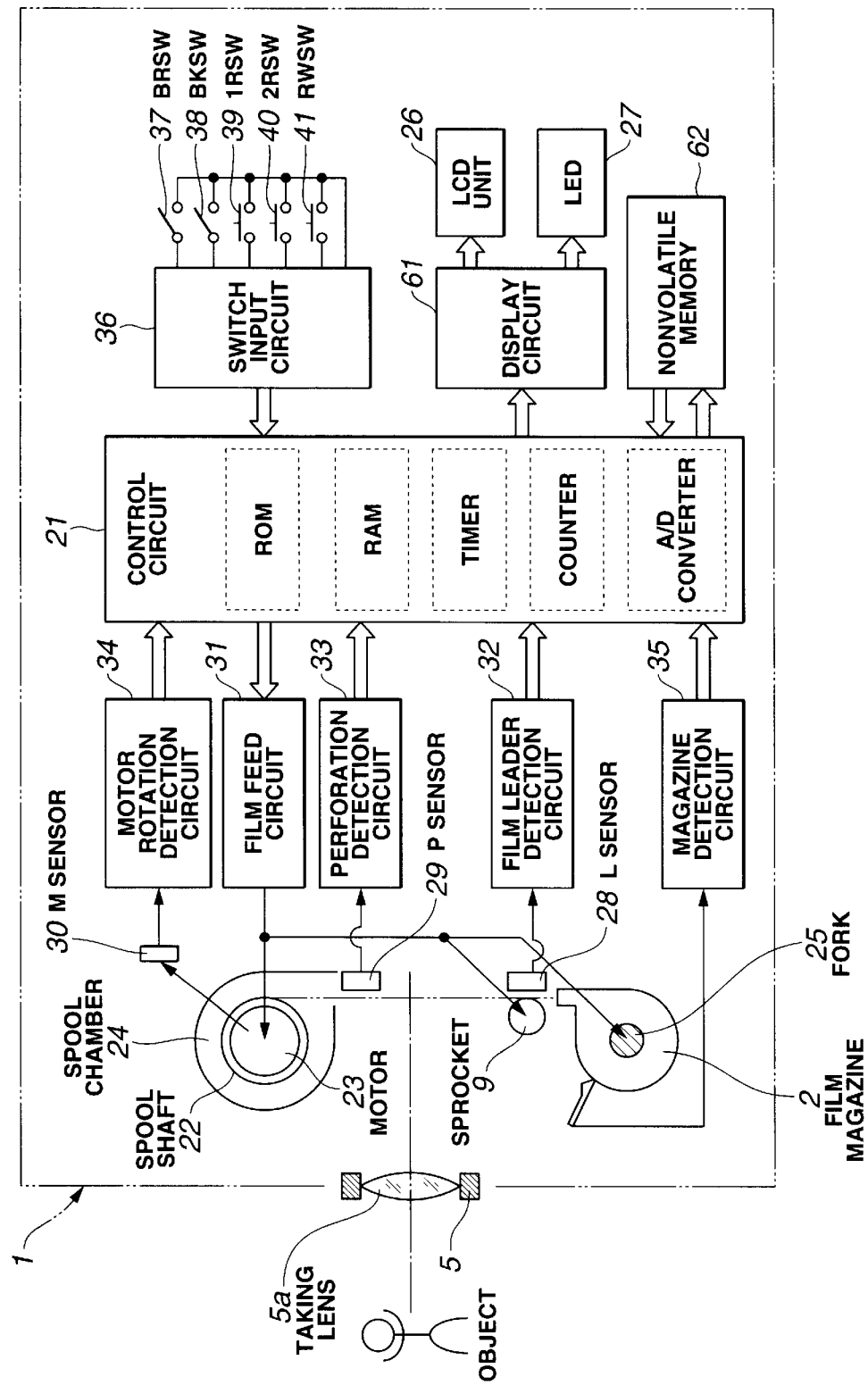
FIG. 2 is a block diagram showing the internal configuration of the camera film feed device of this aspect.

FIG. 2 is a block diagram showing the internal configuration of the film feed device of the camera 1. In FIG. 2, only the constituent members concerned primarily with the film feed device are shown; other constituent members not related to this invention are not shown, and detailed explanations of same are omitted.

Electrical control of the camera 1 is performed by the control circuit 21, which is the control means. This control circuit 21 is what is known as a microprocessor. The control circuit 21 comprises, for example, ROM (read-only memory: semiconductor memory from which data can at any time be read only), RAM (random access memory: semiconductor memory to which data can be written, and from which data can be read, at any time), a timer (TIMER: time measurement means), a counter (COUNTER: counting means), and an A/D converter (analog-to-digital CONVERTER: means to convert analog signals (continuous physical quantities) into digital signals (numerical data)). By controlling the internal circuitry of the camera 1 according to a prescribed program stored in the ROM of the control circuit 21, the overall operation of the camera 1 is governed.

To this control circuit 21 are connected various electrical circuits, including a film feed circuit 31 which controls the rotation direction and rotation speed of the motor 23 (voltage applied to the motor 23); a film leader detection circuit 32 which is electrically connected to and controls the leader sensor 28, described below; a perforation detection circuit 33, which is electrically connected to and controls the perforation sensor 29, described below; a motor rotation detection circuit 34, which is electrically connected to and controls a motor sensor 30, described below; a magazine detection circuit 35, which detects whether or not a film magazine 2 is loaded into the magazine chamber 3; a switch input circuit 36, electrically connected to a plurality of operating switches and similar (described in detail below), which receives signals from these various operating switches and similar, and transmits the same to the control circuit 21; a display circuit 61, connected electrically to a liquid crystal display unit 26, LED (light-emitting diode) 27 or other display means, provided in the camera 1 to display various types of information, and which controls this display means; and an EEPROM or other nonvolatile memory 62, as a nonvolatile storage means which temporarily stores prescribed information comprising electrical signals and similar. Through this configuration, various electrical signals from various electrical members can be input to the control circuit 21, which can also output various electrical signals to the various electrical members.

The film feed circuit 31 comprises, for example, an H-type bridge circuit employing four transistors, and a transistor pre-driver. The control circuit 21, by selectively turning each of these transistors on, controls the forward/reverse rotation driving of the motor 23, short-circuits the terminals of the motor 23 to apply braking, and similar. In addition, feedback circuits comprising op-amps are connected between the collector and base of each of two PNP transistors on the power supply side. Hence the collector potential (voltage applied to the motor 23) can be set arbitrarily from the DA output port of the control circuit 21. As the output to be set at the DA port, various appropriate values can be stored in advance in nonvolatile memory 62 according to driving conditions.

The magazine detection circuit 35 is substituted by the input circuit so-called DX codes, or film information display portions provided for example on the outer periphery surface of the magazine 2.

The switch input circuit 36 is connected to a barrier switch (BRSW) 37, which acts as a power supply switch member linked to the opening and closing of a barrier member (not shown) provided in freely sliding fashion on the front side of the camera 1; to a back switch (BKSW) 38 linked to the opening and closing of the magazine chamber lid 4; to a first release switch (1RSW) 39, which is turned on by first-stage operation of a shutter release button (not shown) comprising a two-stage switch; to a second release switch (2RSW) 40, which is turned on by a second-stage operation of the same shutter release button; and to a rewind switch (RWSW) 41, which is linked to the turn-on operation of a midway-rewind button (not shown), which issues an instruction for forced rewinding midway through use of the film 7. The signals from these various switches are output to the control circuit 21 via the switch input circuit 36.

When the switch input circuit 36, by receiving signals from each of the above-described switches 37 to 41 and similar, detects a state change, a prescribed interrupt signal is output to the control circuit 21. On receiving this interrupt signal, the control circuit 21 will at any time execute processing according to the instruction signal of the switches 37 to 41 or similar.

BRSW 37 is a power supply switch member which is linked to the open/close operation of the barrier member (not shown) on the front side of the camera 1. When the control circuit 21 receives an instruction signal to the effect that this BRSW37 is in the on state, the control circuit 21 judges that the user has changed the barrier member of the camera 1 to the open state, and controls prescribed driving circuitry and driving mechanisms (not shown) to set the photographing lens barrel 5 from the retracted position to a prescribed imaging position. Simultaneously with this, the display circuit 61 is started.

BKSW 38 is a switch member which is linked to the open/close operation of the magazine chamber lid 4. That is, after the user loads a film magazine 2 into the magazine chamber 3 of the camera 1, when the magazine chamber lid 4 is changed from the open state (the state of FIG. 1) to the closed state, the output from BKSW 38, linked with this, changes from an on signal to an off signal. On receiving this, the control circuit 21 executes a series of initial film feeding operations.

In this way, BKSW 38 detects the open/closed state of the magazine chamber lid 4, and plays the role of magazine loading detection means which detects loading of the film magazine 2 into the magazine chamber 3.

Apart from this, a member to directly detect the fact that a film magazine 2 has been loaded into the magazine chamber 3 may for example be positioned on the inside of the magazine chamber 3, for use as magazine loading detection means for detection of the loaded state of a film magazine 2.

1RSW 39 is a switch which is linked to the first-stage depression of the shutter release button (not shown). When an on signal appears from this 1RSW 39, the control circuit 21 receives this signal and executes prescribed photographing preparation operations. These photographing preparation operations include, for example, using a prescribed distance-measurement circuit or light level-measurement circuit (neither is shown) to perform distance or light-level measurement operations. Data acquired by this means, that is, the distance measurement results and light-level measurement results, is held while the on signal of the 1RSW 39 is output continuously, that is, while operation of the first stage of the release button is being performed.

2RSW 40 is a switch which is linked to a depression of the second-stage shutter release button (not shown). When an on signal from this 2RSW 40 appears, the control circuit 21 receives the signal and, based on data acquired in the photographing preparation operation executed by the above-described 1RSW 39, extends the photographing lens barrel 5. Simultaneously with this, the control circuit 21 controls the diaphragm mechanism and shutter mechanism (not shown) and similar to effect the prescribed exposure of the film 7, and then returns the photographing lens barrel 5 to a prescribed position. Next, an operation to wind the film 7 by one frame's worth is executed, and the next photographing operation is awaited.

RWSW 41 is a switch which is linked to depression of the midway-rewind button (not shown), which is an operation member which issues an instruction for forced rewind. When the on signal from this RWSW 41 (rewind signal) is output via the switch input circuit 36, which serves as an output means to output this signal, the control circuit 21, on receiving the signal, immediately initiates an operation to rewind the film 7.

The display circuit 61 controls the liquid crystal display unit 26, LED 27, or other display means to display various information in the camera 1. Of the various types of information displayed by this display means, for example, the operating mode of the camera 1, count value of the film 7 (film counter), date and time, and other information is displayed using the liquid crystal display unit 26. The operating state of the auto-focus (AF), state of the strobe means (not shown), and other information is displayed using the LED 27. The display circuit 61 serves to convert signals (data) representing various kinds of information, transmitted from the control circuit 21, into display data in a format enabling display by the display means.

The liquid crystal display unit 26 is provided, for example, on the upper face or on the rear face of the camera 1, and the LED 27 is normally provided inside the viewfinder, for example.

As the nonvolatile memory 62, EEPROM or other nonvolatile memory, designed for free overwriting by electrical means, is used. As described above, this nonvolatile memory 62 is electrically connected to the control circuit 21 by a communication line. Prescribed data from the control circuit 21 is recorded, and prescribed data is output to the control circuit 21, via this communication line. The control circuit 21 in this camera 1 stores data indicating the states of the film counter and camera 1, and various other adjustment values and similar, into the internal RAM and this nonvolatile memory 62 at the same time.

This is a measure adopted in consideration of the following kind of case. During use of the camera 1, if the batteries are removed from within the camera 1 in order to replace the main power supply batteries (not shown), for example, the control circuit 21 is initialized. This is accompanied by the erasure of various information stored in the (RAM of the) control circuit 21, that is, the erasure of various kinds of information indicating the current settings and states of the camera 1. Hence in such a case, the various kinds of necessary information is also recorded to the nonvolatile memory 62. When the main power supply batteries are again loaded, the various settings of the camera 1 are set based on the various kinds of information stored in the nonvolatile memory 62, so that the control circuit 21 is immediately restored to the state prior to initialization.

The film feed mechanism in the film feed device of this camera 1 comprises various members, including: a spool shaft 22, which is also a takeup means and winding means to takeup and wind the film 7 drawn out from within the film magazine 2 loaded into the magazine chamber 3; a motor 23, positioned within this spool shaft 22; a spool chamber 24 (omitted from FIG. 1), to house the film 7 taken up on the outer perimeter of the spool shaft 22; a magazine chamber 3 (not shown in FIG. 2; See; FIG. 1) to load the film magazine 2; a fork member 25 (not shown in FIG. 1) to rotate in a prescribed direction the takeup shaft 11 of the film magazine 2; a sprocket 9, comprising a plurality of detents 9b on the outer periphery, to mate with the perforations 7a of the film 7 and feed the film 7; a leader sensor (hereafter called an "L sensor") 28 which is a detection means to detect the tip of the leader 7b of the film 7, and to detect whether the tip of the leader 7b has reached a prescribed position, and which is a first detection means; a perforation sensor (hereafter called a "P sensor") 29, which is a second detection means to detect perforations 7a in the film 7; and, a motor sensor (hereafter called an "M sensor") 30 to detect rotation of the motor 23.

The spool shaft 22 is positioned in freely rotatable fashion on the inside of the spool chamber 24, which is positioned in a prescribed position on the side opposite (the other end of) the side in the camera 1 on which the magazine chamber 3 is positioned. This spool shaft 22 comprises a hollow shaft member, inside of which is positioned the motor 23, as described above. The rotational driving force of the motor 23, controlled by the control circuit 21, is transmitted to the spool shaft 22 via a prescribed driving force transmission mechanism (cf. FIG. 6); the spool shaft 22 is configured so as to be rotated in a prescribed direction, that is, in the direction to take up the film 7, as necessary.

Figure 6:
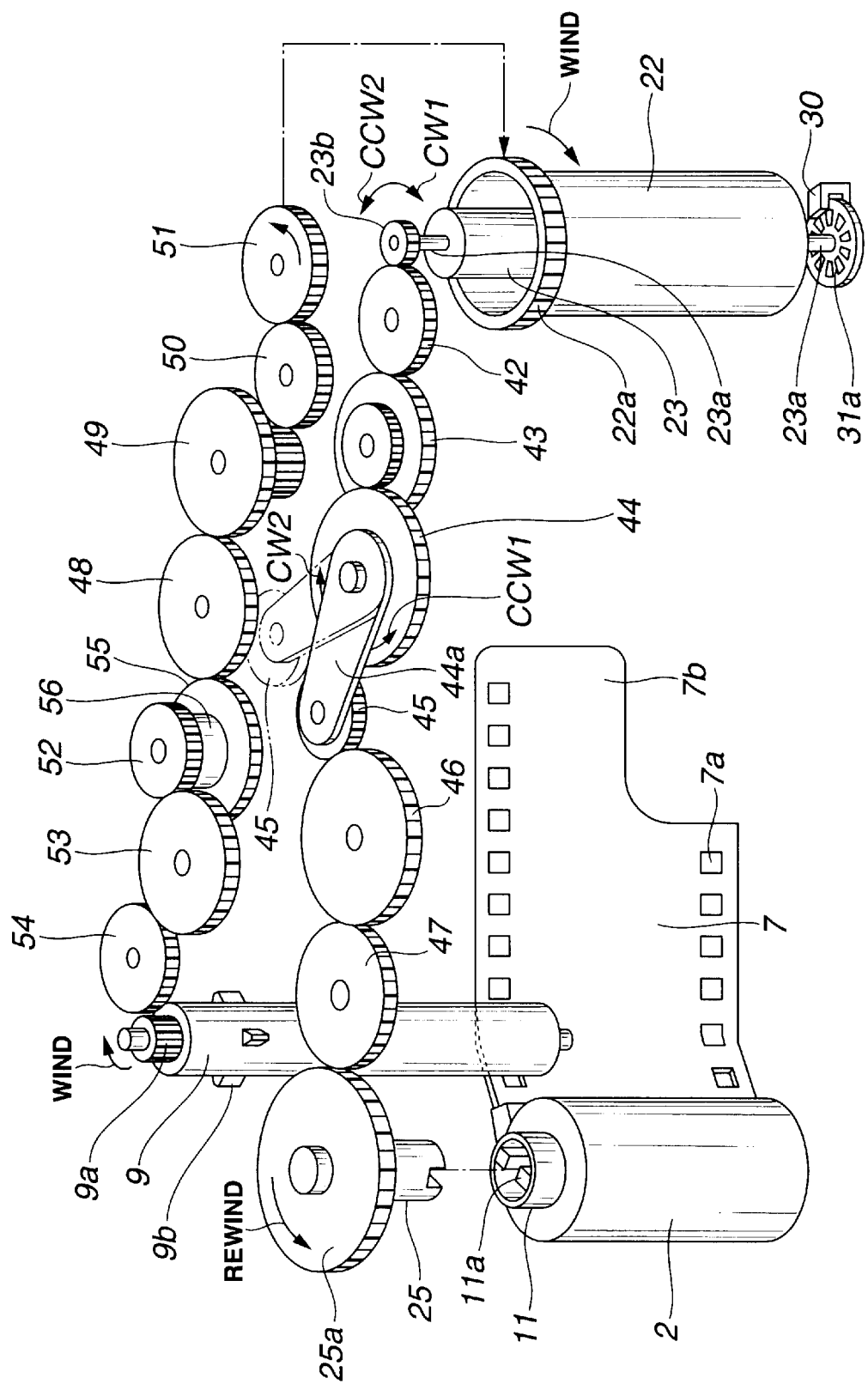
FIG. 6 is an enlarged perspective view of principal parts, showing the drive transmission mechanism in the film feed device of the camera of FIG. 1.

The fork member 25 is positioned in freely rotatable fashion inside the magazine chamber 3. This fork member 25 is formed so as to join to mate with a key slot 11a provided in the takeup shaft 11 of the film magazine 2 loaded into the magazine chamber 3. The fork member 25 is linked with the above-described prescribed driving force transmission mechanism (See; FIG. 6). Hence the rotational driving force of the motor 23 is also transmitted as necessary to this fork member 25 via the above driving force transmission mechanism. In this way, the fork member 25 is joined to mate with the key slot 11a of the takeup shaft 11 of the film magazine 2, being driven in the direction to take up the film 7 on the takeup shaft 11, and so serving as a takeup means to take up film 7 into the film magazine 2.

In this way, the rotational driving force of the motor 23 is transmitted to the spool shaft 22, fork member 25 and sprocket 9 and similar via the prescribed driving force transmission mechanism (See; FIG. 6), comprising a series of gears and similar.

The L sensor 28 is a reflection-type photosensor comprising a photoreflector or similar. The output of this L sensor 28 is transmitted via the film leader detection circuit 32 to the control circuit 21. By receiving this output, the control circuit 21 acquires information on the position of the tip of the film 7.

Here the L sensor 28 is explained in detail.

Figure 3:
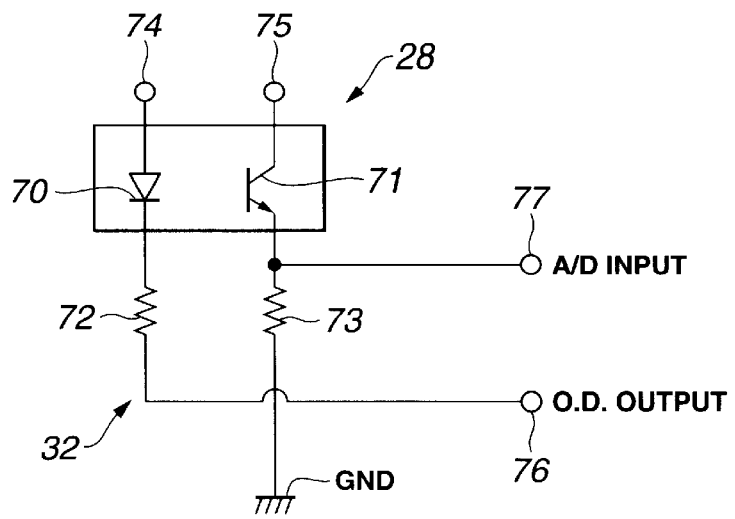
FIG. 3 is a circuit diagram showing one example of the configuration of the L sensor and film leader detection circuit employed in the camera film feed device of this aspect.
Figure 4:
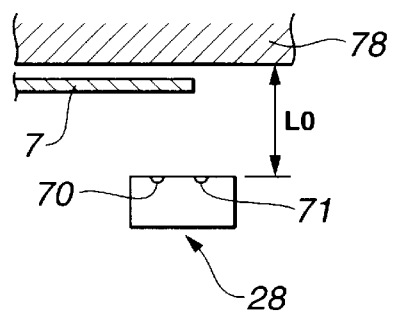
FIG. 4 is a schematic diagram showing the positional relation between the L sensor and film in the interior of the camera of FIG. 1.

FIG. 3 is a circuit diagram showing one example of the configuration of the L sensor 28 and film leader detection circuit 32 employed in this film feed device. FIG. 4 is a schematic diagram showing the positional relation between the L sensor 28 and film 7 in the interior of the camera 1; this figure is used to explain the method for setting the state judgment level of the L sensor 28.

The L sensor 28 is a reflection-type photo sensor or other light projection/reception means, comprising a light-emitting diode (LED) 70 which is an irradiation means to emit infrared light as shown in FIG. 3, and phototransistor 71 which is a light-receiving means to receive the light which is emitted by the LED 70 and reflected by a reflecting member (high-reflectivity member 78), described below, or by the base surface of the film 7.

The anode of the LED 70 is connected to a stabilized power supply 74. The cathode of the LED 70 is connected in series to the open-drain output port (O.D. output) 76 of the control circuit 21 via a current-limiting resistance 72.

The collector of the phototransistor 71 is connected to the A/D conversion reference power supply 75; the emitter is connected in series to the A/D conversion input port (A/D input) 77 of the control circuit 21 and to the load resistance 73 for current/voltage conversion. The other end of the above load resistance 73 is connected to a reference potential (GND).

The L sensor 28 configured in this way is positioned, as shown in FIG. 4, inside the camera 1. That is, the L sensor 28 is placed in a prescribed position facing the high-reflectivity member 78, which is fixed in place on a fixed member of the camera 1. Here the distance between the L sensor 28 and the high-reflectivity member 78 is set equal to the distance L0 at which the sensitivity peak value Pk of the L sensor 28 is maximum. The film 7 moves through the space between the L sensor 28 and the high-reflectivity member 78.

Hence when no film 7 exists in the space between the two, the L sensor 28 outputs the peak sensitivity value, whereas when a film feed operation is performed and film 7 intervenes in the space between the L sensor 28 and the high-reflectivity member 78, a value lower than the peak value is output. This is because the position in which the film 7 is placed is shifted slightly from the position at which the sensitivity peak value can be output by the L sensor 28, and in addition, the reflectivity of the base surface of the film 7 is quite low compared with the reflectivity of the high-reflectivity member 78.

The action of the L sensor 28 and high-reflectivity member 78 configured in this way is as follows. Infrared or other light rays emitted from the above-described LED 70 are reflected by the high-reflectivity member 78 (See; FIG. 4). This reflected light is received by the phototransistor 71. A current then flows in the phototransistor 71 according to the quantity of light received. This current is converted into a voltage by the load resistance 73 of the film leader detection circuit 32. This voltage is A/D converted by a prescribed A/D conversion means, and is then output to the control circuit 21 as the light-reception signal of the phototransistor 71.

On receiving this, the control circuit 21 compares the signal input from the film leader detection circuit 32 and a prescribed threshold level stored in advance in EEPROM 62, and judges whether the input signal is at high (Hi) level or at low (Lo) level.

Figure 5:
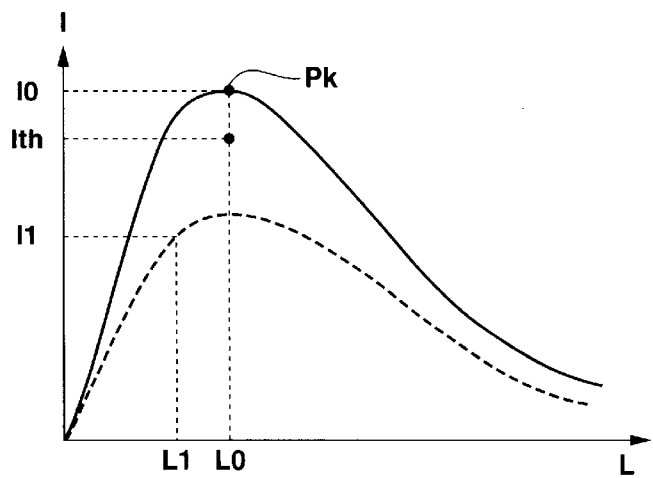
FIG. 5 is a graph showing the change in the photocurrent of the L sensor in response to changes in the distance between the L sensor and a high-reflectivity member in the interior of the camera of FIG. 1.

FIG. 5 is a graph showing the change in the photocurrent of the L sensor 28 in response to changes in the distance between the L sensor 28 and a reflection member (the high-reflectivity member 78). Here the value L of the distance between the L sensor 28 and the reflection member (reflection member or film 7) is plotted along the horizontal axis, and the value I of the photocurrent in the phototransistor 71 corresponding to this distance L is plotted along the vertical axis.

The solid line in FIG. 5 represents the characteristic curve of the high-reflectivity member 78 for the case when the reflection member is the high-reflectivity member 78, that is, when there exists no film 7 in the space between the L sensor 28 and the high-reflectivity member 78. The broken line in the figure represents the characteristic curve for the case when the reflection member is the film 7, that is, when film 7 intervenes in the space between the L sensor 28 and the high-reflectivity member 78.

The high-reflectivity member 78 is positioned at the distance L0 of the sensitivity peak value of the L sensor 28 when, as shown in FIG. 5, no film 7 exists in the space between the L sensor 28 and the high-reflectivity member 78, for example at the time when film rewind processing is completed.

Hence on receiving the photocurrent I0 output from the phototransistor 71 of the L sensor 28, the film leader detection circuit 32 outputs a voltage corresponding to this value I0 to the control circuit 21. In the control circuit 21, this voltage is A/D converted, and a value (the voltage value corresponding to the photocurrent Ith) is calculated adding a prescribed margin to the result thus obtained, sets this value as the threshold, and stores the value in the EEPROM 62. Subsequently, until the next film rewind processing ends, this threshold value is used as the peak value. Thus when no film 7 exists in the space between the L sensor 28 and the high-reflectivity member 78, for purposes of control, this threshold value is set such that the output level of the L sensor 28 is judged to be at high (Hi) level.

On the other hand, when film 7 intervenes in the space between the L sensor 28 and the high-reflectivity member 78, for example during execution of a film feed operation, film 7 is positioned in the space between the L sensor 28 and the high-reflectivity member 78. Hence the photocurrent corresponding to the distance L1 between the L sensor 28 and the film 7 is indicated by the symbol I1. As shown in FIG. 5, this photocurrent value I1 is considerably lower than the above-described current Ith. Hence in this case, for purposes of control, this threshold value is set such that the output level of the L sensor 28 is judged to be at low (Lo) level.

In this way, when a film rewind operation is completed, that is, when film 7 does not intervene in the space between the L sensor 28 and the high-reflectivity member 78, the judgment level of the L sensor 28 is adjusted with reference to the high-reflectivity member 78. That is, each time film rewinding is performed, the judgment level of the L sensor 28 is set, so that aging, degradation in sensitivity, and other changes in the L sensor 28 can be accommodated.

The reflectivity of the base surface of the film 7 normally differs somewhat depending on the film manufacturer, brand, and other details; however, through the above-described means the judgment level of the L sensor 28 is adjusted, so that the film 7 can always be reliably detected.

The details of the configuration and action of the L sensor 28, and judgment level adjustment and other processing, are entirely similar for the P sensor 29 provided to detect perforations in the film 7. The advantageous results thus obtained are also entirely similar.

Returning to FIG. 2, the P sensor 29 is a reflection-type optical sensor which, like the above-described L sensor 28, comprises a photoreflector or similar. The output of this P sensor 29 is transmitted to the control circuit 21 via the perforation detection circuit 33. On receiving this, the control circuit 21 acquires information on feeding of the film 7.

The M sensor 30 is a facing-type photosensor comprising a photointerruptor or similar. This M sensor 30 is positioned so as to enclose a rotating member 31a (not shown in FIG. 2; See; FIG. 6) having a combtooth-shape slit portion, fixed in the driving shaft 23a of the motor 23. By this means, rotation of the motor 23 is output as a change in quantity of light. The output of this M sensor 30 is transmitted to the control circuit 21 via the motor rotation detection circuit 34. On receiving this, the control circuit 21 acquires information on the rotation speed, rotation amount, and various other data for the motor 23.

FIG. 6 is an enlarged perspective view of principal parts, showing the drive transmission mechanism in the film feed device of the camera 1.

The motor 23 which is the driving source of the film feed device is, as described above, placed within the spool shaft 22. A pinion gear 23b has been fixed in place, using press-fitting or other means, at one end of the drive shaft 23a of this motor 23. On the other end of the same drive shaft 23a has been fixed in place, using press-fitting or other means a rotating member 31a.

The rotating member 31a is placed in a prescribed position, so as to be enclosed by the above-described M sensor 30. By this means the M sensor 30 detects the slit portion of the rotating member 31a, and so can detect the rotation of the motor 23.

The pinion gear 23b meshes with a flat gear 42. A gear train is formed with this flat gear 42 at one end; this gear train is linked to a spool gear 22a formed integrally with the spool shaft 22, a fork gear 25a formed integrally with the fork member 25, and a sprocket gear 9a formed integrally with the sprocket 9. Hence the rotational driving force of the motor 23 is transmitted to the spool shaft 22 or the fork member 25 or the sprocket 9 as necessary via this gear train, and can freely drive these members in rotational motion.

The above-described gear train is configured to form three drive transmission paths, as follows: a drive transmission path which performs film rewind operations, a drive transmission path for feeding film to a prescribed position, and a a drive transmission path for normal film feeding.

This gear train comprises the pinion gear 23b, fixed in place on the drive shaft 23a of the motor 23; the flat gear 42, which meshes with this pinion gear 23b and is the end gear; a double gear 43, in which are integrally formed a large gear which meshes with the flat gear 42, and a small gear which meshes with a sun gear 44, described below; a sun gear 44, which meshes with the small gear of the double gear 43; a planetary gear 45, which meshes with this sun gear 44; an arm member 44a, which links the sun gear 44 and the planetary gear 45; a flat gear 46 and a flat gear 48, which mesh with the planetary gear 45 when the same is in a prescribed position; a flat gear 47, which meshes with this flat gear 46; a fork gear 25a, which meshes with this flat gear 47; a double gear 49, in which are formed integrally a large gear which meshes with the flat gear 48, and a small gear which meshes with a flat gear 50, described below; a flat gear 50, which meshes with the small gear of this double gear 49; a flat gear 51, which meshes with this flat gear 50; a spool gear 22a, which meshes with this flat gear 51; a flat gear 55, which meshes with the above flat gear 48; a flat gear 52, which is linked via a one-way clutch 56 with the flat gear 55; a flat gear 53 which meshes with this flat gear 52; and a sprocket gear 9a which meshes with this flat gear 54.

If for example the drive shaft 23a (pinion gear 23b) of the motor 23 rotates in the clockwise direction (CW1 direction) shown in FIG. 6, then the rotational driving force of the motor 23 is transmitted along the following paths. That is, the rotational driving force of the motor 23 is transmitted from the pinion gear 23b via the flat gear 42 and double gear 43 to the sun gear 44, so that the sun gear 44 is rotated in the counterclockwise direction (CCW1 direction) of FIG. 6. As a result, the planetary gear 45, which is linked with the sun gear 44 via the arm member 44a, revolves around the sun gear 44 in the counterclockwise direction, while rotating in the clockwise direction, to mesh with the flat gear 46. The rotational driving force of the motor 23 is further transmitted, via the flat gear 47 meshed with this flat gear 46, to rotate the fork gear 25a of the fork member 25 in the counterclockwise direction, that is, in the direction indicated by "REWIND" in FIG. 6. By this means, the fork member 25 also rotates in the same direction. This fork member 25 is, as described above, joined in mating fashion with the key slot 11a of the takeup shaft 11 of the film magazine 2. Hence when the fork member 25 rotates in the "REWIND" direction, the takeup shaft 11 also rotates in the same direction. As a result, the film 7 is rewound into the film magazine 2. This is the drive transmission path during film rewinding.

When the drive shaft 23a (pinion gear 23b) of the motor 23 is rotated in the counterclockwise direction (CCW2 direction) as shown in FIG. 6, the rotational driving force of the motor 23 is similarly transmitted from the pinion gear 23b to the sun gear 44 via the flat gear 42 and double gear 43. In this case, the sun gear 44 rotates in the clockwise direction (CW2 direction). The planetary gear 45 linked with the sun gear 44 via the arm member 44a then revolves around the sun gear 44 in the clockwise direction, while rotating in the counterclockwise direction, to mesh with the flat gear 48. The rotational driving force of the motor 23 is then transmitted from this flat gear 48 to the double gear 49 and the flat gear 52. The rotational driving force of the motor 23, thus transmitted to the side of the double gear 49, causes the spool gear 22a of the spool shaft 22 to rotate in the clockwise direction, that is, in the film winding direction indicated by "WIND" in FIG. 6, via the flat gear 50 and the flat gear 51. The spool shaft is thereby rotated in the same direction. On the other hand, the rotational driving force of the motor 23, thus transmitted to the flat gear 52, causes the sprocket gear 9a of the sprocket 9 to rotate in the clockwise direction, that is, in the film feeding direction indicated by "WIND" in FIG. 6, via the flat gear 53 and the flat gear 54. By this means, the sprocket 9 also rotates in the same direction. This is the drive transmission path during film winding operations and during film feeding operations.

In this case, in the film feed device of the camera 1 of this aspect, the feeding speed when taking up the film 7 by means of the spool shaft 22 is set to be faster than the feeding speed when feeding the film 7 by means of the sprocket 9.

In other words, the film 7 housed within the film magazine 2 loaded into the magazine chamber 3 of the camera 1 is sent toward the spool chamber 24 by the sprocket 9. When the leader 7b of the film 7 reaches the inside of the spool chamber 24, the film 7 is taken up on the outer periphery of the spool shaft 22. From this moment on, the film 7 is then taken up by the spool shaft 22. At this time the sprocket 9 is joined in mating fashion with the perforations 7a of the film 7, so that the action causes the sprocket 9 to rotate.

Similarly to the initial operation to feed the film 7, when a driving force is supplied to the sprocket 9, the operation to take up (wind) film 7 by the spool shaft 22 becomes a load. Hence in the film feed device, the action of the one-way clutch 56 positioned between the flat gear 52 and the flat gear 55 causes the drive transmission path to the side of the sprocket 9 to be interrupted. As a result, the sprocket 9 follows the action to take up (wind) the film 7 onto the spool shaft 22.

This aspect has been explained using a sprocket 9 as an example of the feeding means to feed the film 7 to the side of the spool chamber 24 as described above. By forming this sprocket 9 to comprise a plurality of detents 9b, and joining these detents 9b in mating fashion with the perforations 7a, feeding (letting-out) of the film 7 is performed.

However, the feeding means of this aspect is not thus limited; for example, a roller member or similar, with a rubber member or similar fixed in place on the outer periphery, can be used to obtain an advantageous result entirely similar to that of the sprocket 9 described above. That is, when the feeding means is configured using such a roller member, the film 7 can be fed by means of the friction force of the rubber member, and so the film 7 can be smoothly sent in the direction of the spool chamber 24.

The action of the film feed device in a camera 1 of this aspect, configured as described above, is explained below.

Figure 7:
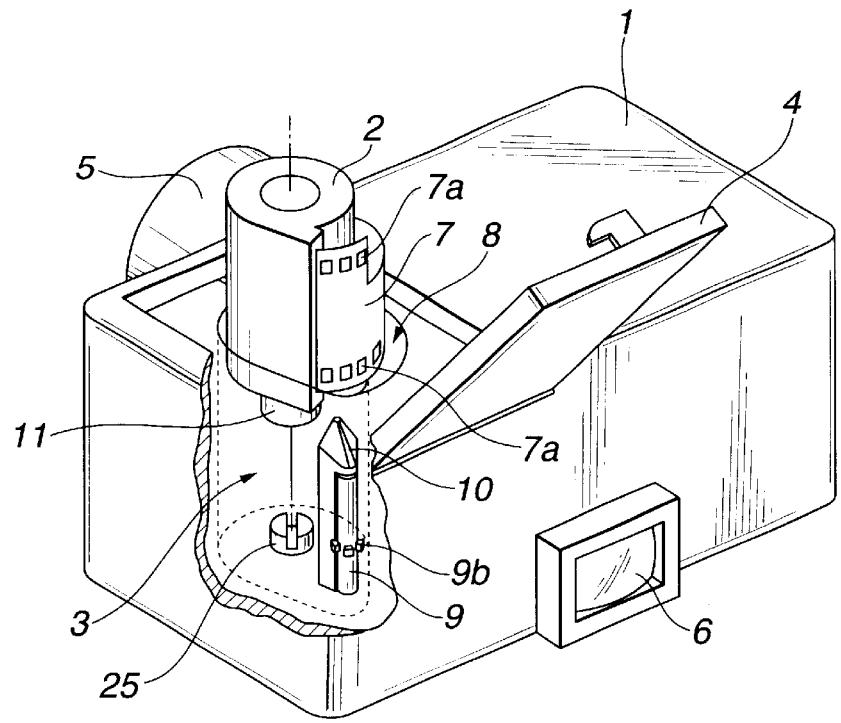
FIG. 7 is a perspective view showing the camera of FIG. 1 and a film magazine being loaded into the same, and showing chronologically the series of actions when loading the film magazine into the magazine chamber of the camera.
Figure 8:
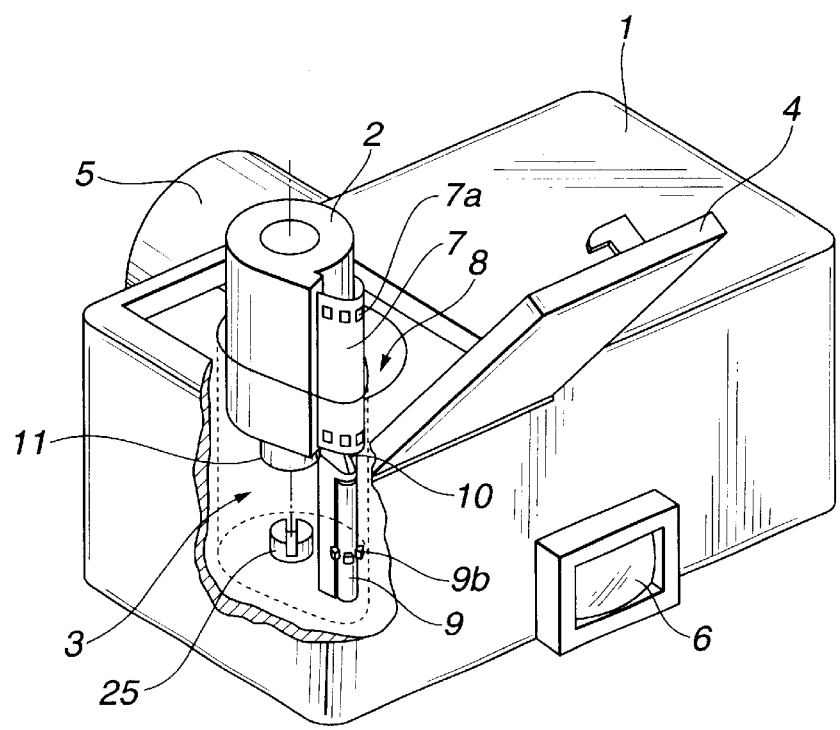
FIG. 8 is a perspective view showing the camera of FIG. 1 and a film magazine being loaded into the same, and showing chronologically the series of actions when loading the film magazine into the magazine chamber of the camera.
Figure 9:
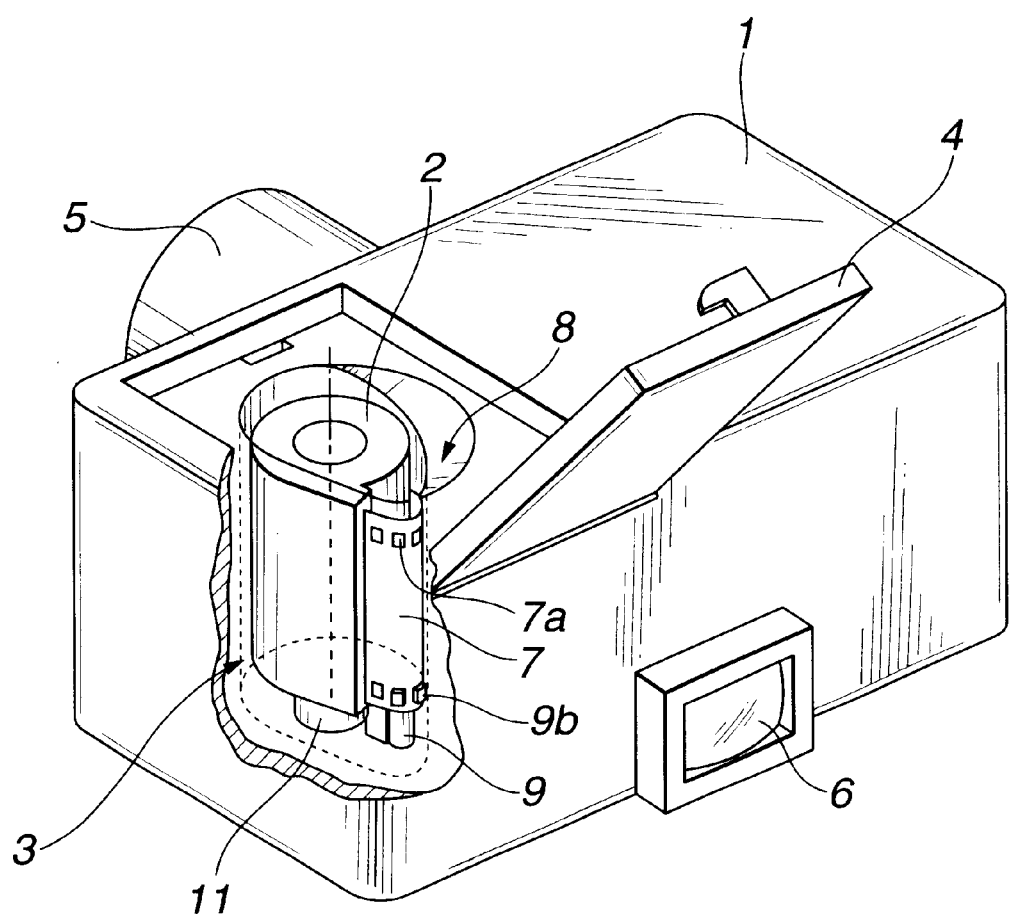
FIG. 9 is a perspective view showing the camera of FIG. 1 and a film magazine being loaded into the same, and showing chronologically the series of actions when loading the film magazine into the magazine chamber of the camera.

The action upon loading a film magazine 2 into the magazine chamber 3 of the camera 1 of this aspect is as follows. FIGS. 7, 8 and 9 are perspective views showing the camera 1 and a film magazine 2 being loaded into the same, and show chronologically the series of operations when the film magazine 2 is loaded into the magazine chamber 3. Of these, FIG. 7 shows the state in which insertion of the film magazine 2 into the opening 8 has begun. FIG. 8 shows insertion to some extent of the film magazine 2 into the magazine chamber 3; a state is shown in which the film leader 7b protruding out from the inside of the film magazine 2 is being guided by the film guide member 10. And, FIG. 9 shows the state in which the film magazine 2 has been loaded into the magazine chamber 3.

When loading a film magazine 2 into the magazine chamber 3 of the camera 1, first the magazine chamber lid 4 is put into the open state, shown in FIG. 7. When the magazine chamber lid 4 is in the closed state, it is latched to the main unit of the camera 1 by means of a prescribed lock mechanism. In order to change this to the open state, this lock mechanism is released by prescribed means.

With the magazine chamber lid 4 in the open state as shown in FIG. 7, the film magazine 2 is inserted into the magazine chamber 3 from the opening 8. Here, the film magazine 2 is inserted in the normal state as when obtained, for example by purchasing. Specifically, the normal state of the film magazine 2 is such that, as shown in FIG. 1, the roll-shape film 7 is housed inside, wound about the takeup shaft 11, and part of the tip portion of this film 7, that is, the leader 7b, protrudes out from the feeding opening 2a of the film magazine 2.

When the film magazine 2 is inserted into the magazine chamber 3 from the opening 8, if the amount of protrusion of the leader 7b of the film 7 is large, the leader 7b may become caught on the opening 8. In such a case, if for example the leader 7b is aligned with the outer periphery surface of the film magazine 2, the film magazine 2 can be smoothly inserted into the magazine chamber 3 from the opening 8.

Next, when the film magazine 2 is pressed into the magazine chamber 3, the leader 7b is guided to a prescribed position by the film guide member 10, that is, is guided to the space between the inner wall of the magazine chamber 3 and the film guide member 10 and sprocket 9, as shown in FIG. 8.

When the film magazine 2 is pressed into the magazine chamber 3, the perforations 7a of the film 7 are placed in positions such that detents 9b of the sprocket 9 faces the perforations 7a of the film 7, as shown in FIG. 9. At this time, the sprocket 9 is in a freely rotatable state, with no load applied. Hence the perforations 7a are easily joined in mating fashion with the detents 9b of the sprocket 9.

Simultaneously with this, the key slot 11a of the takeup shaft 11 joins in mating fashion with the fork member 25 in the interior of the magazine chamber 3. The fork member 25 is also in a freely rotatable state, and the key slot 11a of the takeup shaft 11 can easily join in mating fashion with the fork member 25.

In this way, the film magazine 2 is placed in a state of being completely housed within the magazine chamber 3. The user then puts the magazine chamber lid 4 into the closed state. With this, the operation of loading the film magazine 2 is completed.

Next, a summary of the action within the camera 1 of this aspect is as follows. The film magazine 2 is loaded into the magazine chamber 3 of the camera 1 by the procedure described above, and when the magazine chamber lid 4 is put into the closed state by the user, the control circuit 21 drives the motor 23 via the film feed circuit 31, and so operates the film feed mechanism comprising the gear train and similar linked with the motor 23. This operation is called the initial film feed operation, or initial loading.

The operation performed within the film feed device of the camera 1 of this aspect during initial loading is as follows. FIGS. 10A, 10B, 10C and 10D are schematic diagrams showing chronologically the series of actions upon execution of initial loading in the film feed device of the camera 1.

This initial loading is initiated, for example, when the control circuit 21 receives the signal of BKSW 38 appearing when a film magazine 2 is loaded into the magazine chamber 3 and the magazine chamber lid 4 is put into the closed state.

Figure 10:
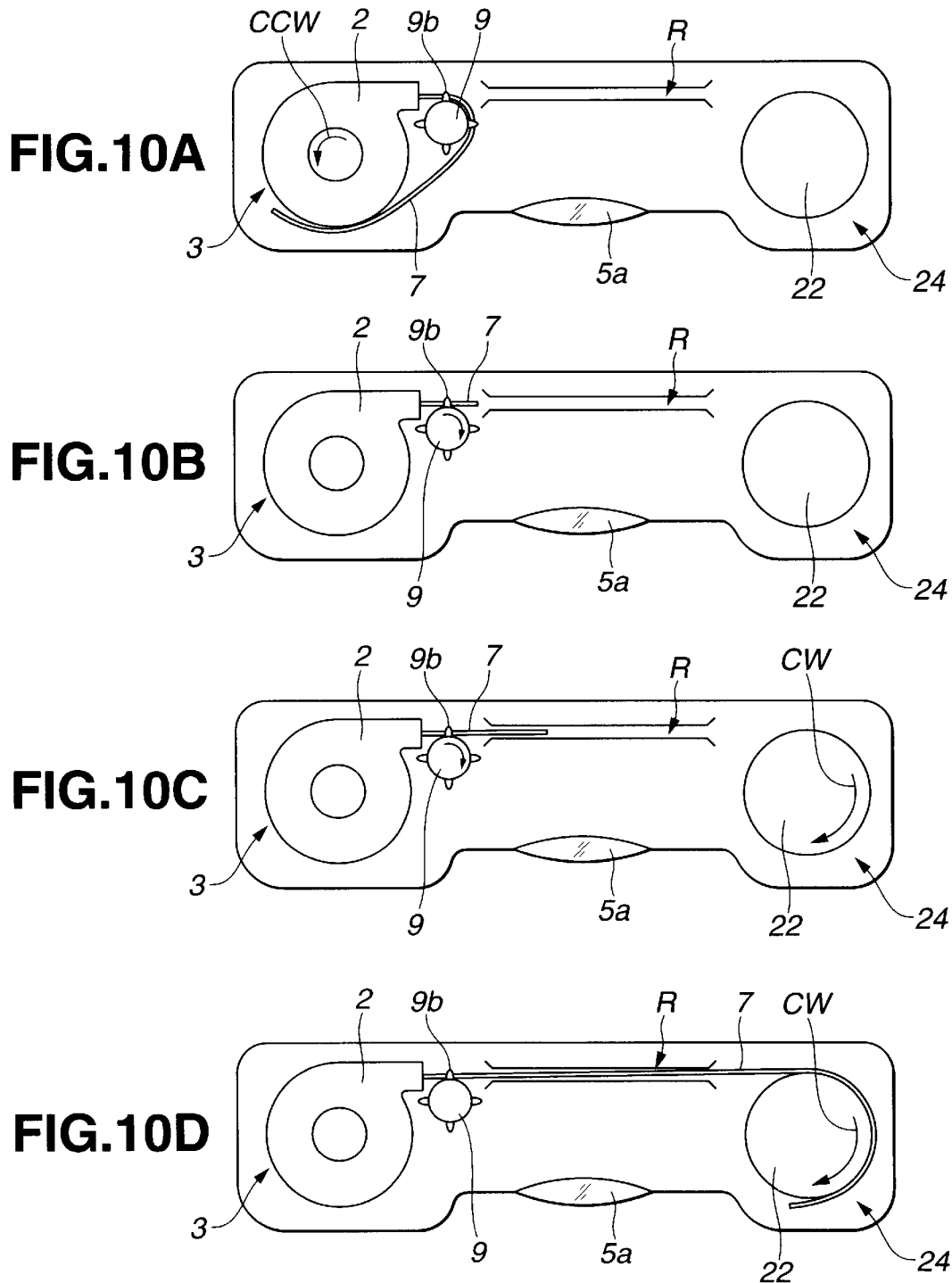
FIG. 10A, FIG. 10B, FIG. 10C, and FIG. 10D are schematic diagrams showing chronologically the series of actions upon execution of initial loading in the film feed device of the camera of FIG. 1.

The state shown in FIG. 10A is the state immediately after loading of the film magazine 2 into the magazine chamber 3. In this state, as described above, the leader 7b of the film 7 protrudes outside the film magazine 2, and is placed along the outer periphery surface of the film magazine 2. Further, the perforations 7a (not shown in FIG. 10A to FIG. 10D) of the film 7 are joined in mating fashion to detents 9b of the sprocket 9.

In this state, when initial loading is executed, first the control circuit 21 performs rewinding of the film 7. That is, the control circuit 21 rotationally drives the motor 23 in a prescribed direction via the film feed circuit 31. The driving force of the motor 23 causes the fork member 25 to rotate via the drive transmission mechanism (See; FIG. 6), and the driving force is transmitted to the takeup shaft 11, joined in mating fashion with the fork member 25, of the film magazine 2. By this means, the takeup shaft 11 rotates in the counterclockwise direction (symbol "CCW") in FIG. 10A, and the film 7 is rewound within the film magazine 2. At this time, the film 7 is detected by the L sensor 28 or other prescribed means, and when the tip of the leader 7b is placed at a prescribed position within the camera 1, the operation of rewinding the film 7 is stopped (as described in detail below). The state at this time is shown in FIG. 10B.

In the state of FIG. 10B, the operation to feed the film 7 is executed. That is, the control circuit 21 rotationally drives the motor 23 via the film feed circuit 31. By this means, the sprocket 9 is driven in the direction to feed the film 7 within the film magazine 2 from the side of the magazine chamber 3 toward the spool chamber 24 (in the clockwise direction indicated by the symbol "CW" in FIG. 10B and FIG. 10C). Then, as shown in FIG. 10C, the film 7 is sent through the prescribed feeding path R within the camera 1.

After the film 7 has passed through the latter part of the film feed path R behind the photographing aperture (not shown) positioned behind the photographing lens 5a, the tip of the leader 7b reaches the outer periphery surface of the spool shaft 22 within the spool chamber 24. This spool shaft 22 begins rotation in the clockwise direction, indicated by the symbol "CW" in FIG. 10C, simultaneously with the start of this feeding operation. Hence the film 7 is wound onto the outer periphery surface of the spool shaft 22 as shown in FIG. 10D, and by this means the operation to take up the film 7 is initiated. After this takeup operation has been performed for a prescribed amount of film feeding, the film 7 is stopped under the control of the control circuit 21. In this way, the first frame of the film 7 is positioned in the prescribed imaging position, and photographing preparations are completed. The operations up to this point are performed through initial loading.

In the film feed device of this camera 1, each time an photographing operation for one frame is completed, an operation is executed to wind one frame's worth of the film 7. After the end of the photographing operation for the final frame, that is, after the end of the stipulated number of photographing operations of the film 7, the control circuit 21 drives and controls the prescribed film feed mechanism, rotating the fork member 25 in the prescribed direction, and executing film rewinding in order to rewind the film 7 into the film magazine 2.

After the initiation of an photographing operation, before the end of the stipulated number of photographing operations for the film 7, if the midway-rewind button (not shown) is turned on by the user, an interrupt instruction is issued by the rewind switch (RWSW) 41 in response to this. In this case, the control circuit 21 drives and controls the prescribed film feed mechanism to rotate the fork member 25 in the prescribed direction, and immediately executes rewinding of the film 7.

Figure 11:
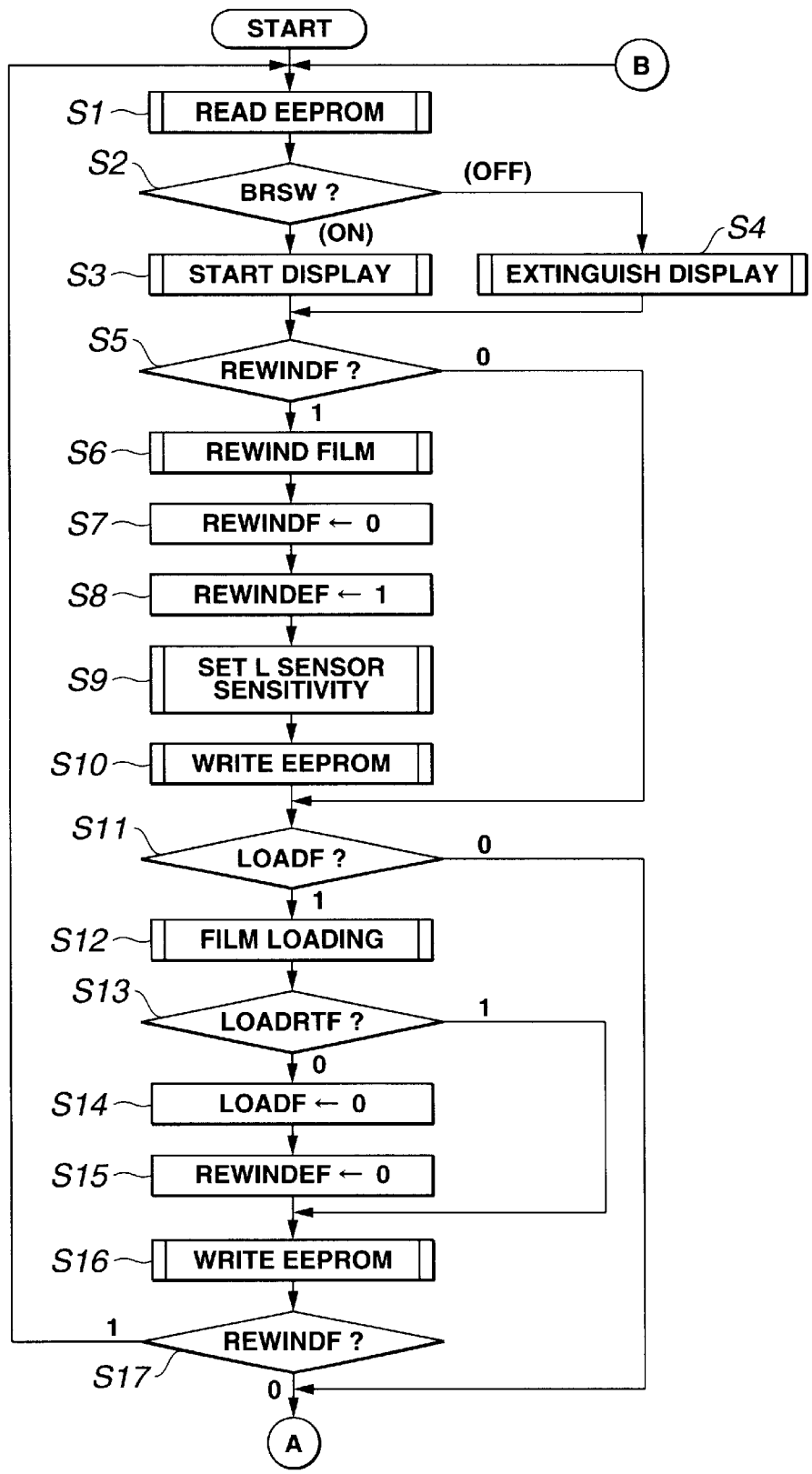
FIG. 11 is a flowchart showing the flow of basic actions in the camera of FIG. 1.
Figure 12:
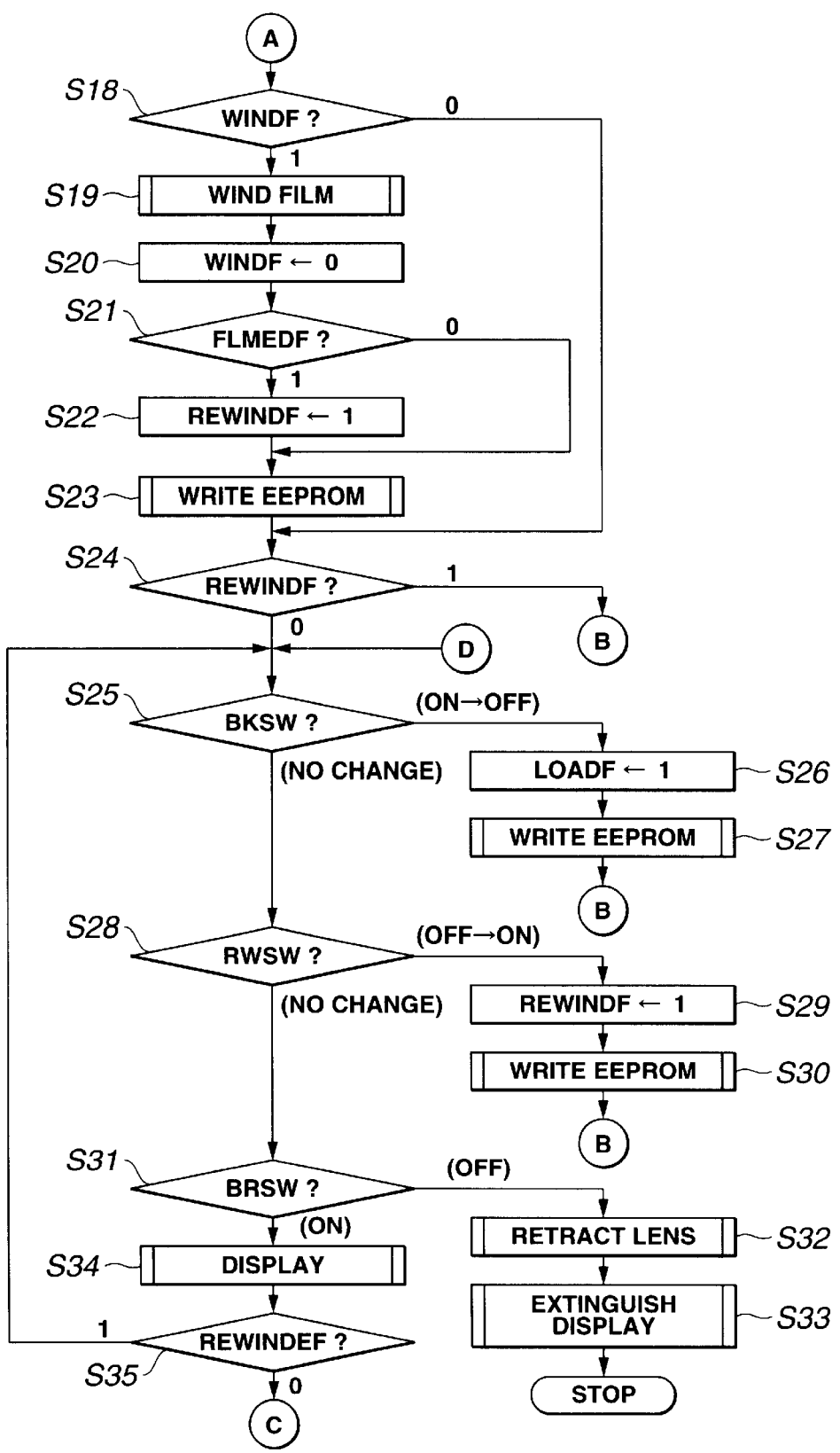
FIG. 12 is a flowchart showing the flow of basic actions in the camera of FIG. 1.
Figure 13:
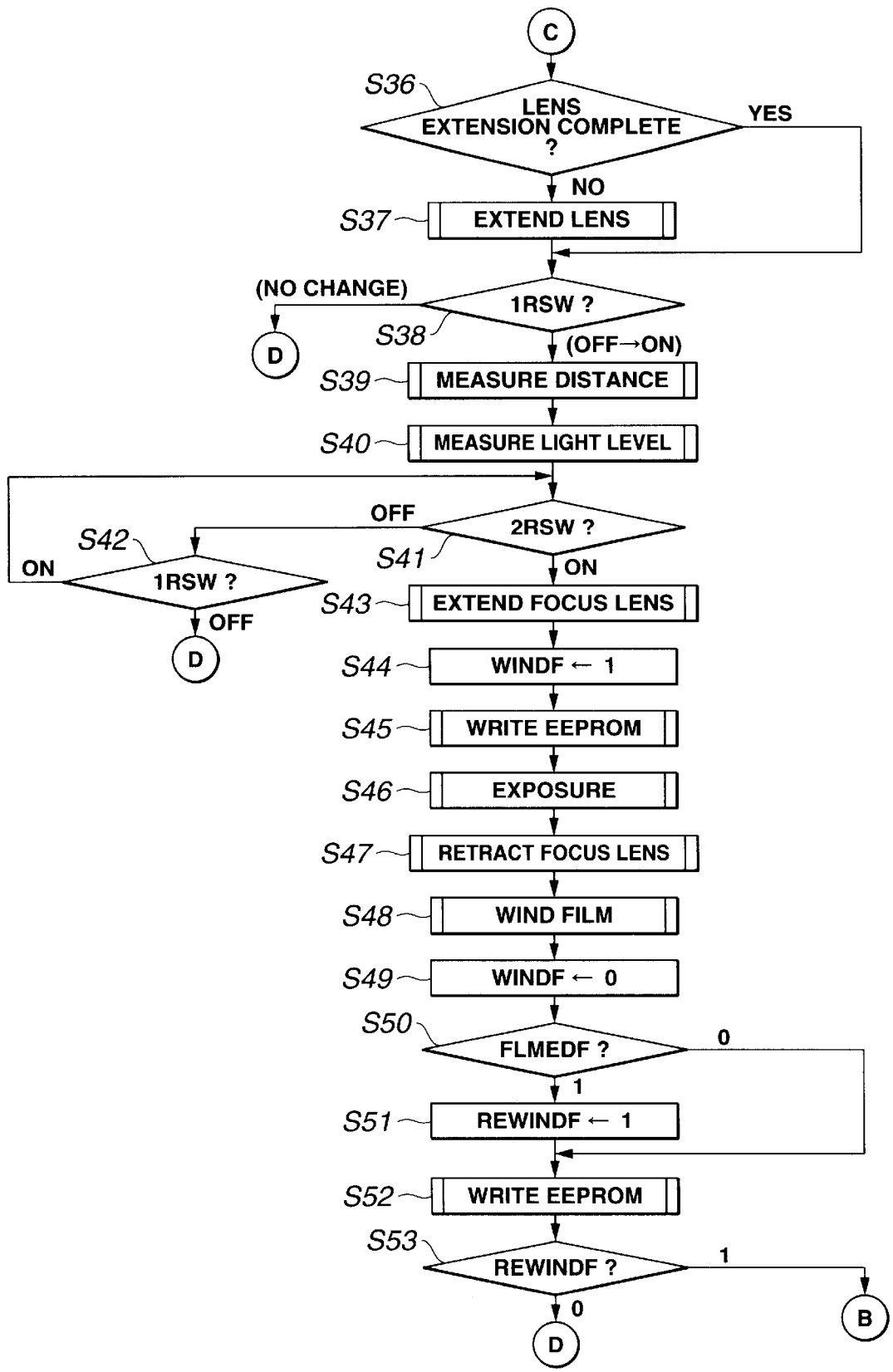
FIG. 13 is a flowchart showing the flow of basic actions in the camera of FIG. 1.

FIGS. 11, 12 and 13 are flowcharts showing the basic operations in the camera 1.

When batteries are loaded into the camera 1, or in a state in which the main power supply batteries (not shown) are loaded into a prescribed position within the camera 1, when a prescribed operation is performed by the user, and one of the switches BRSW 37, BKSW 38, or RWSW 41 issues an instruction signal in response, the control circuit 21 receives this signal and executes a program stored in advance in the ROM of the control circuit 21 ("Start" in the flowchart of FIG. 11). As a result, operation of the camera 1 is initiated.

When, as described above, a program stored in ROM in the control circuit 21 of the camera 1 is started, in step S1 shown in FIG. 11 the control circuit 21 reads the prescribed data from nonvolatile memory 62, and performs processing to expand this in its own internal RAM. Here the data read from nonvolatile memory 62 may, for example, be the following:

A flag "REWINDF" instructing execution of an operation to rewind the film 7
A flag "REWINDEF" indicating that the operation to rewind the film 7 has ended
A flag "LOADF" instructing execution of an operation to feed the film 7 (film loading)
A flag "LOADRTF" instruction a retry of an operation to feed the film 7 (film loading) in the event that an operation to feed the film 7 has failed
A flag "LOADERF" indicating that an operation to feed the film 7 (film loading) has completely failed
A flag "WINDF" instructing an operation to wind one frame's worth of film 7
Judgment level for the L sensor 28

Next, in step S2, the control circuit 21 checks the state of BRSW 37, input via the switch input circuit 36. If it is ascertained that BRSW 37 is in the on state, processing proceeds to the next step S3. If it is ascertained that BRSW 37 is in the off state, processing proceeds to step S4.

In the processing of the above step S2, if it is ascertained that BRSW 37 is in the on state and processing proceeds to step S3, then in step S3, the control circuit 21 instructs the display circuit 61 to initiate display. On receiving this instruction, the display circuit 61 executes display operation through the display means (the liquid crystal display unit 26 and LED 27). Then, processing proceeds to step S5.

On the other hand, if it is ascertained in the above step S2 that BRSW 37 is in the off state, and processing proceeds to step S4, then in step S4, the control circuit 21 instructs the display circuit 61 to extinguish the display. On receiving this instruction, the display circuit 61 executes display extinction processing of the display means (the liquid crystal display unit 26 and LED 27). Then, processing proceeds to step S5.

In step S5, the control circuit 21 checks the flag "REWINDF". If the flag "REWINDF"=0, then processing proceeds to step S11. If the flag "REWINDF"=1, then processing proceeds to the next step S6.

Figure 14:
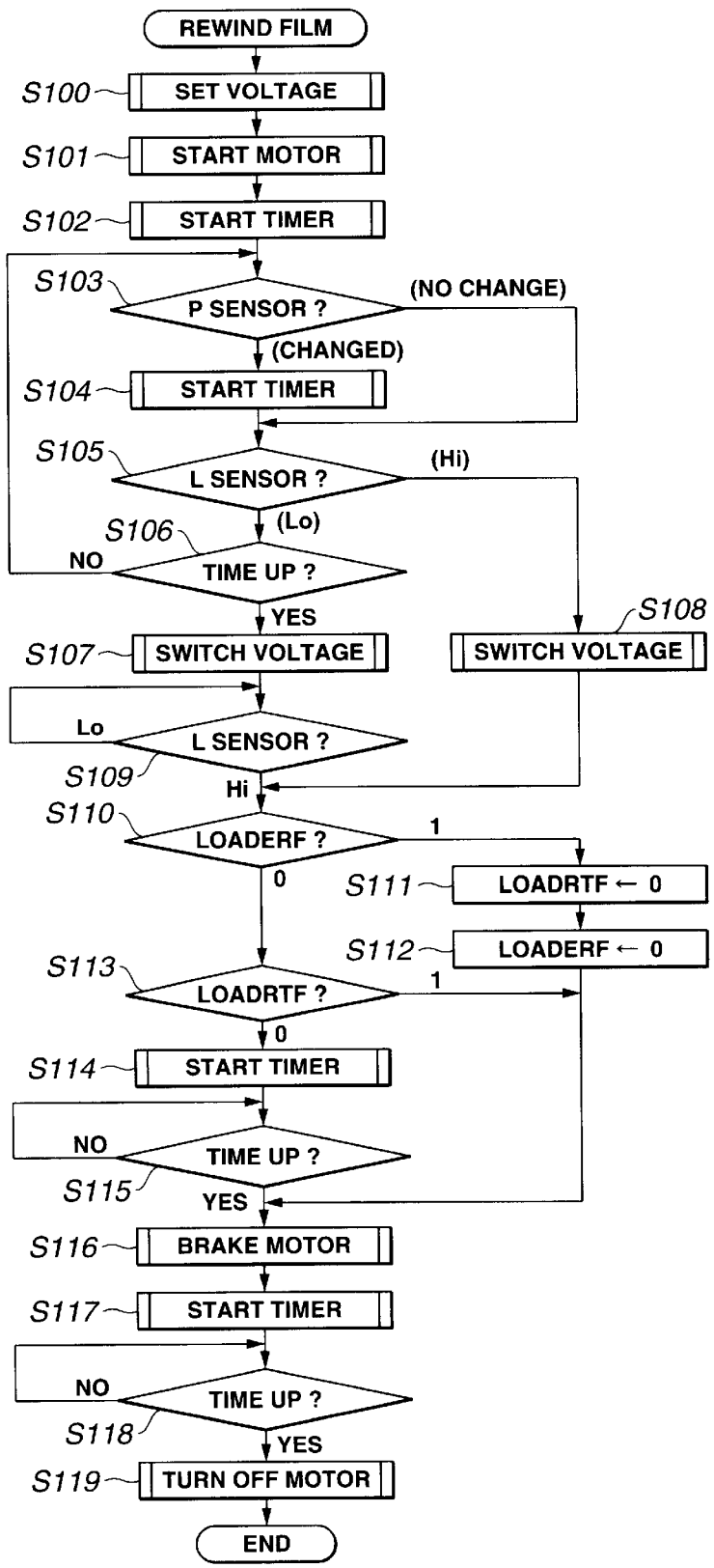
FIG. 14 is a flowchart showing the flow of film rewind processing in the film feed device of the camera of FIG. 1.

In step S6, the control circuit 21 executes processing to rewind the film 7 (hereafter called "film rewind processing"). The details of this film rewind processing are described below (See; FIG. 14). Then processing proceeds to step S7.

In step S7, the control circuit 21 initializes (clears) the flag "REWINDF". Then processing proceeds to step S8.

In step S8, the control circuit 21 sets the flag "REWINDEF". Then processing proceeds to step S9.

In step S9, the control circuit 21 executes sensitivity setting of the L sensor 28, via the film leader detection circuit 32. This L sensor sensitivity setting is performed as follows. The control circuit 21 checks the output level of the L sensor 28 via the film leader detection circuit 32, and based on this computes the judgment level, and also sets this judgment level to the threshold value of the L sensor 28. Details of this L sensor sensitivity setting were previously explained referring to FIG. 5. Next, processing proceeds to step S10.

In step S10, the control circuit 21 stores each of the currently set flags, the sensitivity data for the L sensor 28 set in the above step S9, and other data in nonvolatile memory 62. Then processing proceeds to step S11.

The processing performed here is performed in consideration of the fact that, if for example the user removes the main power supply batteries from the camera 1, the various data set in the RAM of the control circuit 21 is lost.

That is, as described above the control circuit 21 performs processing to store current data settings in nonvolatile memory 62, so that even in the event that the various data settings in the RAM of the control circuit 21 are lost, the same data settings are retained in nonvolatile memory 62. Hence when main power supply batteries are again loaded into the camera 1, simply by reading the various data settings from nonvolatile memory 62, the control circuit 21 can return the camera 1 to its previous state, and operations can continue to be executed.

In step S11, the control circuit 21 checks the flag "LOADF". If it is ascertained that the flag "LOADF"=0, processing proceeds to step S18. If it is ascertained that the flag "LOADF"=1, processing proceeds to the next step S12.

In step S12, the control circuit 21 executes the operation to feed the film 7 (film loading). Details of this film loading are described below. Then processing proceeds to step S13.

In step S13, the control circuit 21 checks the flag "LOADRTF". If it is ascertained that the flag "LOADRTF"=

1, processing proceeds to step S16. If it is ascertained that the flag "LOADRTF"=0, processing proceeds to the next step S14.

In step S14, the control circuit 21 initializes (clears) the flag "LOADF". Then processing proceeds to step S15.

In step S15, the control circuit 21 initializes (clears) the flag "REWINDEF". Then processing proceeds to step S16.

In step S16, the control circuit 21 stores the settings for the various flags and similar in nonvolatile memory 62. Then processing proceeds to step S17.

In step S17, the control circuit 21 checks the flag "REWINDF". If it is ascertained that the flag "REWINDF"=1, processing returns to the above step S1, and the subsequent processing is repeated.

The flag "REWINDF"=1 occurs when, in the above step S12, that is, in the film loading described below, the operation to feed the film 7 fails.

That is, in step S17, if it is ascertained that the flag "REWINDF"=1, then it is judged that the operation to feed the film 7 in the film loading of step S12 has failed, and processing returns to the above step S1. In step S5, the control circuit 21 checks the flag "REWINDF". In this case, the flag "REWINDF"=1, and so processing proceeds to the next step S6, and in this step S6 the operation to rewind the film 7 is executed. The following are cases in which it is anticipated that the film rewind processing described here would be performed:

1. Rewind processing performed in advance of a retry of an operation to feed the film 7, following failure of the film loading of step S12
2. Rewind processing performed in order to put the film magazine 2 into a state in which it can be removed from the magazine chamber 3, in the event of failure of a film loading retry On the other hand, in the above step S17, if the control circuit 21 ascertains that the flag "REWINDF"=0, processing proceeds to step S18 of FIG. 12 (symbol "A" in FIGS. 11 and 12).

In step S18 of FIG. 12, the control circuit 21 checks the flag "WINDF". If it is ascertained that the flag "WINDF"=0, processing proceeds to step S24. If it is ascertained that the flag "WINDF"=1, processing proceeds to the next step S19.

In step S19, the control circuit 21 executes film winding. This film winding is performed after the completion of an exposure operation; the film 7 is moved one frame's worth, and the next photographing frame is set in a prescribed position within the camera 1. In this case, the amount of movement of the film 7, that is, the amount by which the film 7 is wound, is controlled by counting the number of perforations 7a of the film 7 detected by the P sensor 29. Specifically, detection of perforations 7a by the P sensor 29 is begun when the operation to wind the film 7 is started, and when the number of perforations corresponding to one frame, that is, eight perforations, are detected, control is exercised to stop movement of the film 7. This control is performed by the film feeding circuit 31, which is controlled by the control circuit 21. In this way, the P sensor 29 and film feed circuit 31 serve as detection means, whereby the perforations 7a in the film 7 are detected under control of the control circuit 21, and by measuring the number of perforations, the amount of movement of the film 7 can be detected.

At this time, if eight perforations have not been detected in a prescribed time from the start of winding of the film 7, it is judged that the film end part (hereafter called the "film end") of the film 7 has been reached. In this case, the control circuit 21 sets a flag "FLMEDF" indicating that the film end has been detected, and a series of processing is ended. Processing then proceeds to step S20. Hence the control circuit 21, P sensor 29, and perforation detection circuit 33 serve as end detection means to detect the film end.

In step S20, the control circuit 21 initializes (clears) the flag "WINDF". Then processing proceeds to step S21.

In step S21, the control circuit 21 checks the flag "FLMEDF". If it is ascertained that the flag "FLMEDF"=0, processing proceeds to step S23. If it is ascertained that the flag "FLMEDF"=1, processing proceeds to the next step S22.

In step S22, the control circuit 21 sets the flag "REWINDF". Then processing proceeds to step S23.

In step S23, the control circuit 21 stores the settings for each flag in nonvolatile memory 62. Then processing proceeds to step S24.

In step S24, the control circuit 21 checks the flag "REWINDF". If the flag "REWINDF"=1, processing returns to step S1 in FIG. 11, and subsequent processing is repeated (symbol "B" in FIGS. 11 and 12).

That is, in step S5, the control circuit 21 ascertains that the flag "REWINDF"=1, and in the next step S6, film rewinding is executed.

If the flag "REWINDF"=0, processing proceeds to the next step S25. The processing subsequent to step S25 goes into a loop processing.

In step S25, the control circuit 21 checks the state of BKSW 38, input via the switch input circuit 36. If the control circuit 21 ascertains that the output signal of BKSW 38 switches from an on signal to an off signal (ON→OFF), after the user has loaded the film magazine 2 into the magazine chamber 3, it is judged that the magazine chamber lid 4 has been put into the closed state by the user, and processing proceeds to step S26. If the control circuit 21 ascertains that there is no change in the output signal of BKSW 38, processing proceeds to step S28.

In addition to the processing of step S25, that is, ascertaining the output signal of BKSW 38 by the control circuit 21, the following processing to ascertain output may for example also be inserted. By ascertaining the output signal of the magazine detection circuit 35, the control circuit 21 judges whether or not a film magazine 2 is loaded in the magazine chamber 3. If a film magazine 2 is detected as being loaded in the magazine chamber 3, processing proceeds to step S26; if a film magazine 2 is not detected as not being loaded in the magazine chamber 3, processing proceeds to step S28. In this way, when there is no opening or closing of the magazine chamber lid 4 in a state in which no film magazine 2 is loaded in the magazine chamber 3, unnecessary operations can be avoided.

In the above step S25, as a result of checking the output signal of BKSW 38 by the control circuit 21, if it is ascertained that the output signal has changed from an on to an off signal, and processing has proceeded to step S26, then in step S26, the control circuit 21 sets the flag "LOADF". Then processing proceeds to step S27.

In step S27, the control circuit 21 stores the setting of the flag "LOADF" in nonvolatile memory 62, and processing then returns to step S1 in FIG. 11, and subsequent processing is repeated (symbol "B" in FIGS. 11 and 12). Hence in this case, in the subsequent step S11, the control circuit 21 checks the flag "LOADF", and because the flag "LOADF"=1, processing proceeds to the next step S12, and the prescribed film loading is executed.

In the above step S25, if it is ascertained by the control circuit 21 that there is no change in the output signal of BKSW 38, and processing proceeds to step S28, then in this step S28 the control circuit 21 checks the state of RWSW 41 that is input via the switch input circuit 36. If the control circuit 21 ascertains that the output signal of RWSW 41 has changed from an off to an on signal (OFF→ON), then it is judged that the user has performed a prescribed operation (not shown) to cause execution of a forced rewind operation in midway of the film 7, before the end of photographing operations through the last frame of the film 7, and processing proceeds to step S29. If the control circuit 21 ascertains that there has been no change in the output signal of RWSW 41, processing proceeds to step S31.

In the above step S28, if as a result of checking the output signal of RWSW 41 the control circuit 21 ascertains that the output signal has changed from an off to an on signal, processing proceeds to step S29, and in step S29, the control circuit 21 sets the flag "REWINDF". Then processing proceeds to step S30.

In step S30, the control circuit 21 stores the setting of the flag "REWINDF" in nonvolatile memory 62, and processing then returns to step S1 in FIG. 11, and subsequent processing is repeated (symbol "B" in FIGS. 11 and 12). Hence in the subsequent step S5, the control circuit 21 checks the flag "REWINDF", and because the result is "REWINDF"=1, processing proceeds to the next step S6, and the prescribed film rewind processing is executed.

On the other hand, if in the above step S28 the control circuit 21 ascertains that the output signal of RWSW 38 has not changed, and processing proceeds to step S31, then in this step S31 the control circuit 21 checks the state of BRSW 37 that is input via the switch input circuit 36. If the control circuit 21 ascertains that the output signal of BRSW 37 is an off signal (OFF), then processing proceeds to step S32. If the control circuit 21 ascertains that the output signal of BRSW 37 is an on signal (ON), processing proceeds to step S34.

In the above step S31, if as a result of checking the output signal of BRSW 37 the control circuit 21 ascertains that the output signal is an off signal, and processing proceeds to step S32, then in step S32 the control circuit 21 executes the prescribed retraction operation to house the photographing lens barrel 5 within the camera. This operation to retract the photographing lens barrel 5 is performed in order that the camera 1 assumes a more convenient form for carrying when not in use. In conventional compact cameras and similar equipment, this means is generally employed. The configuration and other details of this retraction operation are not directly related to this invention, and so a detailed explanation is omitted. Then, processing proceeds to step S33.

In step S33, the control circuit 21 causes display by the liquid crystal display unit 26 and other display means to be extinguished, via the display circuit 61. In order to suppress current consumption, the control circuit 21 is set to the stopped state.

If, while the control circuit 21 is in the stopped state, an interrupt signal is output from the switch input circuit 36 due to a change in the states of BRSW 37, BKSW 38 or RWSW 41, that is, due to operation of the camera 1 by the user, or if the control circuit 21 is reset as a result of removal and insertion of batteries, the control circuit 21 receives these signals and releases the stopped state, and simultaneously the control circuit 21 resumes the series of processing starting with step S1 in FIG. 11.

On the other hand, if in the above step S31 the control circuit 21 checks the output signal of the RRSW 37 and ascertains that the output signal is an on signal, so that processing proceeds to step S34, then in step S34 the control circuit 21 controls the liquid crystal display unit 26 and other display means via the display circuit 61, and updates the display of these display means. Then processing proceeds to step S35.

In step S35, the control circuit 21 checks the flag "REWINDEF". If it is ascertained that the flag "REWINDEF"=1, this indicates that the operation to rewind the film 7 is ended, and so subsequent processing for photographing operations is not executed. Hence processing returns to the above step S25, and subsequent processing is repeated (loop processing).

On the other hand, if in the above step S35 it is ascertained that the flag "REWINDEF"=0, processing proceeds to step S36 in FIG. 13.

In step S36 of FIG. 13, the control circuit 21 checks whether the photographing lens barrel 5 is in a state of preparation for photographing by using prescribed means (not shown). The check performed at this time includes, for example, checking whether the photographing lens barrel 5 is extended from the interior of the main unit of the camera 1, and whether it is in a state at a prescribed position. If it is judged by the control circuit 21 that the photographing lens barrel 5 is extended (that the lens has been extended), processing proceeds to step S38. If it is judged by the control circuit 21 that the photographing lens barrel 5 is not in the extended state, that is, that it is in the retracted state, processing proceeds to step S37.

In step S37, the control circuit 21 executes extension of the photographing lens barrel 5 using prescribed means, and moves the photographing lens barrel 5 so as to enter a state of photographing preparation, in which photographing operations can be executed. Then processing proceeds to step S38.

In step S38, the control circuit 21 checks the state of 1RSW 39 that is input via the switch input circuit 36. If the control circuit 21 ascertains that the 1RSW 39 output signal has switched from an off to an on signal (OFF→ON), it is judged that the user has operated the first stage of the shutter release button (not shown) of the camera 1, performing an operation to prepare for photographing, and processing proceeds to the next step S39. If the control circuit 21 ascertains that there has been no change in the output signal of 1RSW 39 (which remains the off signal), processing returns to step S25 in FIG. 12, and subsequent processing is repeated (symbol "D" in FIGS. 12 and 13).

In the above step S38, upon the change in the output signal of 1RSW 39 from the off to the on signal and proceeding to step S39, the control circuit 21 in step S39 controls the distance measurement means (not shown) to measure the distance to the object, and based on the measurement result computes the amount by which to extend the photographing lens barrel 5.

Following this, and substantially simultaneously with the processing of step S39, in step S40 the control circuit 21 controls the light level measurement means (not shown) to measure the brightness of the object, and based on this computes the shutter speed and the diaphragm value. Then processing proceeds to step S41.

In step S41, the control circuit 21 checks the state of 2RSW 40 that is input via the switch input circuit 36. If the output signal of 2RSW 40 is ascertained to be the on signal, it is judged that the user has operated the second stage of the shutter release button (not shown) of the camera 1 so as to execute an actual photographing operation, and processing proceeds to the next step S43. If the 2RSW 40 output signal remains off, processing proceeds to step S42.

In step S42, the control circuit 21 rechecks the state of 1RSW 39 input via the switch input circuit 36. If the output signal of 1RSW 39 continues to be the on signal, processing returns to the above step S41, and subsequent processing is repeated. If the control circuit 21 ascertains that the output signal of 1RSW 39 has changed from the on to the off signal, it is judged that the operation of the shutter release button by the user has been released, processing returns to the above step S25, and subsequent processing is repeated (symbol "D" in FIGS. 12 and 13).

In the above step S41, if the control circuit 21 ascertains that the output signal of 2RSW 40 is the on signal, and processing proceeds to the next step S43, then in this step S43 the control circuit 21 performs focus lens extension, controlling prescribed driving means (not shown) to extend the lens for focus adjustment (hereafter called the "focus lens") among the plurality of lenses held within the photographing lens barrel 5 to a prescribed position. This focus lens extension is performed based on the result of calculation in the above step S39. Then processing proceeds to step S44.

In step S44, the control circuit 21 sets the flag "WINDF". Then processing proceeds to step S45.

In step S45, the control circuit 21 stores the setting of the flag "WINDF" in nonvolatile memory 62. Then processing proceeds to step S46. Through this processing, if for example the main power supply batteries are removed from the camera 1 during the processing of step S46 and subsequent steps, that is, in the process of exposure processing or a process after exposure, when main power supply batteries are again loaded, the flag "WINDF" is set to 1. Hence in this case, the film 7 is wound by one frame's worth in the processing of steps S18 and S19 in FIG. 12 (film winding processing and similar), so that unintended double exposures can be prevented.

Next, in step S46 the control circuit 21 drives the shutter mechanism, diaphragm mechanism and similar (not shown) using prescribed means (not shown), to execute exposure of the film 7 at the prescribed position. Then processing proceeds to step S47.

In step S47, the control circuit 21 retracts the focus lens, moving it to the prescribed initial position. Then processing proceeds to step S48.

In step S48, the control circuit 21 performs film winding to wind the film 7 by one frame's worth. Completion of this film winding is awaited, and processing then proceeds to the next step S49.

In step S49, the control circuit 21 initializes (clears) the flag "WINDF", and processing then proceeds to the next step S50.

In step S50, the control circuit 21 checks the state of the flag "FILMDF" by accessing internal RAM. This flag "FILMDF" is set during the operation to wind the film 7 in the processing of the above step S48 (film winding). If the film end is detected at this time, the flag "FILMDF"=1 is held, and when winding of one frame's worth of film is completed normally, the flag "FILMDF" is initialized (cleared).

If the control circuit 21 ascertains that the flag "FILMDF"=0, processing proceeds to step S52. If the control circuit 21 ascertains that the flag "FILMDF"=1, processing proceeds to the next step S51.

In the above step S50, if the film end is detected and processing proceeds to the next step S51, then in this step S51 the control circuit 21 sets the flag "REWINDF" in order that film rewinding can be executed. Processing then proceeds to the next step S52.

In step S52, the control circuit 21 stores the setting of the flag "REWINDF" in nonvolatile memory 62. Then processing proceeds to the next step S53.

In step S53, the control circuit 21 checks the state of the flag "REWINDF" by accessing internal RAM. If the control circuit 21 ascertains that the flag "REWINDF"=1, processing returns to step S1 in FIG. 11, and subsequent processing is repeated (symbol "B" in FIGS. 11 and 13). Hence in this case, in step S5 the control circuit 21 ascertains that the flag "REWINDF"=1, and so in the next step S6 a film rewinding is executed.

If however the control circuit 21 ascertains that the flag "REWINDF"=0, processing returns to step S25 of FIG. 12, and subsequent processing is repeated (symbol "D" in FIGS. 12 and 13).

FIG. 14 is a flowchart showing the flow of rewind processing (processing corresponding to step S6 in FIG. 11) in the film feed device of the camera 1. FIGS. 15A, 15B, 15C, and 15D are timing charts showing the output signals of the L sensor 28 and P sensor 29, the changes in the voltage applied to the motor 23, the time at which the timer of the control circuit 21 is started, and other events when this film rewinding is performed.

This processing is executed in cases where a film end is detected in each of the processing of step S19 in FIG. 12 and the processing of step S48 of FIG. 13; in cases where an instruction issued by the midway-rewind operation button is detected in the processing of step S28 in FIG. 12; and in cases of failure of the operation to feed the film 7 in the film loading of step S12 in FIG. 11 (the details of this processing are described below), and in similar cases.

When film rewinding by the film feed device is begun, in step S100, the control circuit 21 controls a constant-voltage circuit provided in the film feed circuit 31 (not shown in the figure; see FIG. 2 for the film feed circuit 31) to execute voltage setting processing to set the voltage to be applied to the motor 23. This processing is performed in order to control the rewind speed of the film 7, by increasing or reducing the voltage applied to the motor 23 to control the rotation speed of the motor 23.

Next, in step S101 the control circuit 21 drives the motor 23 via the film feed circuit 31, to rotate the motor in the CW1 direction shown in FIG. 6 (the direction for rewinding the film 7) (motor start processing). At this time a high voltage is applied to the motor 23, as shown in FIG. 15A.

Next, in step S102 the control circuit 21 starts measuring time using a timer within the control circuit. This timer is used to judge whether the prescribed length of film 7 has been rewound (moving in the prescribed direction) within a prescribed time, or whether the tip of the leader 7b of the film 7 has passed through a prescribed position facing the P sensor 29. Then, processing proceeds to step S103.

In step S103, the control circuit 21 checks the state of the P sensor 29 via the perforation detection circuit 33. If there is no change in the state of the P sensor 29, processing proceeds to step S105; if a change in the state of the P sensor 29 is detected, processing proceeds to step S104. In the latter case, detection of a change in the state of the P sensor 29 means a case in which the edge of a perforation 7a of the film 7 has passed over the P sensor 29, or a case in which the tip of the leader 7b of the film has passed over the P sensor 29 (symbol "P1" in FIG. 15C).

Figure 15:
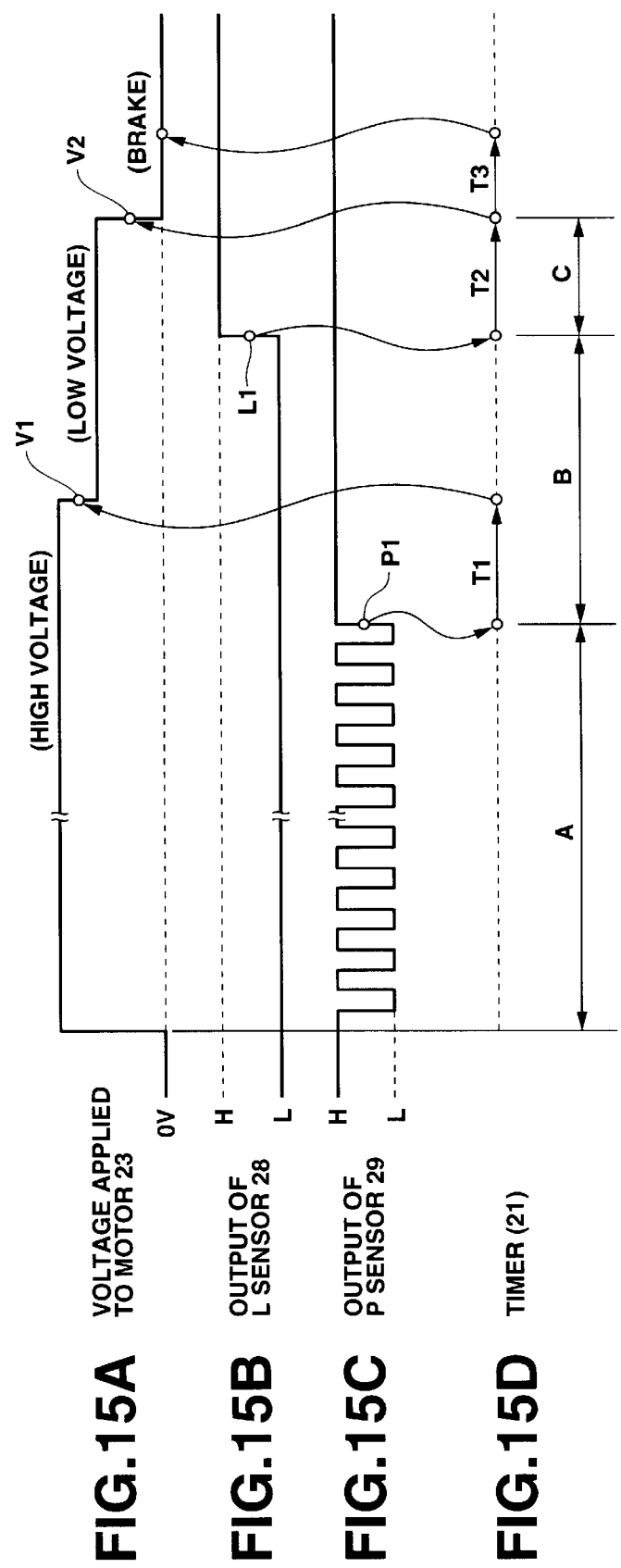
FIG. 15A, FIG. 15B, FIG. 15C, and FIG. 15D are timing charts showing the output signals from the L sensor and P sensor, the change in the voltage applied to the motor, the period in which the control circuit timer is started, and similar during the film rewind processing of FIG. 13.

In step S104, the control circuit 21 again starts time measurement using its own internal timer (symbol "T1" in FIG. 15D).

Next, in step S10 5 the control circuit 21 checks the state of the L sensor 28 via the film leader detection circuit 32. If it is ascertained that the output signal of the L sensor 28 is at high (Hi) level, it can be judged that the film 7 does not exist at the prescribed position facing the L sensor 28, that is, that the film is in a state of further advancement than the above-described latter case. Hence in this case, processing proceeds to step S108, and in step S108 the control circuit 21 executes voltage switching processing to lower the voltage applied to the motor 23. By this means, the rotation speed of the motor 23 is reduced, and so the rewind speed of the film 7 is reduced. Then processing proceeds to step S110.

On the other hand, if in the above step S105 the control circuit 21 ascertains that the output signal of the L sensor 28 is at low (Lo) level, processing proceeds to the next step S106.

In this step S106, the control circuit 21 checks its own internal timer. If a prescribed time (symbol "T1" in FIG. 15D) has not yet elapsed, and the time is not yet up, processing returns to the above step S103, and subsequent processing is repeated. If it is ascertained that the prescribed time (symbol "T1" in FIG. 15D) has elapsed and that the time is up, then processing proceeds to the next step S107. This is the case in which there has been no change in the state of the output signal of the P sensor 29 during passage of the prescribed time. That is, it can be judged that the tip of the leader 7b of the film 7 has passed the prescribed position facing the P sensor 29. Therefore, processing proceeds to the next step S107.

In step S107, voltage switching similar to the processing of the above step S108 is executed (from high voltage to low voltage; symbol "V1" in FIG. 15A). Processing then proceeds to step S109.

The voltage switching performed here is performed after the tip of the leader 7b of the film 7 has passed the prescribed position facing the P sensor 29, in order to reduce the feeding speed of the film 7 and thereby improve the positioning precision when the film 7 is stopped. Here, by further braking the motor 23, to more rapidly decelerate the rotation speed, a greater effect is achieved.

In step S109, the control circuit 21 monitors the output of the L sensor 28 via the film leader detection circuit 32, and checks whether the output signal of the L sensor 28 is at high (Hi) level or not. That is, the control circuit 21 waits until the tip of the leader 7b of the film 7 has passed the prescribed position facing the L sensor 28, and a state is entered in which the film 7 does not exist at the prescribed position facing the L sensor 28.

When the control circuit 21 detects that the output signal of the L sensor 28 has gone to high (Hi) level (symbol "L1" in FIG. 15B), processing proceeds to the next step S110, and in step S110, the control circuit 21 checks the state of the flag "LOADERF" by accessing internal RAM. The check performed here is to determine whether film rewinding is to be performed following complete failure of film loading. A case in which film loading has failed completely means a case in which, after film loading has failed, a retry operation has also failed. The flag "LOADERF" is explained in detail when film loading (the processing of step S12 in FIG. 11) is explained below.

If the control circuit 21 ascertains that the flag "LOADERF"=0, processing proceeds to the next step S113. If the control circuit 21 ascertains that the flag "LOADERF"=1, processing proceeds to step S111.

In step S111, the control circuit 21 initializes (clears) the flag "LOADRTF" which instructs retry of the film feed operation (film loading) in the event that an operation to feed the film 7 fails. Then processing proceeds to step S112.

In step S112, the control circuit 21 initializes (clears) the flag "LOADERF" which indicates complete failure of the operation to feed the film 7 (loading). Then processing proceeds to step S116.

In step S113, the control circuit 21 checks the flag "LOADRTF". If the control circuit 21 ascertains that the flag "LOADRTF"=1, processing proceeds to step S116. If the control circuit 21 ascertains that the flag "LOADRTF"=0, processing proceeds to step S114.

In step S114, the control circuit 21 starts time measurement using its own internal timer (symbol "T2" in FIG. 15D). This timer is used in order that, after the tip of the leader 7b of the film 7 has been detected by the L sensor 28 (symbol "L1" in FIG. 15B), and rewinding of the film 7 has been executed for a prescribed length of time (symbol "T2" in FIG. 15D), the film 7 is completely rewound into the film magazine 2. Then, processing proceeds to step S115.

In this case, though not shown in FIGS. 15A to 15D, if the voltage applied to the motor 23 is raised, and the rotation speed of the motor 23 is increased, it is easier still to complete film rewinding more quickly.

In step S115, the control circuit 21 monitors a prescribed elapsed time measured by the timer, and waits for a prescribed time until the film 7 is completely wound into the film magazine 2.

When the control circuit 21 judges that the prescribed elapsed time as measured by the timer has passed (the time is up), and that the film 7 has been completely wound into the film magazine 2, processing proceeds to the next step S116.

In the processing of both steps S110 and S113, if it is judged that rewinding is performed after failure of film loading, as explained above, the processing of both steps S114 and S115 are not executed. That is, in this case the film rewinding is ended in order to maintain a state in which the tip of the leader 7b of the film 7 remains outside the film magazine 2. In other words, the interval C in FIG. 15D is omitted. In this case, when the tip part of the leader 7b of the film 7 (symbol "L1" in FIG. 15B) is found, immediately afterward, the processing to stop the film 7, that is, processing to brake the motor 23 is performed.

Next, in step S116 the control circuit 21 executes motor braking processing in which the motor 23 is driven via the film feed device 31, and the brake is applied to the motor 23 (symbol "V2" in FIG. 15A). Then, processing proceeds to step S117.

In step S117, the control circuit 21 starts time measurement with the timer (timer start; symbol "T3" in FIG. 15D). This timer measures the time in order to continue applying the brake. Then, processing proceeds to step S118.

Next, in step S118 the control circuit 21 waits for a prescribed length of time while the braking continues. After the prescribed length of time has elapsed (time is up), processing proceeds to the next step S119.

In step S119, the control circuit 21 executes motor-off processing to release the voltage applied to the motor 23. As a result, the film 7 stops completely. Then, the series of film rewind operations is ended, and processing returns to the previous sequence.

At the time when film rewinding is begun, if a perforation signal is not output from the P sensor 29 (if the output level continues at the Hi level), the interval A is omitted.

Further, when film rewind processing is begun, if the film 7 is not detected by the L sensor 28 (if the output level is the Hi level), the intervals A and B in FIG. 15D are omitted. In this case, if the rewind processing is a rewinding performed after failure of film loading, the interval C is also omitted. Hence in this case, stopping is executed with no execution whatsoever of rewinding of the film 7.

Figure 16:
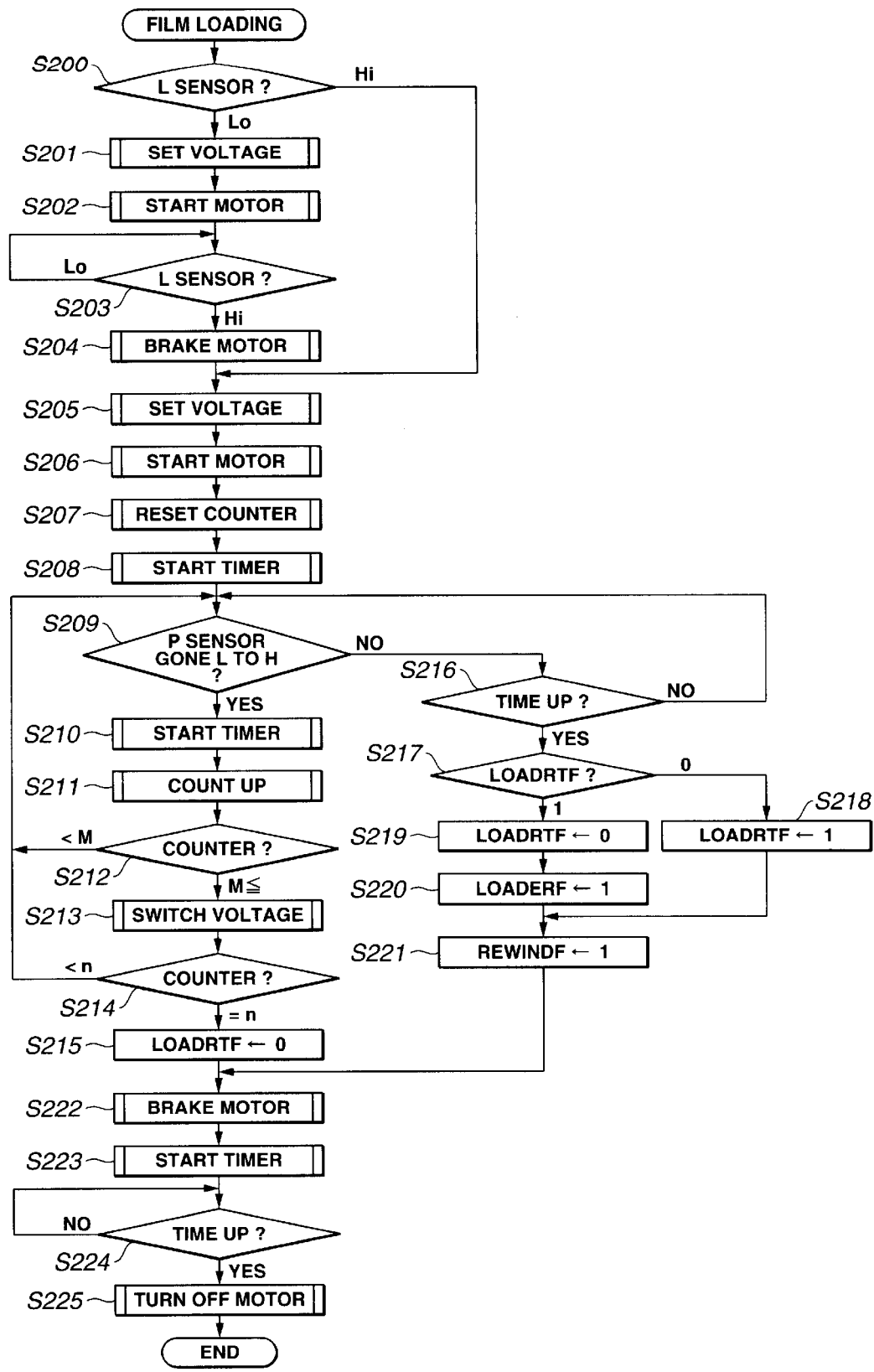
FIG. 16 is a flowchart showing the flow of film loading processing in the film feed device of the camera of FIG. 1.

FIG. 16 is a flowchart showing the flow of film loading processing (processing corresponding to step S12 in FIG.

11) in the film feed device of the camera 1. FIG. 17A, FIG. 17B, FIG. 17C, and FIG. 17D are timing charts showing the output signals from the L sensor 28 and P sensor 29, the change in the voltage applied to the motor 23, the period in which the control circuit 21 timer is started, and similar during the film loading processing.

This processing is executed in cases where, in the processing of step S25 of FIG. 12, the output signal of BKSW 38 is detected as going from the on to the off signal (ON→OFF), that is, in cases where the user loads a film magazine 2 into the magazine chamber 3 of the camera 1, and the magazine chamber lid 4 is judged to be in the closed state; and, in cases where film loading in the processing of step S12 in FIG. 11 fails and there is an instruction to retry the film loading.

When film loading of the film feed device is begun, in step S200 the control circuit 21 checks the state of the L sensor 28 via the film leader detection circuit 32. If it is ascertained that the output signal of the L sensor 28 is at high (Hi) level, it is judged that the film 7 does not exist at the prescribed position facing the L sensor 28. That is, the tip of the leader 7b of the film 7 has been rewound to the prescribed position. Hence the processing of steps S201 to S204 is omitted, and processing proceeds to step S205. Circumstances resulting in this state include, for example, the state in which a retry is performed after failure of film loading.

In the above step S200, if the control circuit 21 ascertains that the output signal of the L sensor 28 is at low (Lo) level, processing proceeds to the next step S201.

In step S201, the control circuit 21 controls the constant-voltage circuit (not specifically shown) of the film feed circuit 31 to execute voltage setting processing in order to set the voltage to be applied to the motor 23. This processing is performed in order to drive the motor 23 in low-speed rotation by reducing the voltage applied to the motor 23, and by this means to secure precision in the position at which the film 7 is stopped.

Figure 17:
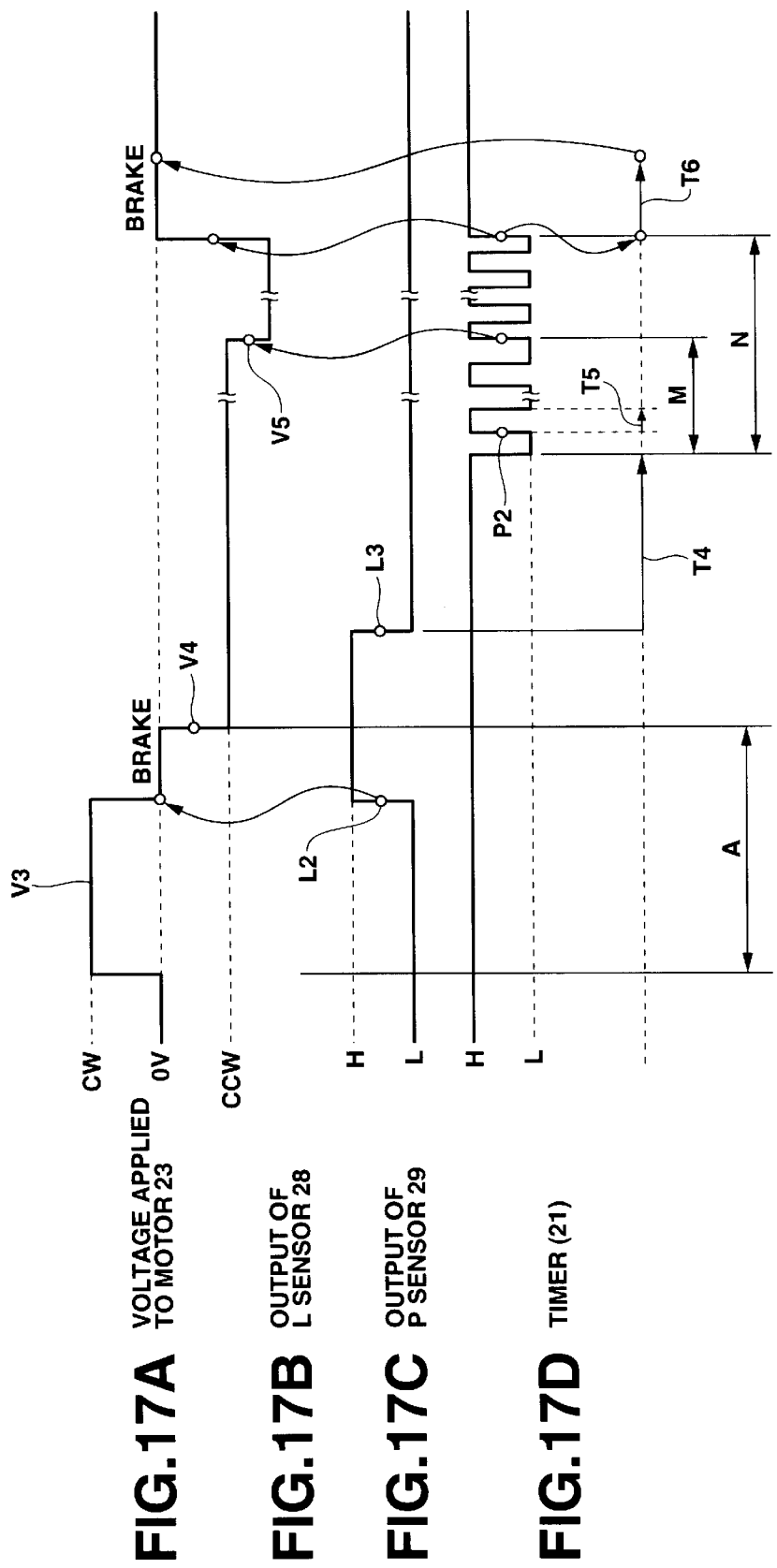
FIG. 17A, FIG. 17B, FIG. 17C, and FIG. 17D are timing charts showing the output signals from the L sensor and P sensor, the change in the voltage applied to the motor, the period in which the control circuit timer is started, and similar during the film loading processing of FIG. 15A, FIG. 15B, FIG. 15C, and FIG. 15D.

In step S202, the control circuit 21 drives the motor 23 via the film feed circuit 31, and rotates the motor in the CW1 direction shown in FIG. 6 (motor start processing; symbol "V3" in FIG. 17A). Here, a low voltage is applied to the motor 23, as shown in FIG. 17A. This rotation of the motor 23 in the CW1 direction is performed in order to move the film 7 in the rewind direction, and in order to place the tip of the leader 7b of the film 7 in a prescribed position within the camera 1. Then, processing proceeds to step S203.

In step S203, the control circuit 21 checks the output of the L sensor via the film leader detection circuit 32, and waits while the output signal of this L sensor 28 is at low (Lo) level, or until it goes to high (Hi) level. Here, if the output signal of the L sensor 28 changes to high (Hi) level as a result of the tip of the leader 7b of the film 7 passing the prescribed position facing the L sensor 28 moving in the rewind direction, processing proceeds to the next step S204.

In step S204, the control circuit 21 applies braking to the motor 23 via the film feed circuit 31. This motor braking is a processing performed in order to apply braking to the motor 23 for the necessary time, to stop the film 7, when in the above step S203 the detected output signal of the L sensor 28 has changed to high (Hi) level (symbol "L2" in FIG. 17B). By this means, the film 7 can be stopped with good precision at the prescribed position within the camera 1. Then, processing proceeds to the next step S205.

The processing up to this step S204 is a rewinding performed during film loading. The processing of step S205 and subsequent steps are processings to feed the film 7 toward the spool chamber 24. That is, in step S205 the control circuit 21 executes voltage setting processing to set the voltage to be applied to the motor 23. This processing is performed to control the rotation speed of the motor 23, and control the feeding speed of the film 7, by reducing the voltage applied to the motor 23. By this means, the film 7 being fed moves smoothly over a prescribed film feed path, and can reach the spool chamber 24. Then processing proceeds to step S206.

In step S206, the control circuit 21 drives rotation of the motor 23 in the CCW2 direction shown in FIG. 6 via the film feed circuit 31 (motor start processing; symbol "V4" in FIG. 17A). Then processing proceeds to step S207.

In step S207, the control circuit 21 initializes (clears) its own internal counter, that is, executes counter reset processing. This counter counts the number of perforations 7a which have passed a prescribed position facing the P sensor 29. Then processing proceeds to step S208.

In step S208, the control circuit 21 executes processing to start counting by the timer, that is, starts the timer starting processing. This timer is used to measure the time intervals between changes in output occurring when perforations 7a of the film 7 pass the prescribed position facing the P sensor 29.

That is, in the prescribed time measured by this timer, if no change in the state of the output signal of the P sensor 29 is detected, it can be judged that there is an anomaly in the operation to feed the film 7 or in the operation for taking up (winding) onto the spool shaft 22.

This timer is updated in the processing of the next step S210 each time, in the processing of step S209 described below, a switch in the output signal of the P sensor 29 from the low (Lo) to the high (Hi) level is detected by the perforation detection circuit 33. Hence in the processing of step S208, after the tip of the leader 7b of the film 7 has passed the prescribed position facing the L sensor 28 (symbol "L3" in FIG. 17B), a comparatively long time (symbol "T4" in FIG. 17D) is set corresponding to the time until the first perforation is detected by the P sensor 29 (symbol "P2" in FIG. 17C). Then processing proceeds to step S209.

In step S209, the control circuit 21 checks via the perforation detection circuit 33 whether the output signal of the P sensor 29 has switched from low (Lo) level to high (Hi) level or not.

When the first perforation 7a is detected by the P sensor 29, the output first switches from high (Hi) level to low (Lo) level, and after low (Lo) level continues for a prescribed length of time, switches to high (Hi) level. Hence in processing of this step S209, by checking whether the output signal of the P sensor 29 has switched from low (Lo) level to high (Hi) level, it is determined whether the first perforation 7a has been detected.

In this case, if the control circuit 21 detects a switch in the output of the P sensor 29 from low (Lo) level to high (Hi) level, processing proceeds to the next step S210. If the control circuit 21 does not detect a switch in the output of the P sensor 29 from low (Lo) level to high (Hi) level, processing proceeds to step S216.

In step S210, the control circuit 21 executes timer start processing to restart time measurement by its own internal timer. In the timer start processing performed here, a time is set (symbol "T5" in FIG. 17D) which is a time necessary and sufficient for one perforation 7a to pass the prescribed position facing the P sensor 29, and which is shorter than the time set in the processing of step S208. Then, processing proceeds to step S211.

At this time, a single perforation 7a has been detected in the processing of the above step S209, and so in step S211 the control circuit 21 executes count-up processing to increment its own internal counter. Then, processing proceeds to step S212.

In step S212, the control circuit 21 checks whether the internal counter value is at or greater than a prescribed value M (See; symbol "M" in FIG. 17D). If the counter value is less than the prescribed value M (<M), processing returns to the above step S209, and subsequent processing is repeated. If the counter value is equal to or greater than the prescribed value M (M≦), processing proceeds to the next step S213.

At this time, a sufficient length of the film 7 has been sent, and it is judged that the film 7 has already reached the spool chamber 24, and is in a state of being wound around the outer peripheral surface of the spool shaft 22. Hence in step S213, the control circuit 21 applies a voltage to the motor 23 via the film feed circuit 31 (symbol "V5" in FIG. 17A). By this means, the rotation speed of the motor 23 is accelerated, and the feeding speed of the film 7 is also accelerated. This can therefore contribute to reducing the film feed time. Then, processing proceeds to step S214.

In response to this quickening of the feeding speed of the film 7, in the processing of this step S213 and subsequent steps, the setting of the timer measurement time in the above step S210 is set to a shorter length of time. By this means, judgment of anomalies can also be performed quickly.

In step S214, the control circuit 21 checks whether the internal counter is at the prescribed value N (cf. symbol "N" in FIG. 17D). If the counter value is less than the prescribed value N (<N), processing returns to the above step S209, and subsequent processing is repeated. If the counter value is equal to or greater than the prescribed value N (N≦), it is judged that the film 7 is placed at a prescribed position within the camera 1, and that the camera 1 is in a state of preparation for photographing. Hence processing proceeds to the stopping of the next step S215 and subsequent steps.

As was determined in the processing of the above step S214, at this point it is judged that film loading has been successful, and so in step S215 the control circuit 21 accesses RAM and initializes (clears) the flag "LOADRTF". Processing then proceeds to the next step S222.

On the other hand, if in the above step S209 the control circuit 21 proceeds to the step S216 without detecting that the output signal of the P sensor 29 has gone from low (Lo) level to high (Hi) level, then in this step 216 the control circuit 21 checks the internal timer, and checks whether the set time has ended or not, that is, whether time has run out.

If it is ascertained that the timer time is not yet up, processing returns to step S209, and subsequent processing is repeated. If it is ascertained that the timer time is up, it is judged that the operation to feed or to take up (wind) the film 7 has failed, in other words, that an anomaly has occurred, and processing proceeds to the failure processing (anomaly judgment processing) of the next step S217 and subsequent steps. In this way, the above-described P sensor 29, perforation detection circuit 33 and control circuit 21 serve the purpose of failure detection means which detect failure of a film feed operation by the sprocket 9 or of a film takeup operation by the spool shaft 22.

In step S217, the control circuit 21 accesses RAM and checks the state of the flag "LOADRTF". If it is ascertained that the flag "LOADRTF"=0, then there exists no previous failure history, and so processing proceeds to step S218.

In step S218, the control circuit 21 sets the flag "LOADRTF", and then processing proceeds to step S221.

In the above step S217, if the control circuit 21 ascertains that the flag "LOADRTF"=1, it is judged that the current processing has failed during retry of film loading. Therefore processing proceeds to the next step S219.

In step S219, the control circuit 21 initializes (clears) the flag "LOADRTF". Processing then proceeds to the next step S220.

In step S220, the control circuit 21 sets the flag "LOADERF". Processing then proceeds to the next step S221.

In step S221, the control circuit 21 sets the flag "REWINDF". Processing then proceeds to the next step S222.

By means of the flag "REWINDF" which has been set in this step S221, through the judgment performed in the processing of step S5 in FIG. 11, the processing of step S6 of the same figure, that is, film rewind processing (for details see FIG. 14), is executed.

In this case, the settings of the flag "LOADRTF" which instructs a loading retry, and of the loading failure flag "LOADERF", are checked, and the film rewind processing of the above FIG. 14 ends in a state in which the leader 7b of the film 7 remains outside the film magazine 2.

Hence processing ends in a state in which the user can remove the film magazine 2 from within the camera 1 by a prescribed procedure, and in which the user can again load the film magazine 2 into the camera 1 and film loading can be retried.

On the other hand, in rewind processing executed after the detection of the film end, and in rewind processing executed as a result of performance of the prescribed midway-rewind operation by the user, for example, processing ends after the film 7 has been wound completely into the film magazine 2, as explained in FIG. 14. That is, the film magazine 2 is in a state in which it cannot be reloaded into the camera 1. Hence occurrence of double exposure, in which exposed film 7 is again used in photographing operations, as a result of reloading of the film magazine 2, and similar failures can be prevented.

As explained above, in step S215 of FIG. 16 the flag "LOADRTF" is initialized, or in the above step S221 the flag "REWINDF" is set, and then processing proceeds to step S222. In step S222 and subsequent processing, processing similar to the film rewind processing of steps S116 to S119 of FIG. 14 is performed.

That is, in step S222 the control circuit 21 executes motor braking of the motor 23 through the film feed circuit 31. Then processing proceeds to step S223.

In step S223, the control circuit 21 starts time measurement by the timer (timer start). Processing then proceeds to step S224.

In step S224, the control circuit 21 waits for a prescribed length of time (symbol "T6" in FIG. 17D) while braking continues. When the prescribed length of time T6 has elapsed (time up), processing proceeds to the next step S225.

In step S225, the control circuit 21 executes motor-off processing to release the voltage applied to the motor 23. Then the series of film loading processing is ended, and processing returns to the previous sequence.

If film loading fails, film rewinding processing is executed; after the end of this processing, if film loading is to again be executed, that is, if a retry of film loading is to be performed, the output of the L sensor 28 is at high (Hi) level at the start of processing. Hence the interval A in the timing charts of FIG. 17A through FIG. 17D is omitted, and film loading is begun. That is, in this case the operation to feed the film 7, that is, the processing of step S205 in FIG. 16 and subsequent steps, are executed immediately.

If an anomaly occurs in operations to feed and wind the film 7 prior to detection of the prescribed number N of perforations 7a by the P sensor 29 (judged by the processing of step S216 in FIG. 16), then overflow judgment processing (time-up ascertainment; the processing of step S216) for the timer, which is updated each time the output signal of the P sensor 29 switches from low (Lo) to high (Hi) level (step S210 in FIG. 16), is performed. Here, if it is ascertained that the timer time is up, this means that the perforation signal output from the P sensor 29 has disappeared. Hence in this case the prescribed anomaly judgment processing (the processing of step S217 to S221 in FIG. 16) is performed, and processing for stopped film 7 is then executed.

As explained above, by means of the above first aspect, by the simple procedure of putting the magazine chamber lid 4 in the open state, loading a film magazine 2 into the magazine chamber 3 from the opening 8, and putting the magazine chamber lid 4 into the closed state, the roll-shape film 7 housed within the film magazine 2 is automatically fed, and is always placed reliably in the prescribed position within the camera 1.

Further, if for some reason there is a failure of the operation to automatically feed the film 7, the failure of film feeding is detected, and in cases where reloading of the film magazine 2 is possible, the film 7 is automatically returned and placed in such a state that the loading operation can again be performed. Hence the troublesomeness of the procedure of loading film into the camera 1 is eliminated, while achieving reliable loading and feeding of the film 7, and a satisfactory in use can be afforded.

When performing film rewind processing, in some cases processing is ended in a state with the leader 7b of the film 7 left outside the film magazine 2. Hence after the completion of rewinding, the user can remove the film magazine 2 from within the camera 1 with a prescribed procedure, and can again load the film magazine 2 into the same camera 1 or into a different camera, so that film loading retries can easily be performed.

On the other hand, in rewinding which is executed after the film end has been detected or in rewinding which is executed because the user has performed a prescribed midway-rewind operation, processing is ended in a state in which the film 7 is wound completely inside the film magazine 2. In this case, the film 7 is in a state in which all or part of the film 7 has been exposed through prescribed photographing operations.

Hence after the end of rewind processing, by putting the film magazine 2 into a state in which reloading into the camera 1 is not possible, double exposure and similar failures in which exposed film 7 is reloaded and again used in photographing operations can be prevented.

At the time when film rewind processing is completed, the L sensor 28 adjusts the output signal judgment level with reference to the output signal for the high-reflectivity member 78, in the state in which the film 7 does not intervene between the L sensor 28 and the high-reflectivity member 78. That is, each time film rewind processing is performed, the judgment level of the L sensor 28 is set, so that aging and degradation of the sensitivity of the L sensor 28 can be accommodated, and the sensitivity level can be maintained for high accuracy.

Further, adjustment of the judgment level of the L sensor 28 is performed each time film rewind processing is performed, so that the film 7 can always be reliably detected, regardless of differences in reflectivity of the film 7.

Next, the camera feed device of a second aspect of this invention is explained. This second aspect has a configuration essentially similar to that of the above first aspect, but with changes to the characteristics of the detection means which detects whether the tip of the leader 7b of the film 7 has reached a prescribed position (first detection means: L sensor 28A). Hence the configuration and operation of the rest of the device is as per the explanations and figures of the above-described first aspect, and only differences are described in detail below.

Figure 18:
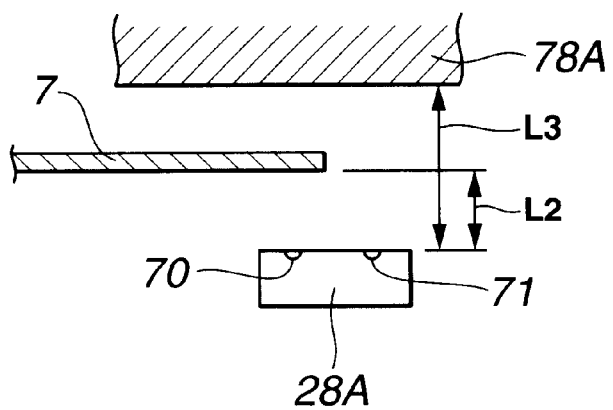
FIG. 18 is a schematic diagram showing the positional relation between the L sensor and film in the camera feed device of a second aspect of this invention.
Figure 19:
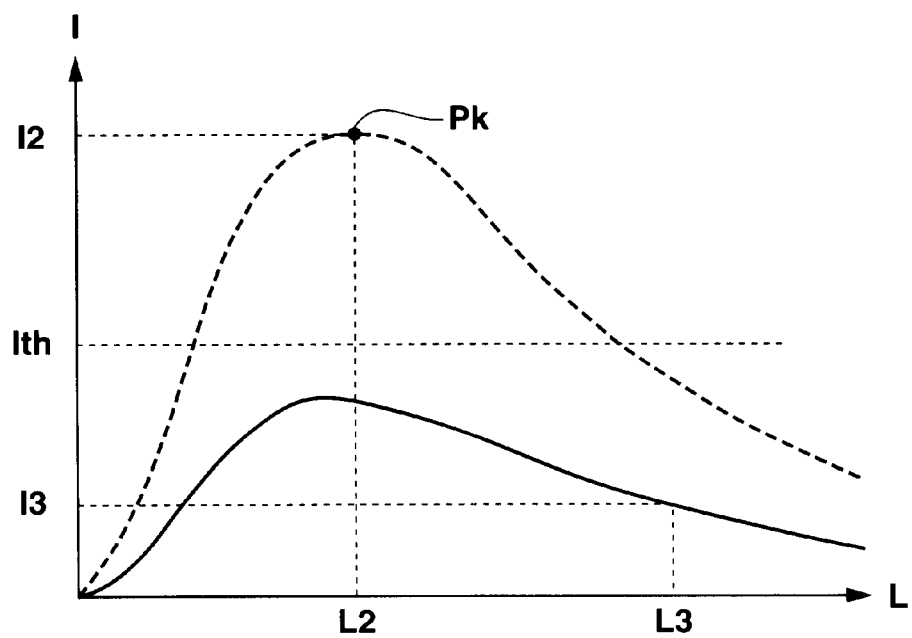
FIG. 19 is a graph showing the change in the photocurrent of the L sensor in response to changes in the distance between the L sensor and a reflective member (low-reflectivity member) in the film feed device of the camera of FIG. 18.

FIG. 18 is a schematic diagram showing the positional relation between the L sensor 28A and film 7 in this second aspect; similarly to FIG. 4 in the above first aspect, this figure is used to explain the method for setting the state judgment level of the L sensor 28A. FIG. 19 is a graph showing the change in the photocurrent of the L sensor 28A in response to changes in the distance between the L sensor 28A and a reflective member (low-reflectivity member 78A) in this aspect, and corresponds to FIG. 5 in the above-described first aspect. In this case, the distance between the L sensor 28A and the reflective object L is plotted along the horizontal axis, and the value I of the photocurrent occurring in the phototransistor 71 corresponding to this distance L is plotted along the vertical axis.

In FIG. 19, the solid line indicates the characteristic curve for the low-reflectivity member 78A in the case in which the reflective object is the low-reflectivity member 78A, that is, for the case in which the film 7 does not exist in the space between the L sensor 28A and the low-reflectivity member 78A. The broken line in the figure indicates the characteristic curve for the film base surface in the case in which the reflective object is the film 7, that is, the case in which the film 7 intervenes in the space between the L sensor 28A and the low-reflectivity member 78A.

In the above first aspect, the L sensor 28 receives light reflected by the high-reflectivity member 78 positioned at a distance at which the maximum sensitivity peak Pk is obtained, with being configured such that a high-level signal is output when the film 7 does not exist.

This aspect is configured such that the film 7 being fed from the film magazine 2 is placed at a position of a distance L2 such that the maximum sensitivity peak Pk of the L sensor 28A is obtained. And, a low-reflectivity member 78A is placed at a position facing the L sensor 28A. For this low-reflectivity member 78A, a member is employed which has much lower reflectivity compared with the reflectivity of the base surface of the film 7.

Hence when the film 7 intervenes in the space between the L sensor 28A and the low-reflectivity member 78A, the sensitivity peak value of the L sensor 28A indicates the maximum value, whereas when the film 7 does not intervene between the two, the sensitivity peak value of the L sensor 28A is a low value.

That is, when the film 7 does not intervene in the space between the L sensor 28A and the low-reflectivity member 78A, that is, when film rewinding has completed or on similar occasions, the infrared light emitted from the light-emitting diode 70 of the L sensor 28A is reflected by the low-reflectivity member 78A placed at a position with a distance L3 away from the L sensor 28A, and the phototransistor 71, on receiving this reflected light, outputs a photocurrent of value I3. On receiving this photocurrent I3, the film leader detection circuit 32 (See; FIG. 2) outputs a voltage corresponding to the value I3 to the control circuit 21. The control circuit 21 A/D converts this voltage, and computes from the result a value which incorporates a prescribed margin (voltage value corresponding to the photocurrent Ith), and stores this in the EEPROM 62 as the threshold value. In subsequent operations, this threshold value is used as the peak value until the next film rewind operation is ended.

In this way, in this aspect values are set such that when the film 7 does not exist in the space between the L sensor 28A and the low-reflectivity member 78A, the output level of the L sensor 28A is at low (Lo) level when performing control.

On the other hand, when the film 7 intervenes in the space between the L sensor 28A and the low-reflectivity member 78A, the film 7 is placed at a position a distance L2 at which the sensitivity peak Pk of the L sensor 28A is maximum. The photocurrent value at this time is the value I2 indicated in FIG. 19. Values are set such that in this case, the output level of the L sensor 28A is at high (Hi) level when performing control.

The rest of the configuration is similar to the above-described first aspect.

By means of the second aspect explained above, the judgment logic of the L sensor 28 is reversed relative to the case of the above-described first aspect, but the effect obtained is entirely similar. Hence there is the advantageous result that, in the configuration of this aspect, the freedom in design layout of the camera can easily be increased.

Next, the feed device of the camera of a third aspect of this invention is explained. This third aspect is configured essentially similarly to the above first aspect, but with partial modification of the film loading processing. Hence the configuration and operation of the rest of the device is as per the explanations and figures of the above-described first aspect.

Figure 20:
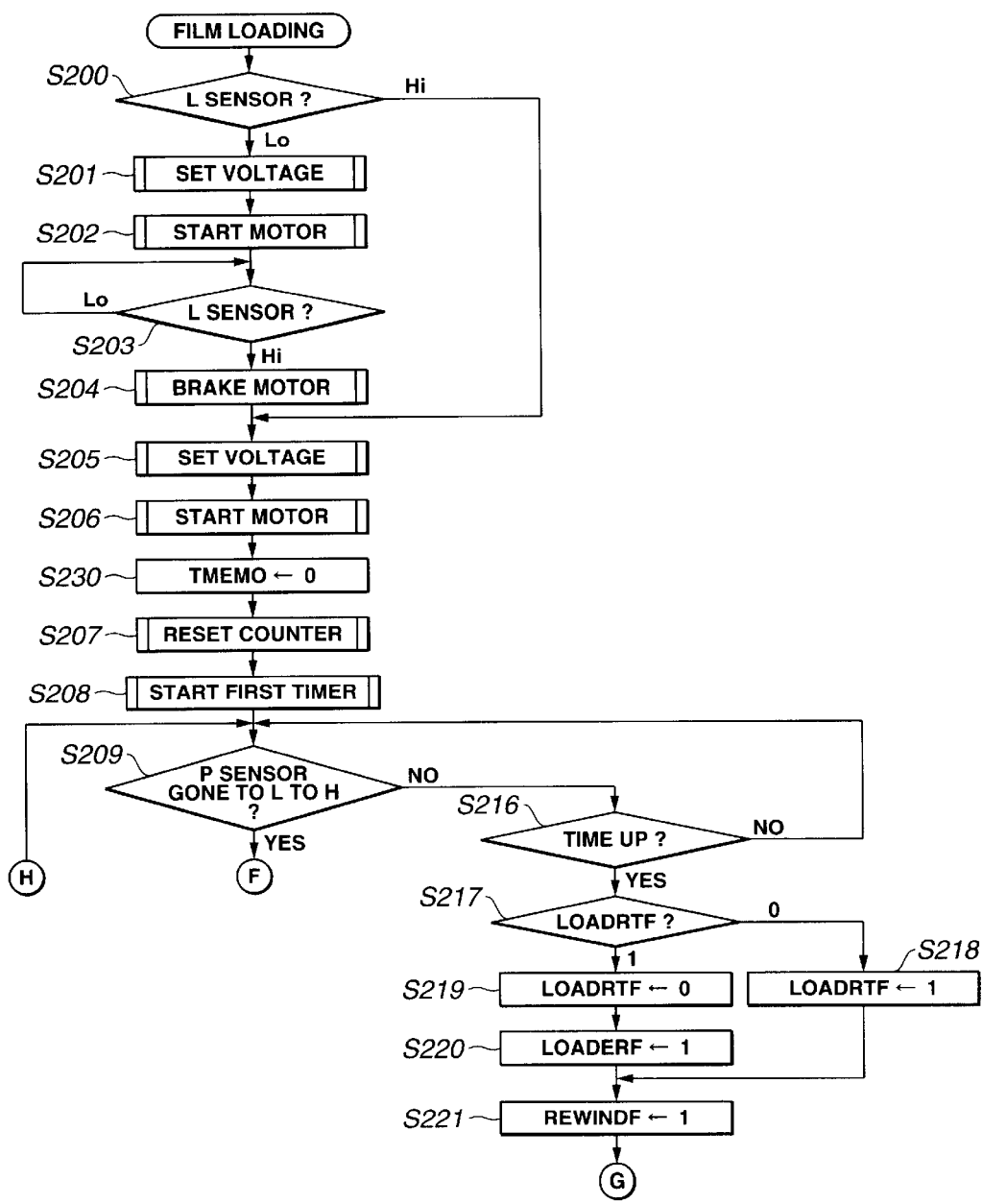
FIG. 20 is a flowchart showing the first half of film loading processing in the camera film feed device of a third aspect of this invention.
Figure 21:
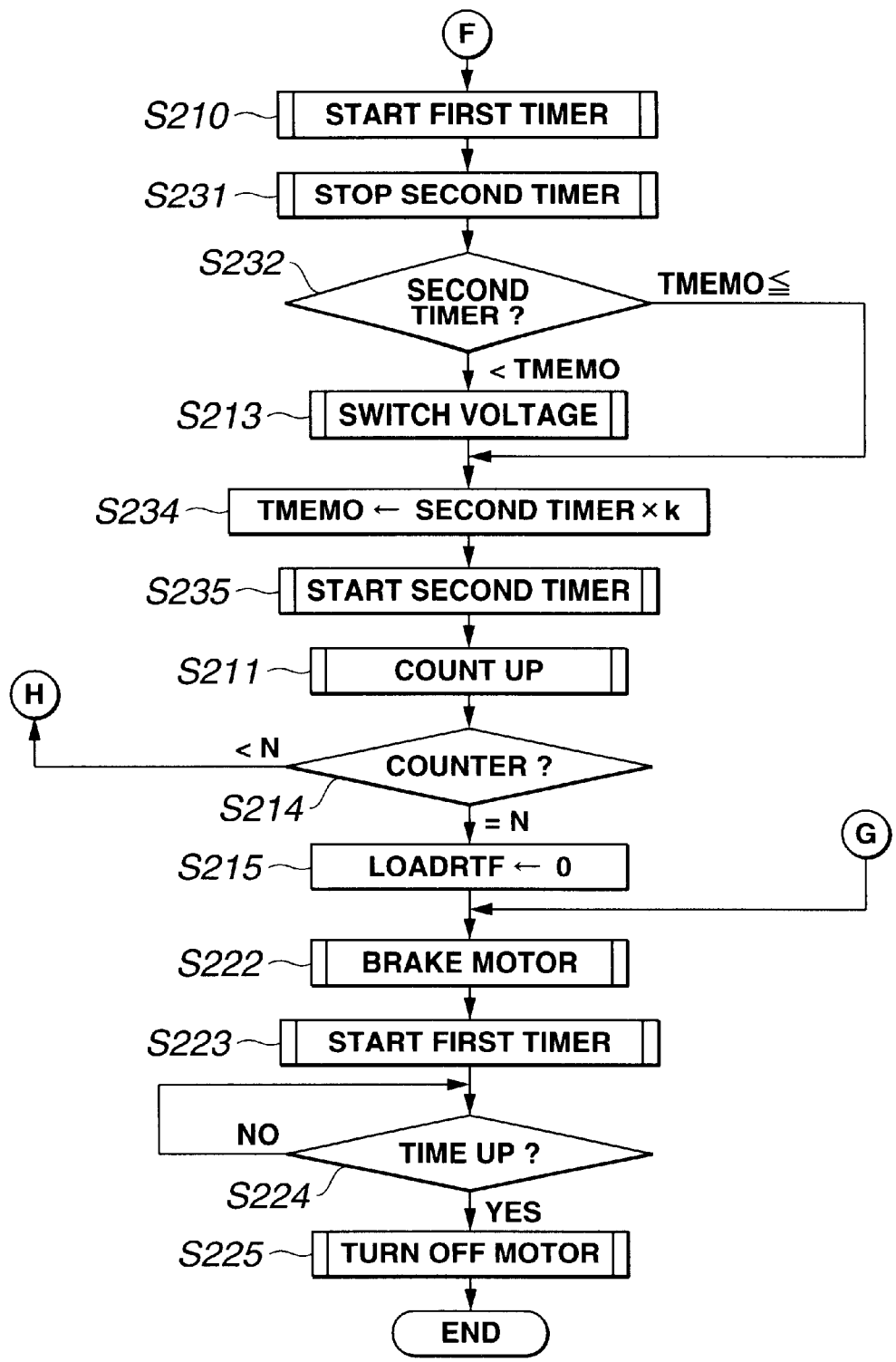
FIG. 21 is a flowchart showing the second half of the film loading processing of FIG. 20.

FIG. 20 and FIG. 21 are flowcharts showing the flow of film loading processing in the film feed device of the camera of this aspect; FIG. 20 shows the first half, and FIG. 21 shows the second half. This film loading processing replaces the processing similarly explained in the above first aspect using FIG. 16. Hence in the following explanation, only processing steps which differ from the film loading processing of the above first aspect are explained in detail; similar processing steps are assigned the same step numbers, and explanations are omitted.

The film loading processing indicated in FIGS. 20 and 21 is equivalent to the processing of step S12 in the above FIG. 11. In FIG. 21, in place of the "timer" of steps S208, S210 and S223 in FIG. 16, a "first timer" is referred to, but its operation is entirely similar. Further, the control circuit 21 in this aspect comprises internally a first timer and a second timer.

In the film loading processing of this aspect, in step S206 shown in FIG. 20, when the control circuit 21 drives rotation of the motor 23 (motor start processing) through the film feed circuit 31, processing then proceeds to step S230.

In step S230, the control circuit 21 sets in its own internal RAM the elapsed time reference value "TMEMO"=0 for perforations 7a.

Next, in step S207 the control circuit 21 executes prescribed counter reset processing, and then in the next step S208 executes first timer start processing to start time measurement by its own internal first timer. Here a comparatively long time is set, corresponding to the length of time after the tip of the leader 7b of the film 7 has passed a prescribed position facing the L sensor 28, until the first perforation is detected by the P sensor 29.

In step S210 of FIG. 21, the control circuit 21 again executes first timer start processing. Here, the time set is a time necessary and sufficient for one perforation 7a to pass the prescribed position facing the P sensor 29. Then, processing proceeds to the next step S231.

In step S231, the control circuit 21 detects the passage of one perforation 7a, and so second timer stop processing is executed to stop the second timer. Then processing proceeds to step S232. When loop processing is performed for the first time, the second timer has not yet been started; processing to start the second timer is executed in step S235, described below.

Next, in step S232 the control circuit 21 executes processing to compare the data of the second timer and the reference value "TMEMO" in its own internal RAM. If it is ascertained that "TMEMO"≦(data of second timer), then processing proceeds to step S234. If it is ascertained that (data of second timer)<"TMEMO", then processing proceeds to the next step S213, and in this step S213 the control circuit 21 executes voltage switching processing to switch the voltage applied to the motor 23. By this means, the film 7 is wound at a higher speed. Then processing proceeds to step S234.

That is, when film 7 which is fed by the sprocket 9 from a film magazine 2 loaded into the magazine chamber 3 passes through the prescribed feed path to reach the spool chamber 24 and is wound about the outer peripheral surface of the spool shaft 22, it can be judged that the film 7 has changed from a state in which it is fed by the sprocket 9, to a state in which it is being wound by the spool shaft 22. Here, the speed of passage of the current perforation 7a is faster, by a factor 1/k or more, than the speed with which the perforation 7a previously detected by the P sensor 29 passes. At this time, the condition (data of second timer) <"TMEMO" is satisfied.

Hence the P sensor 29, perforation detection circuit 33 and control circuit 21 serve as detection means to detect movement of the film 7, by detecting perforations 7a in the film 7.

In step S234, the control circuit 21 updates the reference value "TMEMO" in its own internal RAM. That is, the update value is the data of the second timer (the time for passage of a perforation 7a) multiplied by the constant k (k<1).

In this aspect, the timer for which overflow judgment processing (time-up ascertainment; processing of step S216) is executed in step S216 of FIG. 21 is the first timer, time measurement by which is begun in step S210.

The other processing steps are entirely similar to those of the above-described first aspect.

As explained above, by means of this third aspect, not only are advantageous results similar to those of the above first aspect obtained, but the voltage applied to the motor 23 is changed at more appropriate times, so that the time required for film loading can be shortened, and faster operation can be achieved.

Next, the camera feed device of a fourth aspect of this invention is explained. In this fourth aspect, the configuration is substantially similar to that of the above-described first and third aspects, but with modification of part of the film loading processing. Hence the configuration and operation of the rest of the device is as per the explanations and figures of the above-described first and third aspects.

Figure 22:
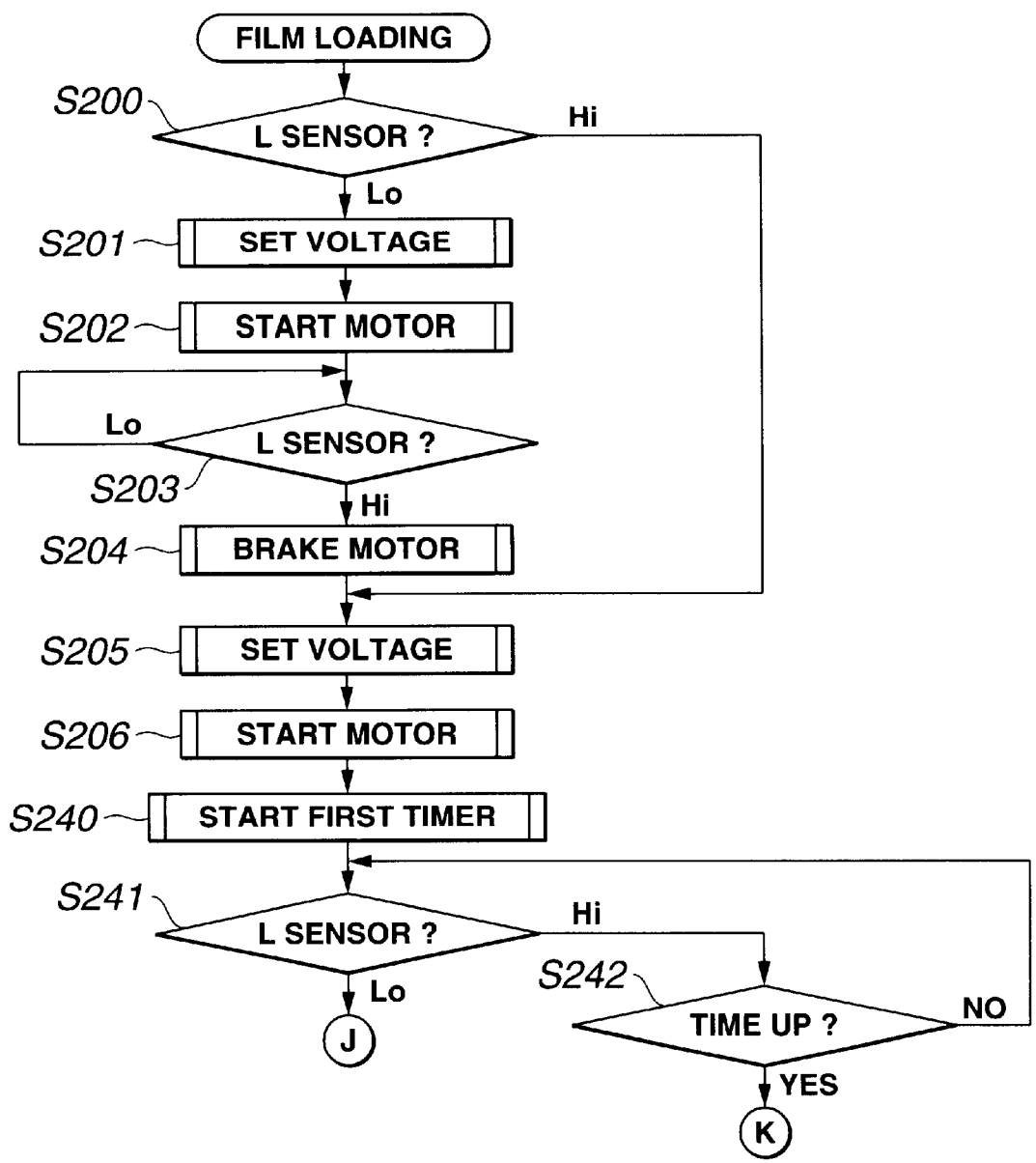
FIG. 22 is a flowchart showing the first half of film loading processing in the camera film feed device of a fourth aspect of this invention.
Figure 23:
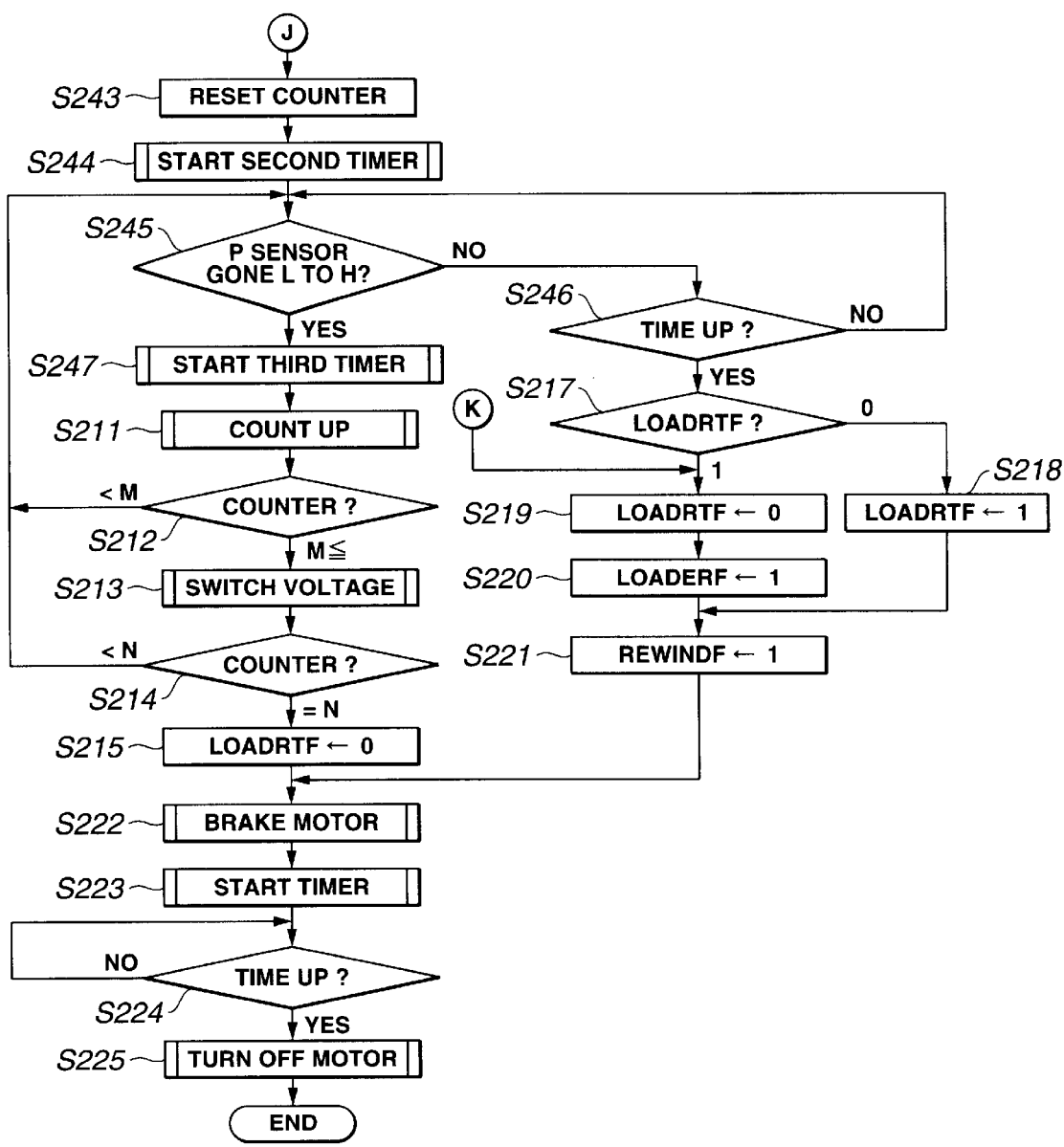
FIG. 23 is a flowchart showing the second half of the film loading processing of FIG. 22.

FIG. 22 and FIG. 23 are flowcharts showing the flow of film loading processing in the camera film feed device of this aspect; FIG. 22 shows the first half, and FIG. 23 shows the second half. This film loading processing replaces similar processing in the above first aspect, explained using FIG. 16, and similar processing in the above third aspect, explained using FIG. 20 and FIG. 21. Hence in the following explanation, only processing steps which differ from the film loading processing of the above first and third aspects are explained in detail; similar processing steps are assigned the same step numbers, and explanations are omitted.

The film loading processing shown in FIGS. 22 and 23 corresponding to the processing of step S12 in the above FIG. 11. The control circuit 21 of this aspect internally comprises three timers, including a first timer, a second timer, and a third timer.

In the film loading processing of this aspect, in step S206 shown in FIG. 22, the control circuit 21 drives rotation of the motor 23 through the film feed circuit 31 (motor start processing), and processing then proceeds to step S240.

In step S240, the control circuit 21 starts time measurement by the first timer in order to measure a first prescribed time (first timer start). Then processing proceeds to step S241.

In step S241, the control circuit 21 checks the state of the L sensor 28 via the film leader detection circuit 32. If it is ascertained that the output signal of the L sensor 28 is at high (Hi) level, it is judged that the film 7 exists at the prescribed position facing the L sensor 28, and processing proceeds to step S242. If the output signal of the L sensor 28 is at low (Lo) level, it is judged that the tip of the leader 7b of the film 7 is not detected by the L sensor 28, and processing proceeds to the next step S243 in FIG. 23.

In step S242, the control circuit 21 executes processing to check whether time-up has occurred for its own internal first timer. If timing of the first timer has ended (time-up is ascertained), it is judged that the film feed operation has failed, processing proceeds to step S219 of FIG. 23, and the prescribed failure processing is executed. In this way, the above L sensor 28, film leader detection circuit 32 and control circuit 21 serve as failure detection means to detect failure of film feed operation by the sprocket 9 or of film takeup operation by the spool shaft 22.

If time measurement by the first timer has not ended (time-up is not ascertained), processing returns to step S241, and subsequent processing is repeated.

In this way, if in step S241 the control circuit ascertains that the tip of the of the leader 7b of the film 7 has been detected by the L sensor 28, processing proceeds to step S243 in FIG. 23.

The processing of this step S243 and subsequent processing up to step S247 is substantially similar to the film loading processing of the film feed device of the above first aspect in steps S207 to S210 (cf. FIG. 16).

That is, in step S243 the control circuit 21 initializes (clears) its own internal counter (counter reset processing). This counter is used to count the perforations 7a which have passed the prescribed position facing the P sensor 29. Then processing proceeds to step S244.

In step S244, the control circuit 21 starts time measurement by the second timer (second timer start), which measures a second prescribed time. This second timer is used to measure the time interval from the time the tip of the leader 7b of the film 7 is detected by the L sensor 28, until a perforation 7a is detected by the P sensor 29.

That is, if no change in the state of the output of the P sensor 29 is detected within the second prescribed time measured by the second timer, it is judged that an anomaly has occurred in the operation to feed the film 7 or in the operation to take up (wind) the film 7 onto the spool shaft 22. That is, it is judged by the control circuit 21, as the judgment means, that the film feed operation has failed.

In the processing of step S245 described below, each time a change in the output signal of the P sensor 29 from low (Lo) to high (Hi) level is detected by the perforation detection circuit 33, this second timer is updated in the processing of the next step S247. Hence in the processing of this step S244, a comparatively long time is set, corresponding to the time after the tip of the leader 7b of the film 7 has passed the prescribed position facing the L sensor 28, until the first perforation is detected by the P sensor 29. Then processing proceeds to step S245.

In step S245, the control circuit 21 checks via the perforation detection circuit 33 whether the output signal of the P sensor 29 has switched from low (Lo) to high (Hi) level.

If the control circuit 21 detects a change in the output signal of the P sensor 29 from low (Lo) level to high (Hi) level, processing proceeds to the next step S247. If the control circuit 21 does not detect a change in the output signal of the P sensor 29 from low (Lo) to high (Hi) level, processing proceeds to step S246.

In step S247, the control circuit 21 starts the third timer to measure a third prescribed time (timer start processing). The timer start processing performed here sets a time necessary and sufficient for one perforation 7a to pass the prescribed position facing the P sensor 29, and which is shorter than the measurement time set in the processing of step S244. Then processing proceeds to the next step S211.

The other processing steps are entirely similar to the above-described first aspect.

As explained above, by means of this fourth aspect, not only are advantageous results similar to those of the above first aspect obtained, but a plurality of detection means of the L sensor 28 and P sensor 29 are comprised as means for detecting failures in film loading processing, with the outputs of both sensors checked continuously in alternation while judging failures in film loading. Hence in this aspect, film loading failure can be detected earlier than in the above-described first aspect. Also, this can contribute to the operability and improved impression of use of the camera itself.

Next, the feed device of the camera of a fifth aspect of this invention is explained. In this fifth aspect also, the configuration is substantially similar to that of the above-described first aspect, but with modification of part of the film loading processing. Hence the configuration and operation of the rest of the device is as per the explanations and figures of the above-described first aspect.

Figure 24:
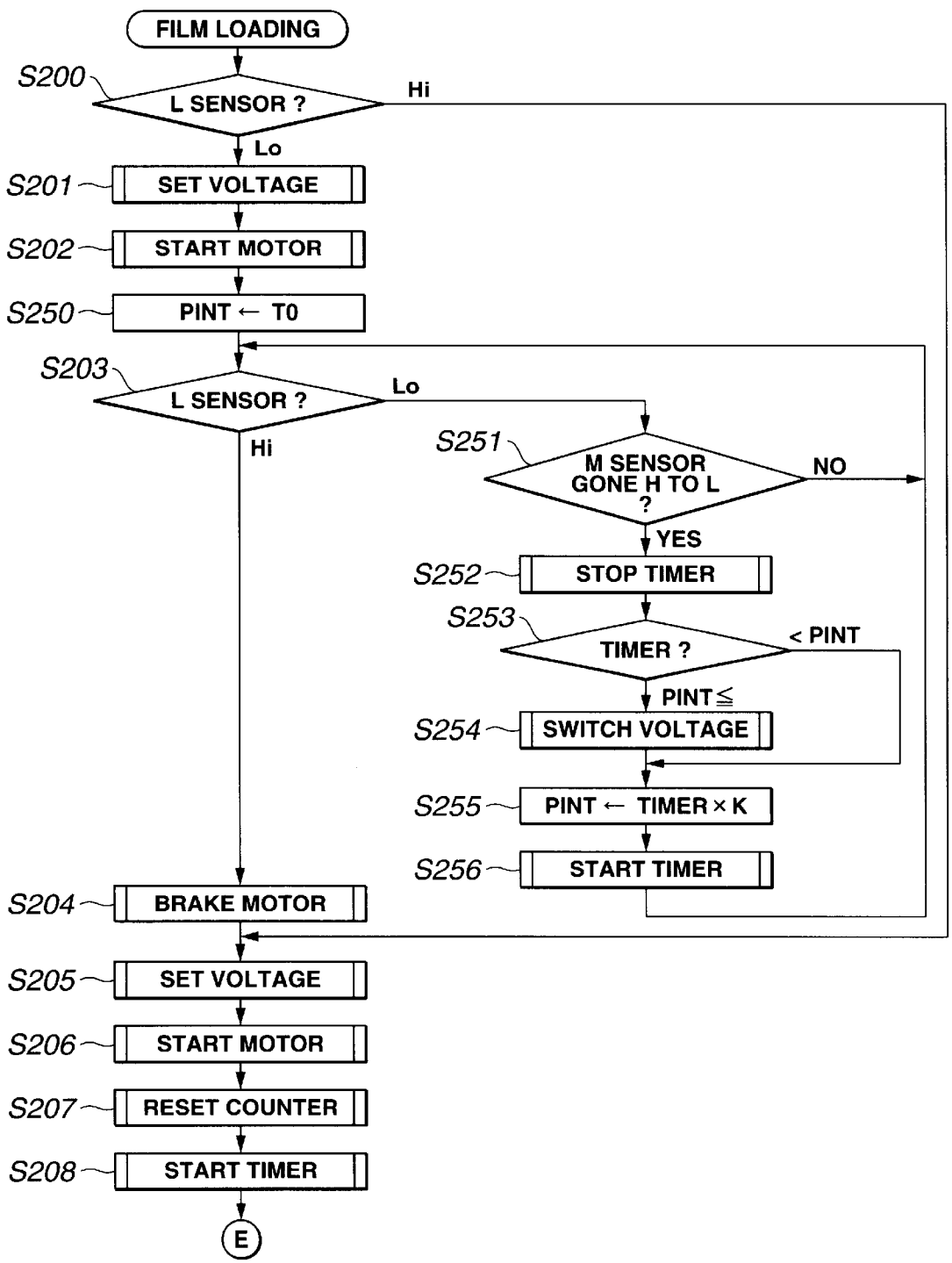
FIG. 24 is a flowchart showing the first half of film loading processing in the camera film feed device of a fifth aspect of this invention.
Figure 25:
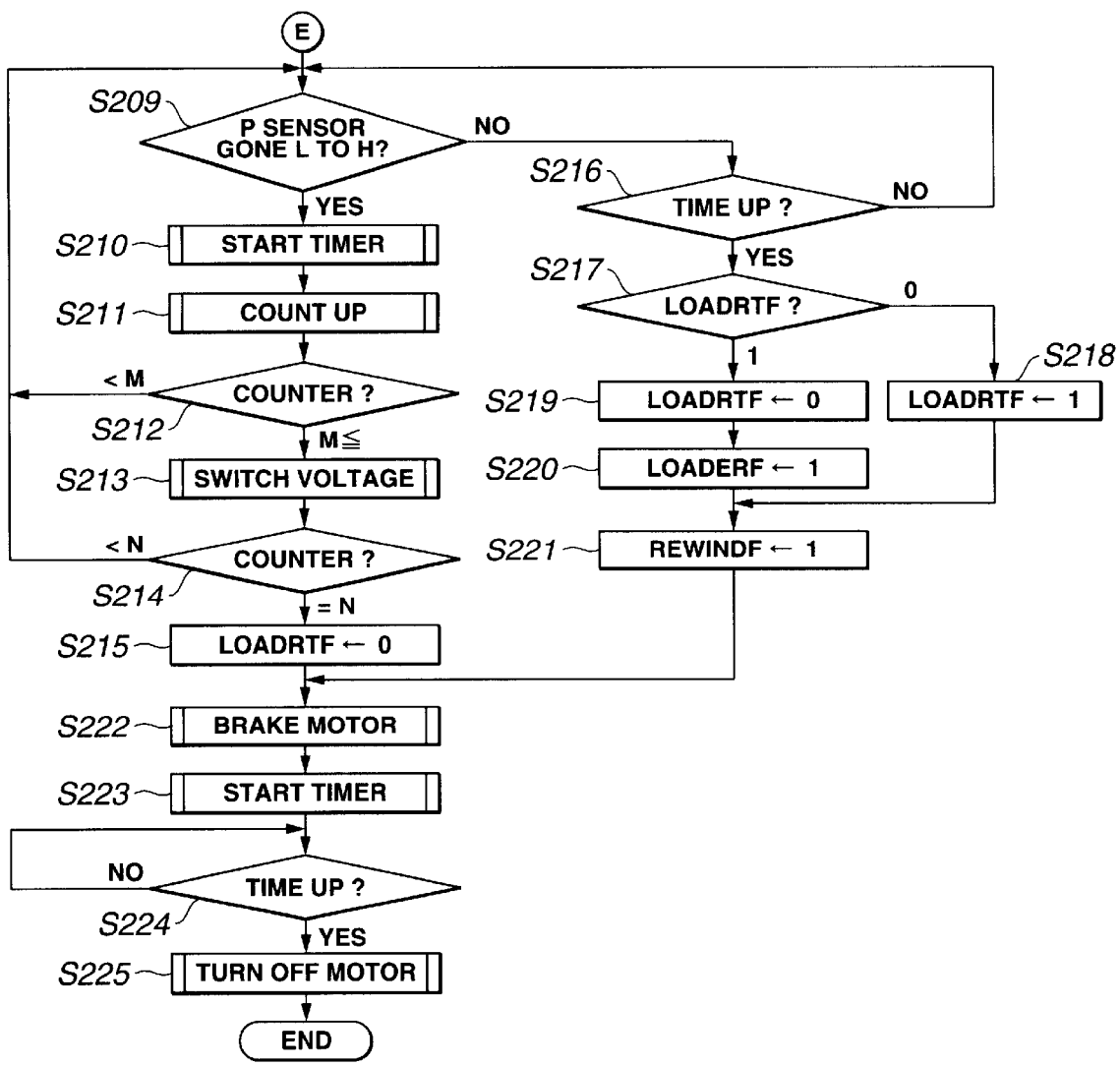
FIG. 25 is a flowchart showing the second half of the film loading processing of FIG. 24.

FIG. 24 and FIG. 25 are flowcharts showing the flow of film loading processing in the film feed device of the camera of this aspect; FIG. 24 shows the first half, and FIG. 25 shows the second half. This film loading processing substitutes for similar processing in the above first aspect, explained using FIG. 16. Hence in the following explanation, only processing steps which differ from the film loading processing of the above first aspect are explained in detail; similar processing steps are assigned the same step numbers, and explanations are omitted.

The film loading processing shown in FIGS. 24 and 25 is processing corresponding to step S12 in the above FIG. 11.

In the film loading processing of this aspect, in step S202 shown in FIG. 24, the control circuit 21 drives rotation of the motor 23 (motor start processing) via the film feed circuit 31, and processing then proceeds to step S250.

In step S250, the control circuit 21 receives the output from the M sensor 30 via the motor rotation detection circuit 34, and sets the initial value=T0 of the pulse interval reference value "PINT" in its own internal RAM. As the initial value T0, a large numerical value which is normally impossible is set. Then processing proceeds to step S203.

In step S203, the control circuit 21 checks the output of the L sensor 28, and if the output signal is at low (Lo) level, processing proceeds to step S251.

In step S251, the control circuit 21 checks the output level of the M sensor 30 via the motor rotation detection circuit 34, and judges whether the signal output level has changed from high (Hi) level to low (Lo) level. If it is judged that the output level of the M sensor 30 has changed from high (Hi) to low (Lo) level, processing proceeds to the next step S252. If it is judged that the output level of the M sensor 30 has not changed from high (Hi) to low (Lo) level, processing returns to step S203, and subsequent processing is repeated.

In step S252, the control circuit 21 executes timer stop processing to stop time measurement operation by its own internal timer. Then processing proceeds to step S253. The timer time measurement executed here is performed to measure the time interval between pulses based on the output signal of the M sensor 30, as described below. When the loop processing is performed for the first time, the timer has not yet been started. Hence in this case the timer output is 0 (zero).

Next, in step S253 the control circuit 21 executes processing to compare the data of its own internal timer with the pulse interval reference value "PINT" in its own internal RAM. If the condition (timer data)<pulse interval reference value "PINT" obtains, for example, if the rotation speed of the motor 23 is not decreased, processing proceeds to step S255. If the condition in which the pulse interval reference value "PINT"≦(timer data) obtains, for example, if the rotation speed of the motor 23 is decreased, processing proceeds to the next step S254.

That is, if as a result of judgment in the above step S253 it is determined that the rotation speed of the motor 23 is decreased, the control circuit 21 judges that the load on the motor 23 has become larger, and processing proceeds to step S254. In this step S254, the control circuit 21 executes prescribed processing to increase the voltage to be applied to the motor 23 via the film feed circuit 31, that is, executes voltage switching processing. Processing then proceeds to step S255.

In step S255, the control circuit 21 sets as the pulse interval reference value "PINT" the product of the (timer data) and a prescribed constant K (K>1), and stores this in its own RAM. Then processing proceeds to step S256.

In step S256, the control circuit 21 executes timer start operation to restart its internal timer, in order to measure the time interval between pulses for the M sensor 30. Processing then returns to the above step S203, and subsequent processing is repeated.

The processing of each of the steps S209 to S225 shown in FIG. 25 is entirely similar to the processing of the steps with the same step numbers shown in FIG. 16.

Thus in this aspect, by comparing the time elapsed in one pulse of the M sensor 30 (timer data) multiplied by a prescribed constant K (K>1) with the time elapsed in the next pulse (the next (timer data)), changes in the rotation speed of the motor 23 can be judged.

In normal cases, the state of the roll-shape film 7 housed within the film magazine 2, prior to loading of the film magazine 2 in the prescribed position in the camera 1, is as follows.

The takeup shaft 11 of the film magazine 2 is provided in freely rotatable fashion as described above, and the takeup shaft 11 in a film magazine 2 which is not loaded in the camera 1 is always in a freely rotatable state. The film 7, housed within the film magazine 2 wound about the takeup shaft 11, is not necessarily in a state of being tightly wound about the takeup shaft 11.

Hence after a film magazine 2 in this state is loaded into the prescribed position in the camera 1, when the initial rewinding is begun, the takeup shaft 11 of the film magazine 2 simply rotates without any movement of the film 7 for some time; then, driven by this, the film 7 is wound onto the outer peripheral surface of the shaft 11, and then becomes wound tightly. In this state, the leader 7b of the film 7 does not move. Simultaneously as the film 7 becomes tightly wound about the takeup shaft 11, the leader 7b of the film 7 suddenly begins to move. Hence in this case, the leader 7b of the film 7 cannot be reliably stopped in the prescribed position, and the film 7 may be rewound excessively, or it may be otherwise impossible to achieve reliable control over the stopping of the film 7.

Hence in consideration of such cases, in this aspect measures are taken to ensure reliable control over stopping of the film 7.

When the film 7 is loosely wound about the takeup shaft 11 within the film magazine 2, the load on the motor 23 is comparatively light, as described above. Hence in this case, the rotation speed of the motor 23 is somewhat high.

On the other hand, the instant that the film 7 becomes tightly wound about the takeup shaft 11, the load on the motor 23 suddenly increases, and the rotation speed of the motor 23 suddenly decreases.

Focusing on this, in cases where rewind operations are performed, when there is a change from a state in which the film 7 is loosely wound around the takeup shaft 11 to a state of tight winding, this is detected, and the voltage applied to the motor 23 is switched near the point of this change. By this means, even when there is loose winding of the film 7 within a film magazine 2 prior to use, the film 7 can be stopped at the prescribed position in a short amount of time. Other advantageous results are the same as in the above first aspect.

Next, the feed device of the camera of a sixth aspect of this invention is explained. In this sixth aspect also, the configuration is substantially similar to that of the above-described first aspect, but with modification of part of the film rewinding processing and film loading processing. Hence the configuration and operation of the rest of the device is as per the explanations and figures of the above-described first aspect.

Figure 26:
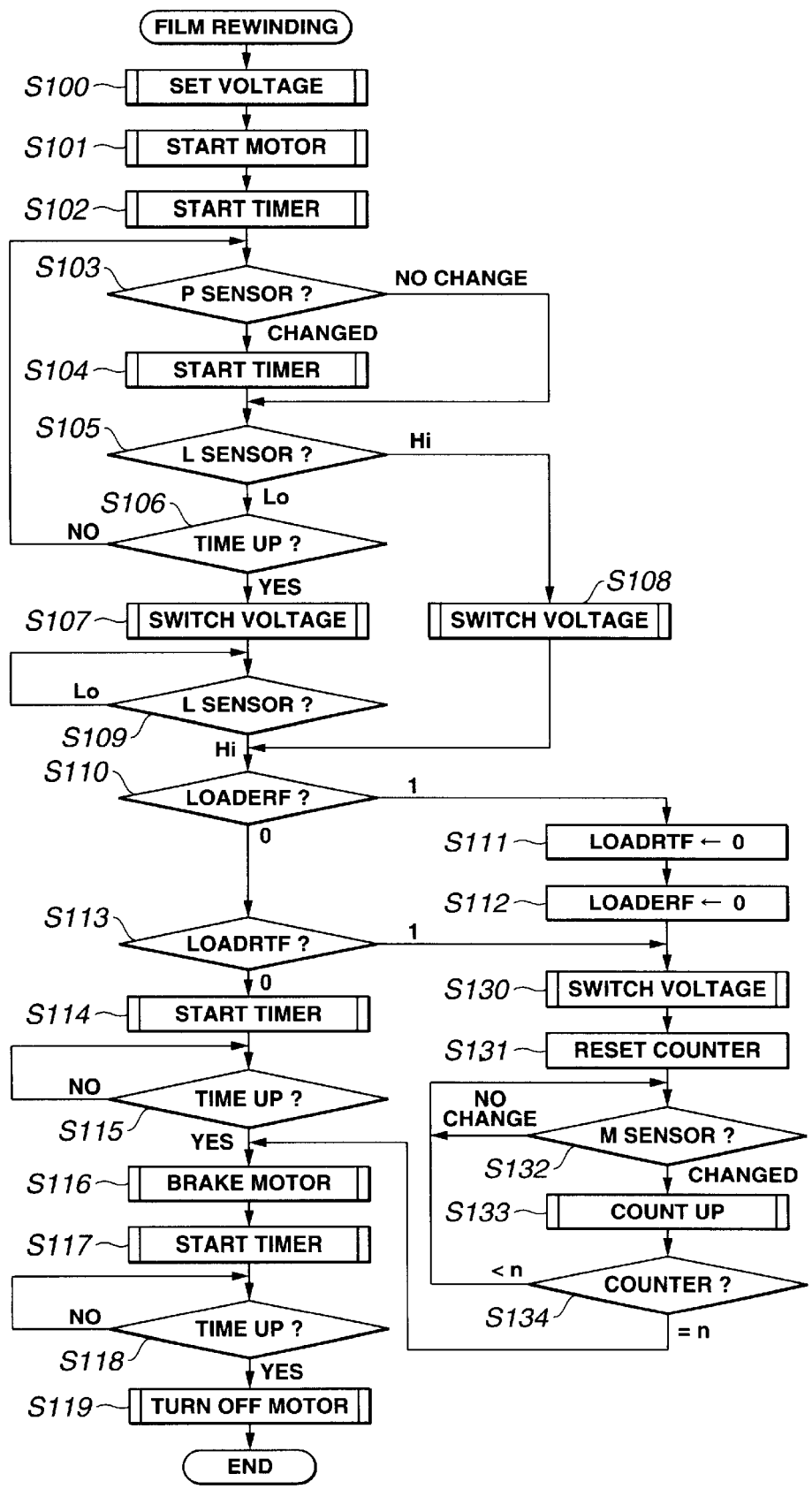
FIG. 26 is a flowchart showing the first half of film loading processing in the camera film feed device of a sixth aspect of this invention.

FIG. 26 is a flowchart showing the flow of film rewind processing in the film feed device of the camera of this aspect. The film rewind processing replaces similar processing in the above first aspect, explained using FIG. 14.

Figure 27:
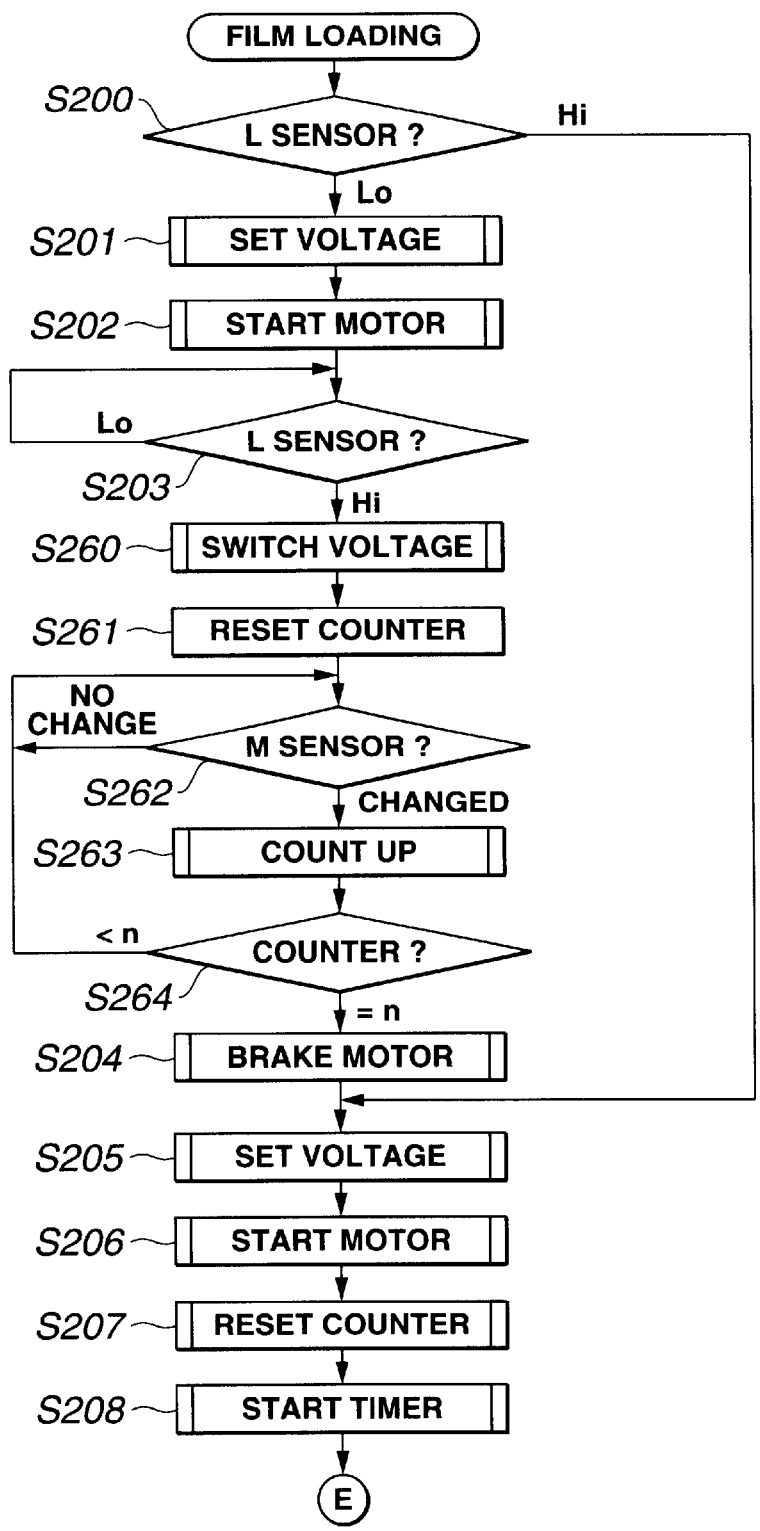
FIG. 27 is a flowchart showing the second half of the film loading processing of FIG. 26.

FIG. 27 is a flowchart showing part (the first half) of the flow of film loading processing in the film feed device of this camera. The second half of this processing is similar to that of FIG. 25, and so is not shown, and FIG. 25 should be referred to instead.

This film loading processing replaces similar processing in the above first aspect, explained using FIG. 16.

Hence in the following explanation, only processing steps which differ from the film rewinding processing and film loading processing of the above first aspect are described in detail; similar processing steps are assigned the same step numbers, and an explanation is omitted.

FIG. 28A, FIG. 28B, FIG. 28C, and FIG. 28D are timing charts corresponding to part of the film loading processing (FIG. 27) of this aspect. These timing charts show in detail only the part of the similar timing charts (FIGS. 17A to 17D), explained in the above first aspect, corresponding to the interval A.

The film rewinding processing shown in FIG. 26 corresponds to step S6 in the above FIG. 11.

The film rewinding processing of this aspect adds the processing of steps S130 to S134 to the film rewinding processing (FIG. 14) of the above first aspect. This added processing is performed immediately after detection of the tip of the leader 7b of the film 7 by the L sensor 28.

Figure 28:
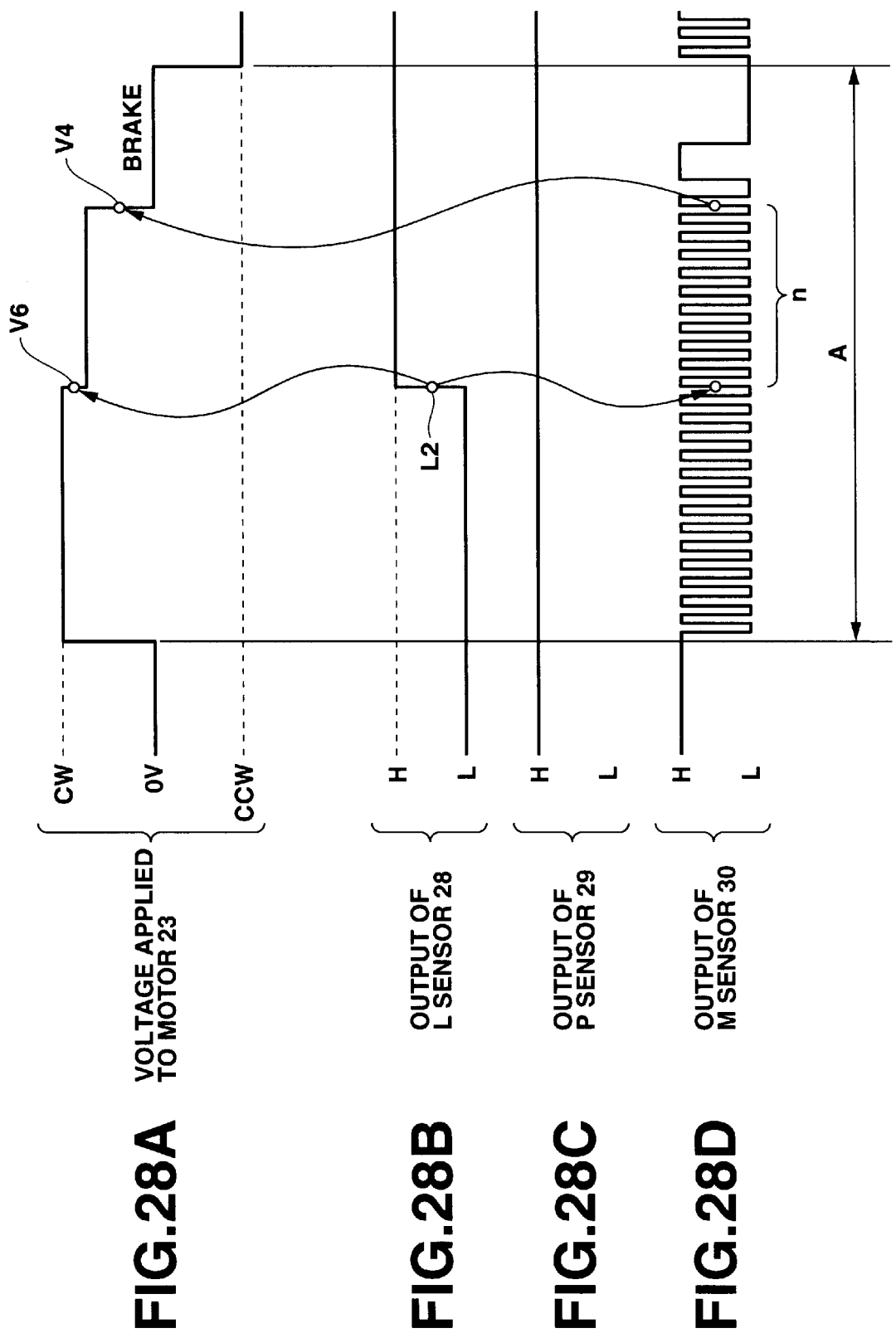
FIG. 28A, FIG. 28B, FIG. 28C, and FIG. 28D are timing charts corresponding to a part of the film loading processing of FIG. 27.

That is, in step S130 the control circuit 21 executes prescribed processing to reduce the voltage to be applied to the motor 23 via the film feed circuit 31, that is, executes voltage switching processing (symbol "V6" in FIG. 28A). Processing then proceeds to step S255.

The voltage switching processing performed here is processing performed to further improve the precision of the final stopping position of the film 7 by reducing the rewind speed of the film 7, when stopping the film 7 at a prescribed position.

In step S131, the control circuit 21 executes counter reset processing to initialize (reset) the internal counter in order to count the output pulses of the M sensor 30. Then processing proceeds to step S132.

In step S132, the control circuit 21 checks the output of the M sensor 30 via the motor rotation detection circuit 34, and judges whether the state of the output signal has changed. This processing is repeated until it is ascertained that the state of the output signal of the M sensor 30 has changed; when a change in the state of the output signal is ascertained, processing proceeds to the next step S133.

In step S133, the control circuit 21 executes counter addition processing (count-up processing) to count the change in the output level of the M sensor 30. Then processing proceeds to the next step S134.

In step S134, the control circuit 21 checks whether the value of its own internal counter has reached a constant n. If it is ascertained that the counter value<n, processing returns to the above step S132, and subsequent processing is repeated. If it is ascertained that the counter value=n, processing moves to step S116, and the subsequent processing, that is, processing to stop the film 7, is executed.

The film loading processing of this aspect is as shown in FIG. 27 and FIG. 25. This film loading processing is equivalent to the processing of step S12 in the above FIG. 11.

In the film loading processing of this aspect, the processing of steps S260 to S264 is added to the film loading processing (FIG. 16) of the above first aspect. The added processing is entirely similar to the series of processing in the steps S130 to S134 in FIG. 26, and is performed immediately after detection of the tip of the leader 7b of the film 7 by the L sensor 28.

That is, each of the steps S260 to S264 in FIG. 27 correspond to the steps S130 to S134 in FIG. 26. Hence the processing in these steps S260 to S264 is the same as the explanation of the processing in steps S130 to S134, and a detailed explanation is omitted.

As explained above, by means of the above sixth aspect, substantially similar advantageous results as in the above first aspect are obtained.

In addition, in this aspect the position of detection of the tip of the leader 7b of the film 7 by the L sensor 28 is corrected by means of the rotation angle of the motor 23. Hence greater freedom can be obtained in setting for the prescribed stopping position at which the film 7 is to be stopped. Also, during film rewinding processing, the voltage applied to the motor 23 is switched, so that a film feed device can be obtained in which precision of the position at which the film 7 is stopped is further improved.

The above first through sixth aspects have been explained for the example of a so-called drop-in loading type camera, configured such that the film magazine 2 is loaded inside from the bottom-face side. However, this invention is not thus limited, and can be applied, for example, to general cameras of the prior art configured such that the film magazine 2 is loaded in the prescribed position by opening and closing the rear lid of the camera.

Figure 29:
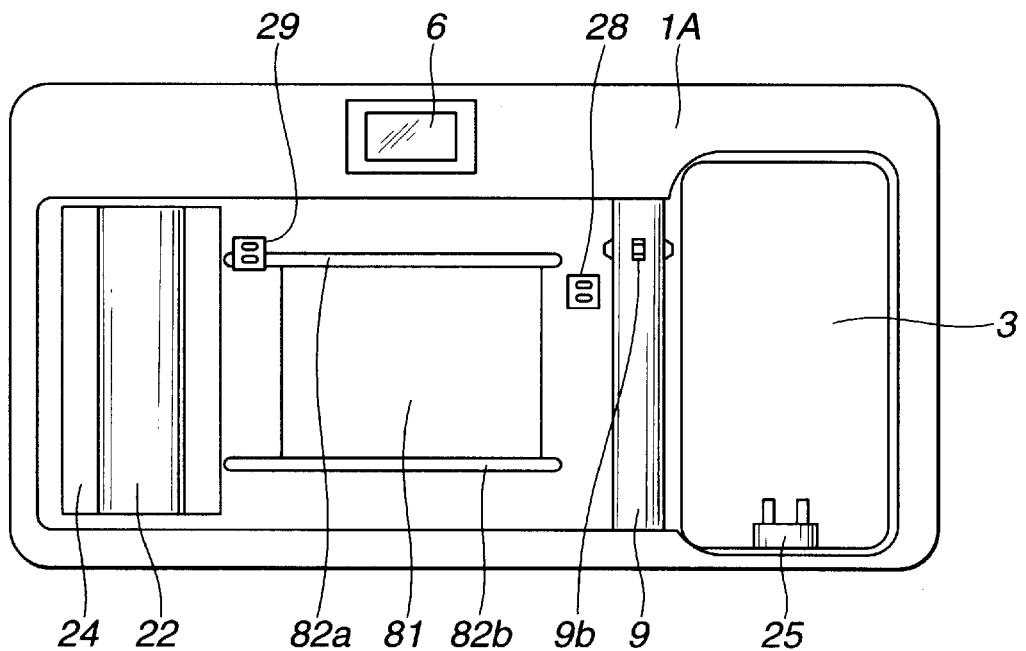
FIG. 29 is a schematic diagram showing the camera of a seventh aspect of this invention, and showing the internal configuration with the rear cover of the camera open; and, FIG. 30 is a schematic diagram showing a variation of the seventh aspect of this invention, and showing the internal configuration with the rear cover of the camera open.

FIG. 29 shows the camera of a seventh aspect of this invention, and shows the internal configuration with the rear cover of the camera open. In order to avoid complexity in the figure, the rear lid is omitted from the figure.

In the camera 1A shown in FIG. 29, a magazine chamber 3 is formed, with a fork member 25 positioned in freely rotatable fashion at one end on the inside; near this magazine chamber 3 is provided a sprocket 9.

On the other end on the inside of this camera 1A is formed a spool chamber 24, in which is placed in freely rotatable fashion a spool shaft 22.

In the space between the magazine chamber 3 and the spool chamber 24 is formed an aperture 81 for photographing; near the upper edge and the lower edge of this photographing aperture are formed film rails 82a, 82b respectively, which together form a running path for the film 7. A P sensor 29 is placed at a prescribed position on the film rail 82a at the upper edge, toward the side of the spool chamber 24. The detents 9b of the sprocket 9 are positioned along a line extending from the upper-edge film rail 82a toward the magazine chamber 3. Hence the perforations of film drawn from the film magazine join to mate with the detents 9b of the sprocket 9, and after running in a position facing the film rail 82a and running past the position facing the P sensor 29, the film is transmitted to the spool chamber 24. At this time, the film perforations are detected by the P sensor 29.

An L sensor 28 is placed at a prescribed position between the photographing aperture 81 and the sprocket 9. This L sensor 28 is in a position apart from the film rails 82a, 82b, in the space between the film rail 82a and the lower-edge film rail 82b. Hence the emulsion side of the film drawn out from the film magazine, which is the side for actual exposure, runs over the position facing the L sensor 28.

On the rear side of the camera 1A, near the top edge and substantially in the center, is positioned a viewfinder eyepiece 6.

The internal configuration and operating sequence of the camera 1A are entirely similar to the above-described first aspect. As a result, even for general cameras of the rear-lid open/close type, advantageous results can be obtained which are entirely similar to those of the above first aspect.

Further, in variations of this aspect, the configurations or operation sequences of the above-described second through sixth aspects can be applied without modification, and in these cases, entirely similar advantageous results can be obtained.

Figure 30:
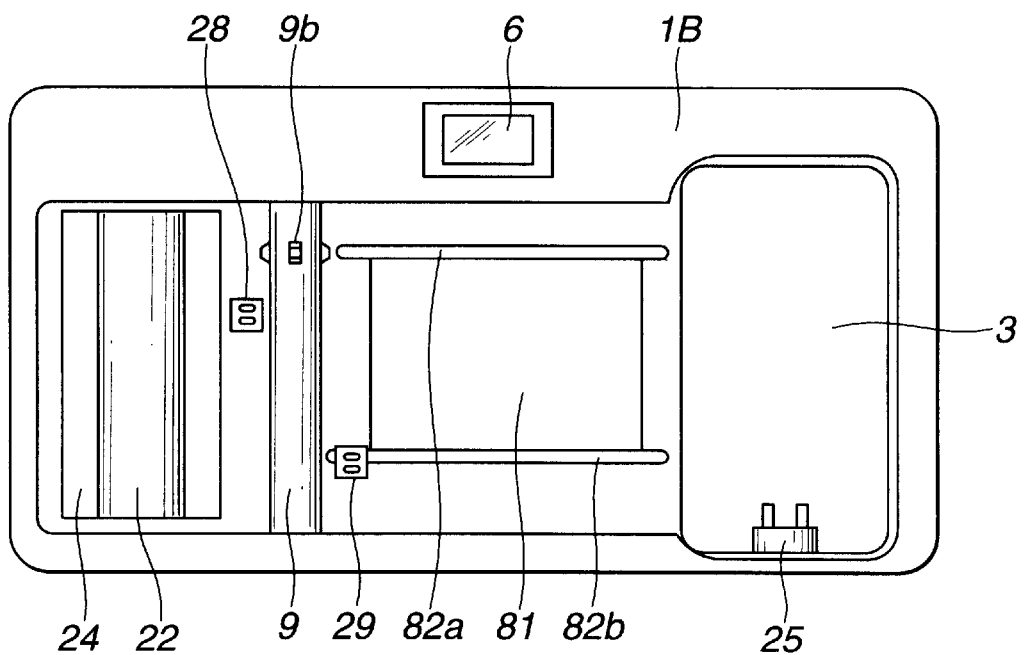

Apart from the above-described seventh aspect, another configuration in which this invention is applied to a rear-lid open/close type camera is conceivable. FIG. 30 shows another variation of the above-described seventh aspect; similarly to FIG. 29, this is a schematic diagram showing the internal configuration when the rear lid of the camera is opened. In order to avoid complexity in the figure, the rear lid is omitted from the figure.

The camera 1B shown in FIG. 30 has a configuration substantially similar to that of the camera 1A of the seventh aspect shown in FIG. 29; but placement of the sprocket 9, L sensor 28, and P sensor 29 is different.

That is, in the camera 1B of this variation, the sprocket 9 is placed in a prescribed position between the spool chamber 24 and the photographing aperture 81, as shown in FIG. 30.

The P sensor 29 is placed in a prescribed position on the lower-edge film rail 82b, nearer the spool chamber 24.

The L sensor 28 is placed in a prescribed position between the sprocket 9 and the spool chamber 24. That is, the L sensor 28 is positioned apart from the film rails 82a, 82b, in the space between the two film rails 82a and 82b.

Otherwise, this configuration is entirely similar to that of the camera 1A of the above seventh aspect.

In the camera 1B of this variation configured in the above manner, by executing an operation sequence similar to that of the above first aspect, similarly to the above seventh aspect, entirely similar advantageous results can be obtained.

In this invention, it is clear that a wide variety of different aspects can be configured based on this invention, without deviating from the spirit or scope of the invention.

Apart from being restricted by the attached claims, this invention is not restricted by a particular aspect thereof.

What is claimed is:

1. A camera film feed device for enabling freely loadable placement of a film magazine having a takeup shaft on which a film is wound and a film feeding opening from which a film leader protrudes, said film feed device comprising:

a magazine chamber in which said film magazine is loaded;

a fork which engages with said takeup shaft of said film magazine loaded into the magazine chamber;

a takeup spool which is positioned on a side of a photographing aperture opposite said magazine chamber, and which takes up said film;

a sprocket which is positioned between said magazine chamber and said takeup spool;

a control circuit which controls operations of said fork, said takeup spool, and said sprocket;

a tip detection sensor, positioned near said magazine chamber, which detects a tip of said film; and an electrically overwritable nonvolatile memory, wherein, when said film magazine is loaded into said magazine chamber, the control circuit starts an operation by the fork to rewind said film into said film magazine, and when said film is rewound to a prescribed position, the control circuit stops said rewind operation, and then starts an operation by said sprocket to feed said film to said takeup spool, wherein said control circuit stops said rewind operation based on an output from said tip detection sensor, wherein said tip detection sensor comprises an infrared light-emitting diode and a phototransistor which receives the infrared light from the light-emitting diode after reflection by an object, and wherein said control circuit stores the output of said phototransistor in said memory with a prescribed timing.

2. The camera film feed device according to claim 1, wherein said magazine chamber enables loading of a film magazine in a state in which said film leader is substantially wound around an outer periphery of said film magazine.

3. The camera film feed device according to claim 1, further comprising a loading detection sensor which detects that said film magazine is loaded into said magazine chamber, and wherein said control circuit starts said rewind operation based on an output from said loading detection sensor.

4. The camera film feed device according to claim 1, further comprising a perforation detection sensor which detects perforations in said film, and wherein said control circuit judges anomalies in film feed operations based on the output of said tip detection sensor and an output of said perforation detection sensor.

5. The camera film feed device according to claim 4, wherein said tip detection sensor is placed in a position which is closer to a position of said magazine chamber than a position of said perforation detection sensor.

6. The camera film feed device according to claim 5, wherein, in cases where the tip of said film is not detected by said tip detection sensor within a first prescribed time after a feeding operation by said sprocket, and in cases where a first perforation is not detected by said perforation detection sensor within a second prescribed time after detection of the tip of said film by said tip detection sensor within said first prescribed time, and in cases in which a second perforation is not detected by said perforation detection sensor within a third prescribed time after detection of said perforation by said perforation detection sensor within said second prescribed time, said control circuit judges that an anomaly in the film feed operation has occurred.

7. The camera film feed device according to claim 6, wherein said third prescribed time is shorter than said second prescribed time.

8. The camera film feed device according to claim 4, wherein, upon judging that an anomaly has occurred in a film feed operation, said control circuit again performs a rewind operation to rewind said film to said prescribed position by means of said fork.

9. The camera film feed device according to claim 8, wherein, after rewinding the film to said prescribed position, said control circuit again performs a film feed operation by means of said sprocket.

10. The camera film feed device according to claim 4, wherein, upon judging that an anomaly has occurred in a film feed operation, said control circuit executes said film rewind operation by means of said fork, and when said film leader is in a state of remaining outside said film magazine, and moreover when the film has been rewound until a state in which said film magazine can be ejected from said magazine chamber, said control circuit stops said rewind operation.

11. The camera film feed device according to claim 10, further comprising an end detection circuit which detects that said film has been completely wound by said takeup spool after a plurality of exposure operations have been performed, and wherein said control circuit executes said film rewind operation by means of said fork in response to an output from said end detection circuit, and stops said rewind operation when said film leader has been wound inside said film magazine.

12. The camera film feed device according to claim 10, further comprising a switch which instructs forcible rewinding of said film into said film magazine, and wherein said control circuit executes a rewind operation of said film by means of said fork in response to an output from said rewind instruction switch, and stops said rewind operation when said film leader is wound into said film magazine.

13. The camera film feed device according to claim 1, further comprising a sensor to detect perforations in said film, and wherein said control circuit controls a film feed speed based on the output from said tip detection sensor and an output from said perforation detection sensor.

14. The camera film feed device according to claim 13, wherein said film feed speed is a rewind speed during rewinding by said fork.

15. The camera film feed device according to claim 14, wherein said control circuit reduces the rewind speed by said fork if said perforations are no longer detected by said perforation detection sensor.

16. The camera film feed device according to claim 14, wherein, when said perforations are no longer detected by said perforation detection sensor, said control circuit reduces the rewind speed by said fork, and then, when said tip fork to rewind said film into said film magazine, and when said film is rewound to a prescribed position. the control circuit stops said rewind operation, and then starts an operation by said sprocket to feed said film to said takeup spool, wherein said control circuit controls a speed of the rewind operation by said takeup spool so as to be faster than a speed of the feed operation by said sprocket, and wherein said control circuit changes the speed of said rewind operation based on an output of said movement amount detection circuit.

17. A camera film feed device for enabling freely loadable placement of a film magazine having a takeup shaft on which a film is wound and a film feeding opening from which a film leader protrudes, said film feed device comprising:

a magazine chamber in which said film magazine is loaded;

a fork which engages with said takeup shaft of said film magazine loaded into the magazine chamber;

a takeup spool which is positioned on a side of a photographing aperture opposite said magazine chamber, and which takes up said film;

a sprocket which is positioned between said magazine chamber and said takeup spool;

a control circuit which controls operations of said fork, said takeup spool, and said sprocket; and a movement amount detection circuit which detects an amount of movement of said film, wherein, when said film magazine is loaded into said magazine chamber, the control circuit starts an operation by the detection sensor detects the tip of said film, ends the rewind operation by said fork.

18. The camera film feed device according to claim 17, wherein said movement amount detection circuit comprises a sensor which detects perforations in said film, and a calculation circuit which calculates said amount of movement based on a detected number of perforations output by the sensor.

19. The camera film feed device according to claim 17, wherein said control circuit controls the speed of said rewind operation by changing a voltage applied to a motor which drives said takeup spool.

20. The camera film feed device according to claim 17, further comprising a circuit which detects a speed of movement of the film, and wherein said control circuit switches a driving speed of said takeup spool based on an output from said speed detection circuit.

21. The camera film feed device according to claim 20, wherein said control circuit switches the driving speed of said takeup spool when the speed of movement of the film detected by said speed detection circuit changes by a prescribed amount.

22. The camera film feed device according to claim 20, wherein said speed detection circuit comprises a sensor which detects film perforations and outputs perforation signals, and detects the film movement speed based on a time interval of the perforation signals.

23. A film feed device for enabling freely loadable placement of a film magazine having a takeup shaft on which a film is wound and a film feeding opening from which a film leader protrudes, said film feed device comprising:

rewinding means for rewinding the film to a prescribed position in response to loading of said film magazine;

feeding means for feeding the film toward a takeup spool after completion of a rewind operation by the rewinding means;

takeup means for taking up the film by means of said takeup spool; and detection means for detecting an amount of movement of the film, wherein a speed of feeding of the film by said takeup means is faster than a speed of feeding of the film by said feeding means; and wherein said takeup means can change the speed of feeding of the film by said takeup means according to detection results of said detection means.

24. The film feed device according to claim 23, wherein said detection means detects film perforations, and measures a detected number of perforations.

25. The film feed device according to claim 23, wherein said takeup means switches the speed of feeding of the film by switching the voltage applied to a film feeding motor.

26. A camera film feed device for enabling freely loadable placement of a film magazine having a takeup shaft on which a film is wound and from which a film leader protrudes, said film feed device comprising:

rewinding means for rewinding the film to a prescribed position in response to loading of said film magazine;

feeding means for feeding the film toward a takeup spool after completion of a rewind operation by the rewinding means;

takeup means for taking up the film by means of said takeup spool; and detection means for detecting a movement speed of the film; and wherein said takeup means switches a driving speed of said takeup spool according to the film movement speed detected by said detection means.

27. The film feed device according to claim 26, wherein said takeup means switches the driving speed of said takeup spool when the film movement speed detected by said detection means changes by a prescribed amount.

28. The film feed device according to claim 27, wherein said detection means comprises means for detecting film perforations and outputting perforation signals, and for determining the film movement speed based on time intervals of the perforation signals.

29. A camera comprising a film feed device for enabling freely loadable placement of a film magazine having a film feeding opening from which a film leader of a film protrudes, said camera comprising:

loading means for rewinding the film to a prescribed position, and then feeding the film toward a takeup spool, in response to loading of said film magazine;

rewinding means for rewinding exposed film into an interior of said film magazine;

irradiation means for projecting infrared light toward the film;

light-receiving means for receiving light reflected from the film;

nonvolatile storage means for storing a prescribed value in order to judge an output level of the light-receiving means; and detection means for comparing an output signal from said light-receiving means with said prescribed value, and for detecting a tip of the film; and wherein the output signal from said light-receiving means is set to a next prescribed value, and stored in said nonvolatile storage means, either with prescribed timing during loading by said loading means, or after completion of an operation by said rewinding means.

30. The camera according to claim 29, wherein said prescribed timing is a timing of rewinding of the film to said prescribed position.

31. A camera film feed device for enabling freely loadable placement of a film magazine having a film feeding opening from which a film leader of a film protrudes, said film feed device comprising:

light projection/reception means, provided within a film feed path, for projecting infrared light toward the film, and for receiving light reflected from the film and outputting a light-reception signal;

nonvolatile storage means for storing a prescribed value for use in judging an output level of the light-reception signal output from the light projection/reception means;

detection means for comparing the output level of said light-reception signal and said prescribed value, and for detecting a presence or absence of the film;

loading means for feeding the film in response to loading of said film magazine;

detection means for detecting a failure of film loading by the loading means; and rewinding means for rewinding the film if failure of said film loading is detected by the failure detection means; and wherein the output level of said light-reception signal is stored in said nonvolatile storage means as said prescribed value in response to a completion of a film rewind operation by said rewinding means upon occurrence of said failure.

* * * * *